US007583710B2

(12) United States Patent
Dantus et al.

(10) Patent No.: US 7,583,710 B2
(45) Date of Patent: Sep. 1, 2009

(54) LASER AND ENVIRONMENTAL MONITORING SYSTEM

(75) Inventors: Marcos Dantus, Okemos, MI (US); Vadim V Lozovoy, Okemos, MI (US); Matthew Comstock, Milford, OH (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 360 days.

(21) Appl. No.: 10/884,798

(22) Filed: Jul. 2, 2004

(65) Prior Publication Data
US 2005/0021243 A1 Jan. 27, 2005

Related U.S. Application Data

(63) Continuation-in-part of application No. 10/791,377, filed on Mar. 2, 2004, which is a continuation-in-part of application No. 10/265,211, filed on Oct. 4, 2002, now Pat. No. 7,450,618, which is a continuation-in-part of application No. PCT/US02/02548, filed on Jan. 28, 2002, application No. 10/884,798, which is a continuation-in-part of application No. 10/265,211, filed on Oct. 4, 2002, now Pat. No. 7,450,618, which is a continuation-in-part of application No. PCT/US02/02548, filed on Jan. 28, 2002, application No. 10/884,798, which is a continuation-in-part of application No. 10/628,874, filed on Jul. 28, 2003, now Pat. No. 7,105,811, which is a continuation of application No. PCT/US02/02548, filed on Jan. 28, 2002.

(60) Provisional application No. 60/265,133, filed on Jan. 30, 2001.

(51) Int. Cl.
*H01S 3/10* (2006.01)
*G01N 33/50* (2006.01)
*G01N 31/00* (2006.01)

(52) U.S. Cl. .............................. 372/25; 372/9; 372/22; 372/26; 372/27; 372/40; 250/288; 250/281; 250/282; 702/19; 702/22; 702/24; 702/26; 702/28

(58) Field of Classification Search ..................... 372/9, 372/22, 25; 702/19–22
See application file for complete search history.

(56) References Cited

U.S. PATENT DOCUMENTS
3,919,881 A 11/1975 Metherell
(Continued)

FOREIGN PATENT DOCUMENTS
JP 2003 155256 A 5/2003
(Continued)

OTHER PUBLICATIONS
Feurer, T., et al.; "Coherent Control Over Collective Polariton Excitations: The Dawn of Polaritonics;" 2002 Thirteenth International Conference on Ultrafast Phenomena, Technical Digest (Tops vol. 72); Opt. Soc. America; XP008086358; pp. 541-545.
(Continued)

*Primary Examiner*—Delma R Forde
(74) *Attorney, Agent, or Firm*—Harness, Dickey & Pierce, P.L.C.

(57) ABSTRACT

A laser and monitoring system is provided. In another aspect of the present invention, the system includes a laser, pulse shaper and detection device. A further aspect of the present invention employs a femtosecond laser and binary pulse shaping (BPS). Still another aspect of the present invention uses a laser beam pulse, a pulse shaper and a SHG crystal. In yet another aspect of the present invention, a multiphoton intrapulse interference phase scan (hereinafter "MIIPS") method is used to characterize the spectral phase of femtosecond laser pulses and to correct them. A further aspect of the system of the present invention is employed to monitor environmental chemicals and biological agents, including toxins, explosives, and diseases.

51 Claims, 16 Drawing Sheets

U.S. PATENT DOCUMENTS

Figure 1:
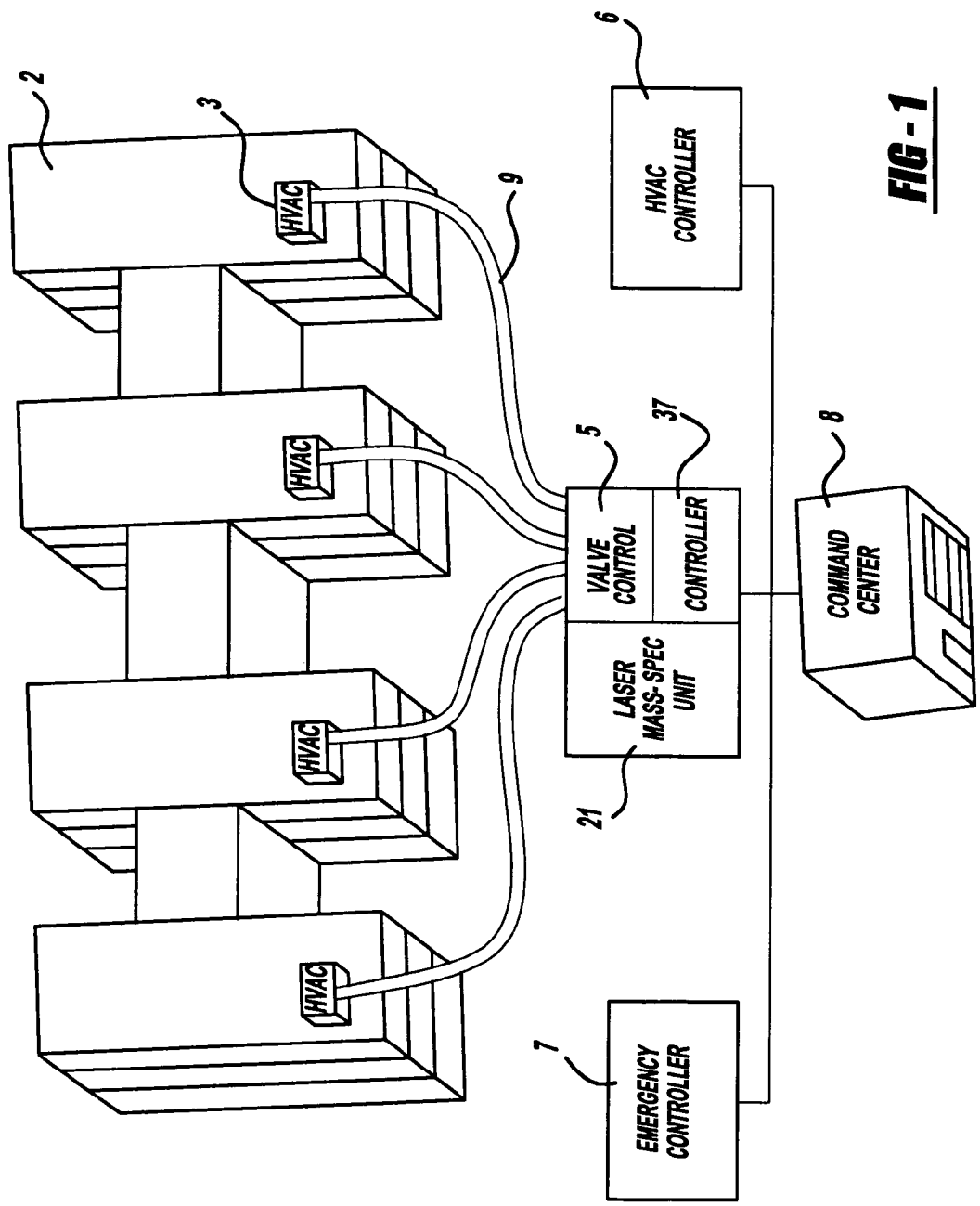
Figure 2:
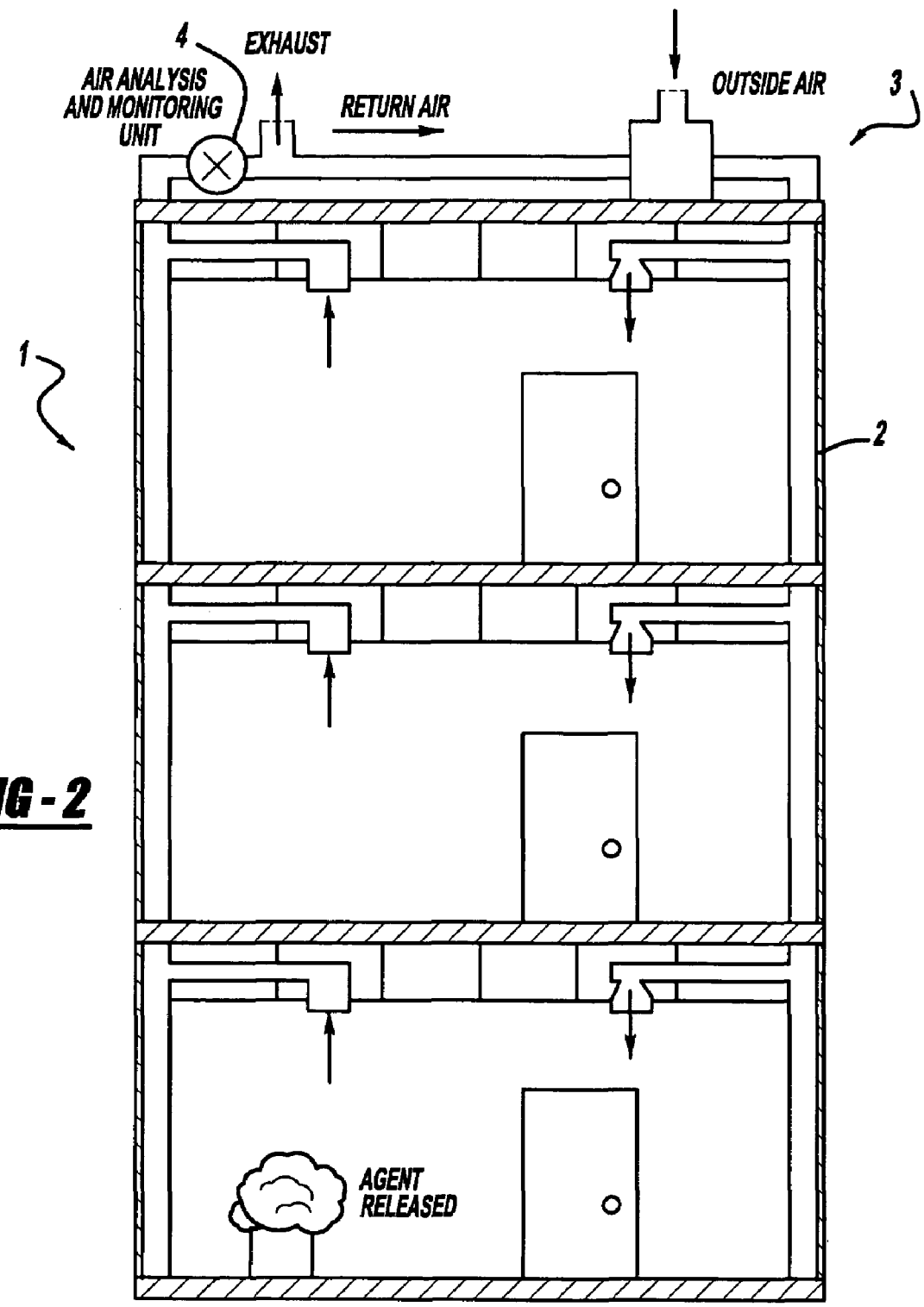

| | | | |
|---|---|---|---|
| 3,988,704 A | 10/1976 | Rice et al. | |
| 4,288,691 A | 9/1981 | Horton | |
| 4,655,547 A | 4/1987 | Heritage et al. | |
| 4,746,193 A | 5/1988 | Heritage et al. | |
| 4,772,854 A | 9/1988 | Silberberg | |
| 4,819,239 A | 4/1989 | Sharp et al. | |
| 4,856,860 A | 8/1989 | Silberberg et al. | |
| 4,866,699 A | 9/1989 | Brackett et al. | |
| 4,913,934 A | 4/1990 | Sharp et al. | |
| 4,928,316 A | 5/1990 | Heritage et al. | |
| 5,034,613 A | 7/1991 | Denk | |
| 5,048,029 A | 9/1991 | Skupsky et al. | |
| 5,132,824 A | 7/1992 | Patel et al. | |
| 5,239,607 A | 8/1993 | da Silva et al. | |
| 5,341,236 A | 8/1994 | Stappaerts | |
| 5,359,410 A | 10/1994 | Diels et al. | |
| 5,406,408 A | 4/1995 | Ellingson et al. | |
| 5,414,540 A | 5/1995 | Patel et al. | |
| 5,414,541 A | 5/1995 | Patel et al. | |
| 5,526,171 A | 6/1996 | Warren | |
| 5,530,544 A | 6/1996 | Trebino et al. | |
| 5,585,913 A | 12/1996 | Hariharan et al. | |
| 5,637,966 A | 6/1997 | Umstadter et al. | |
| 5,704,700 A | 1/1998 | Kappel et al. | |
| 5,754,292 A | 5/1998 | Kane et al. | |
| 5,759,767 A | 6/1998 | Lakowicz | |
| 5,774,213 A | 6/1998 | Trebino et al. | |
| 5,793,091 A | 8/1998 | Devoe | |
| 5,828,459 A | 10/1998 | Silberberg | |
| 5,832,013 A | 11/1998 | Yessik et al. | |
| 5,854,431 A | 12/1998 | Linker et al. | |
| 5,898,373 A | 4/1999 | Murad et al. | |
| 5,915,268 A | 6/1999 | Linker et al. | |
| 5,936,732 A | 8/1999 | Smirl et al. | |
| 6,008,899 A | 12/1999 | Trebino et al. | |
| 6,042,603 A | 3/2000 | Dees et al. | |
| 6,057,919 A | 5/2000 | Machida et al. | |
| 6,072,813 A | 6/2000 | Tournois | |
| 6,081,543 A | 6/2000 | Liu et al. | |
| 6,111,251 A | 8/2000 | Hillenkamp | |
| 6,130,426 A | 10/2000 | Park et al. | |
| 6,156,527 A | 12/2000 | Schmidt et al. | |
| 6,166,385 A | 12/2000 | Webb | |
| 6,200,466 B1* | 3/2001 | Bender | 210/96.1 |
| 6,219,142 B1 | 4/2001 | Kane | |
| 6,259,104 B1 | 7/2001 | Baer | |
| 6,288,782 B1 | 9/2001 | Worster | |
| 6,295,860 B1 | 10/2001 | Sakairi et al. | |
| 6,296,810 B1 | 10/2001 | Ulmer | |
| 6,316,153 B1 | 11/2001 | Goodman | |
| 6,327,068 B1* | 12/2001 | Silberberg et al. | 359/239 |
| 6,337,606 B1 | 1/2002 | Brombaugh et al. | |
| 6,344,653 B1 | 2/2002 | Webb | |
| 6,375,697 B2 | 4/2002 | Davies | |
| 6,391,220 B1 | 5/2002 | Watanabe et al. | |
| 6,402,898 B1 | 6/2002 | Brumer et al. | |
| 6,421,154 B1 | 7/2002 | Diels et al. | |
| 6,480,656 B1 | 11/2002 | Islam et al. | |
| 6,498,801 B1 | 12/2002 | Dudelzak et al. | |
| 6,504,612 B2 | 1/2003 | Trebino | |
| 6,566,667 B1 | 5/2003 | Partli et al. | |
| 6,573,493 B1 | 6/2003 | Futami et al. | |
| 6,577,782 B1 | 6/2003 | Leaird et al. | |
| 6,610,977 B2 | 8/2003 | Megerle | |
| 6,621,613 B2 | 9/2003 | Silberberg et al. | |
| 6,642,513 B1 | 11/2003 | Jenkins et al. | |
| 6,678,450 B1 | 1/2004 | Franson | |
| 6,684,682 B2 | 2/2004 | Semmle et al. | |
| 6,697,196 B2 | 2/2004 | Suzuki | |
| 6,708,572 B2 | 3/2004 | Jenkins et al. | |
| 6,723,991 B1 | 4/2004 | Sucha et al. | |
| 6,757,463 B2* | 6/2004 | Hutchinson et al. | 385/37 |
| 6,804,000 B2 | 10/2004 | Roorda et al. | |
| 6,857,744 B2 | 2/2005 | Nakada et al. | |
| 6,885,325 B2 | 4/2005 | Omelyanchouk et al. | |
| 6,915,040 B2 | 7/2005 | Willner et al. | |
| 6,930,779 B2 | 8/2005 | McGrew | |
| 6,963,591 B2 | 11/2005 | Tulloch et al. | |
| 7,096,125 B2 | 8/2006 | Padmanabhan et al. | |
| 7,170,598 B2 | 1/2007 | Walla et al. | |
| 7,348,569 B2* | 3/2008 | Feurer et al. | 250/400 |
| 7,439,497 B2 | 10/2008 | Dantus et al. | |
| 7,450,618 B2 | 11/2008 | Dantus | |
| 2001/0015990 A1 | 8/2001 | Miyai | |
| 2002/0086245 A1 | 7/2002 | Zait et al. | |
| 2002/0176809 A1* | 11/2002 | Siess | 422/121 |
| 2003/0099264 A1 | 5/2003 | Dantus et al. | |
| 2003/0194165 A1 | 10/2003 | Silberberg et al. | |
| 2004/0043443 A1 | 3/2004 | Lejeune | |
| 2004/0089804 A1 | 5/2004 | Dantus et al. | |
| 2004/0128081 A1* | 7/2004 | Rabitz et al. | 702/23 |
| 2004/0145735 A1 | 7/2004 | Silberberg et al. | |
| 2004/0155184 A1 | 8/2004 | Stockman et al. | |
| 2004/0240037 A1 | 12/2004 | Harter | |
| 2004/0263950 A1 | 12/2004 | Fermann et al. | |
| 2005/0036202 A1 | 2/2005 | Cohen et al. | |
| 2005/0155958 A1 | 7/2005 | Arai et al. | |
| 2005/0185188 A1 | 8/2005 | McGrew | |
| 2005/0226287 A1 | 10/2005 | Shah et al. | |
| 2006/0066848 A1 | 3/2006 | Frankel | |
| 2006/0071803 A1* | 4/2006 | Hamburger et al. | 340/630 |
| 2006/0120412 A1 | 6/2006 | Liu | |
| 2006/0274403 A1 | 12/2006 | Kaplan et al. | |
| 2007/0093970 A1 | 4/2007 | Padmanabhan et al. | |

FOREIGN PATENT DOCUMENTS

| | | |
|---|---|---|
| WO | WO 99/57318 | 11/1999 |
| WO | WO 00 70647 | 11/2000 |
| WO | WO 01/54323 | 7/2001 |
| WO | WO 02 61799 | 1/2002 |
| WO | WO 2004/023413 | 3/2004 |

OTHER PUBLICATIONS

Sato, Masamichi, et al.; "Adaptive Pulse Shaping of Femtosecond Laser Pulses in Amplitude and Phase Through a Single-Mode Fiber by Referring to Frequency-Resolved Optical Gating Patterns;" Jpn. J. Appl. Phys., vol. 41 (2002); Part 1 No. 6A, Jun. 2002; XP-002436366; pp. 3704-3709.

Gee, S., et al.; "Ultrashort Pulse Generation by Intracavity Spectral Shaping and Phase Compensation of External-Cavity Modelocked Semiconductor Lasers;" IEEE Journal of Quantum Electronics, vol. 36, No. 9, Sep. 2000; XP-002462407; pp. 1035-1040.

H. Zou, C. Zhou, Femtosecond Pulse Shaping with Space-to-Time Conversion Based on Planar Optics, Optik Optics, ScienceDirect, 2006/2007, pp. 5-8.

S. Zhang, X. Zhang, J. Huang, L. Deng, Z. Sun, W. Zhang, Z. Wang, Z. Xu, R.Li, Coherent Enhancement of Broadband Frequency Up-Conversion in BBO Crystal by Shaping Femtosecond Laser Pulses, Optics Communications, ScienceDirect, 2006/2007, pp. 559-563.

Y. Oishi, A. Suda, F. Kannari, K. Midorikawa, Intense Femtosecond Pulse Shaping Using a Fused-Silica Spatial Light Modulator, Optics Communications, ScienceDirect, 2006/2007, pp. 305-309.

B. Xu, Y., Coello, V.Lozovoy, D. Harris; M. Dantus, Pulse Shaping of Octave Spanning Femtosecond Laser Pulses, Optics Express, vol. 14, No. 22, Oct. 30, 2006, six pages.

F.M. Reinert, M. Ninck, W. Lüthy, T. Feurer, Shaping a Femtosecond Pulse with a Programmable Thermo-Optically Driven Phase Modulator, Optics Express, vol. 15, No. 7, Apr. 2, 2007, six pages.

H. Miao, A. Weiner, C. Langrock, R. Roussev, M. Fejer, Sensing and Compensation of Femtosecond Waveform Distortion Induced by All-Order Polarization Mode Dispersion at Selected Polarization States, Optics Letters, vol. 32, No. 4, Feb. 15, 2007, pp. 424-426.

S. Nath, D. Urbanek, S. Kern, M. Berg, High-Resolution Raman Spectra with Femtosecond Pulses: An Example of Combined Time- and Frequency-Domain Spectroscopy, Physical Review Letters, 2006, pp. 267401-1 to 267401-4.

Weiner, A.M. et al. "Generation of terahertz-rate trains of femtosecond pulses by phase-only filtering," Optics Letters, vol. 15, No. 1, Jan. 1, 1990, pp. 51-53.

Kroner, D. et al., Asymmetric Laser Excitation in Chiral Molecules: Quantum Simulations for a Proposed Experiment, Chemical Physics Letters Elsevier Netherland, vol. 372, No. 1-2, Apr. 22, 2003, pp. 242-248.

Hoki, K. et al., Locally Designed Pulse Shaping for Selective Preparation of Enantiomers from their Racemate, Journal of Chemical Physics, New York, NY, US, vol. 114, No. 4, Jan. 22, 2001, pp. 1575-1581.

Bychkov S. S. et al., Laser Synthesis of Chiral Molecules in Isotropic Racemic Media, Journal of Experimental and Theoretical Physics, Nauka/Interperiodica, MO, vol. 93, No. 1, Jul. 1, 2001, pp. 24-32.

Hoki, K. et al., Selective Preparation of Enantiomers from a Racemate by Laser Pulses: Model Simulation for Oriented Atropisomers with Coupled Rotations and Torsions, Chemical Physics Elsevier Netherlands, vol. 267, No. 1-3, Jun. 1, 2001, pp. 59-79.

Brixner T., et al., Quantum Control by Ultrafast Polarization Shaping, Phys Rev Lett, vol. 92, No. 20, May 21, 2004, pp. 208301-1.

Thanopulos I. et al: Laser-Driven Coherent Manipulation of Molecular Chirality, Chemical Physics Letters Elsevier Netherlands, vol. 390, No. 1-3, May 21, 2004, pp. 228-235.

Atabek, O. et al., Intense Laser Control of the Chemical Bond, Theochem Elsevier Netherlands, vol. 493, Dec. 15, 1999, pp. 89-101.

Pelfang Tian et al., Femtosecond Phase-Coherent Two-Dimensional Spectroscopy, Science American Assoc. Adv. Sci. USA, vol. 300, No. 5625, Jun. 6, 2003, pp. 1553-1555.

Motzkus, M., Open and Closed Loop Control of Complex Molecules with Shaped fs Pulses, 2003 International Conference Physics and Control. Proceedings (Cat. No. 03EX708), IEEE Piscataway, NJ, USA, vol. 3, 2003, p. 746, vol. 3.

Ma R., et al., Intense Femtosecond Laser Field-Induced Coulomb Fragmentation of C2H4, International Journal of Mass Spectrometry, Elsevier, Amsterdam, NL, vol. 242, No. 1, Mar. 15, 2005, pp. 43-48.

Wu, C. et al., Mass and Photoelectron Spectrometer for Studying Field-Induced Ionization of Molecules, International Journal of Mass Spectroscopy, Elsevier Science Publishers, Amsterdam, NL, vol. 216, No. 3, May 15, 2002, pp. 249-255.

Chen J. et al., Femtosecond Laser-Induced Dissociative Ionization and Coulomb Explosion of Ethanol, International Journal of Mass Spectrometry, Elsevier, Amsterdam, NL, vol. 241, No. 1, Feb. 15, 2005, pp. 25-29.

Wu, Chengyin et al., Laser-Induced Dissociation and Explosion of Methane and Methanol, J. Phys. B. At. Mol. Opt. Phys; Journal of Physics B: Atomic, Molecular and Optical Physics, Jun. 14, 2002, vol. 35, No. 11, pp. 2575-2582.

Tomizawa H. et al., Development of Automatically Optimizing System of Both Spatial and Temporal Beam Shaping for UV-Laser Pulse, Proceedings of the SPIE—The International Society for Optical Engineering SPIE-Int. Soc. Opt. Eng USA, vol. 5481, No. 1, 2004, pp. 47-55.

Yu, Huang, et al., Application of Adaptive Feedback Loop for Ultra-Violet Femtosecond Pulse Shaper Control, Optics Express Opt. Soc. America USA, vol. 14, No. 21, Oct. 2006.

Roth, M. et al., Acousto-Optic Femtosecond Pulse Shaping in the Ultraviolet, Lasers and Electro-Optics, 2005. (Cleo). Conference in Baltimore, Md., USA, May 22-27, 2005, Piscataway, NJ, USA. IEEE, May 22, 2005, pp. 2244-2246.

Roth, M. et al., Acousto-optical Shaping of Ultraviolet Femtosecond Pulses, Applied Physics B; Lasers and Optics, Springer-Verlag, BE, vol. 80, No. 4-5, Apr. 1, 2005, pp. 441-444.

Comstock et al.; "Multiphoton intrapulse interference 6; binary phase shaping"; Optics Express Opt. Soc., America USA, vol. 12, No. 6, Mar. 22, 2004; pp. 1061-1066.

Hu et al.; "A New Nonlinear Optical Crystal-BaAlBO$_3$F$_2$(BABF)"; Japanese Journal of Applied Physics, vol. 41, No. 10B, Part 2, Oct. 15, 2002; pp. L1131-L1133.

Weiner et al.; "Shaping of femtosecond pulses using phase-only filters designed by simulated annealing"; Journal of the Optical Society of America A (Optics and Image Science) USA, vol. 10, No. 5, May 1993; pp. 1112-1120.

Dantus, Marcos and Lozovoy, Vadim, "Experimental Coherent Laser Control of Physicochemical Processes", Chemical Reviews, 2004, vol. 104, No. 4, pp. 1813-1859.

T. Baumert, et al., "Femtosecond Pulse Shaping by an Evolutionary Algorithm with Feedback", Applied Physics B 65, 779-782 (1997).

M. Hacker et al., "Iterative Fourier Transform Algorithm for Phase-Only Pulse Shaping", Optics Express, vol. 9, No. 4, Aug. 13, 2001, pp. 191-199.

R. Bartels et al., "Shaped-Pulse Optimization of Coherent Emission of High-Harmonic Soft X-Rays", 2000 Macmillan Magazines Ltd., Nature, vol. 406. Jul. 13, 2000, pp. 164-166.

Anderson, M.E. et al.; "The effects of noise on ultrashort-optical-pulse measurement using SPIDER"; Appl. Phys. B 70 (Suppl.); 2000; pp. S85-S93.

Assion, A. et al.; "Control of Chemical Reactions by Feedback-Optimized Phase-shaped Femtosecond Laser Pulses"; Science Magazine, vol. 282; Oct. 30, 1998; pp. 919-922.

Baltuska, Andrius et al.; "Amplitude and phase characterization of 4.5-fs pulses by frequency-resolved optical gating"; Optics Letters, vol. 23, No. 18, Sep. 15, 1998; pp. 1474-1476.

Baltuska, Andrius et al.; "Visible pulse compression to 4 fs by optical parametric amplification and programmable dispersion control"; Optics Letters, vol. 27, No. 5, Mar. 1, 2002; pp. 306-308.

Baumert, T. et al.; "Femtosecond pulse shaping by an evolutionary algorithm with feedback"; Appl. Phys. B 65 (1997); pp. 779-782.

Belfield, K.D. et al.; "Two-photon photoinitiated polymerization"; J. Phys. Org. Chem. 13(12): 837-849 (Dec. 2000).

Bhattacharya, N. et al.; Phys. Rev. Lett. 88 (2002) 137901-1.

Brattke, S. et al.; "Generation of Photon Number States on Demand via Cavity Quantum Electrodynamics"; Phys. Rev. Lett.; Apr. 16, 2001; vol. 86, No. 16; pp. 3534-3537.

Brixner, T. et al.; "Feedback-controlled femtosecond pulse shaping"; Appl. Phys. B 70 (Suppl.) 2000; pp. S119-S124.

Broers, B. et al.; "Diffraction and focusing of spectral energy in multiphoton processes"; Phys. Rev. A; 1992; 46, 2749.

Broers, B. et al.; "Large interference effects of small chirp observed in 2-photon absorption"; Opt. Commun. 1992, 91, 57.

Bucksbaum, Philip; "An atomic dimmer switch"; Nature; Nov. 19, 1998; vol. 396; pp. 217-219.

Buist, A.H. et al.; "Probing microscopic chemical environments with high-intenity chirped pulses"; Optics Letters 24, 244-246 (1999).

CheckGate 9000—Metal detector; Internet publication from Safer America; 2003.

Chilla, Juan L.A. et al.; "Direct determination of the amplitude and the phase of femtosecond light pulses"; Jan. 1, 1991, vol. 16, No. 1; Optics Letters; pp. 39-41.

Chu, K.C. et al.; "Direct measurement of the spectral phase of femtosecond pulses"; Optics Letters, vol. 20, No. 8; Apr. 15, 1995; pp. 904-906.

Clara et al.; "Femtosecond laser mass spectroscopy of ferrocenes: photochemical stabilization by bridged cyclopentadienyl rings?"; International Journal of Mass Spectrometry, Elsevier Science Publishers; vol. 203, No. 1-3; Dec. 26, 2000; pp. 71-81.

Clement, Tracy Sharp et al.; "Single-Shot measurement of the amplitude and phase of ultrashort laser pulses in the violet"; Jan. 1, 1995; Optics Letters, vol. 20, No. 1; pp. 70-72.

Cormack, I.G. et al.; "Practical measurements of femtosecond optical pulses using time-resolved optical gating"; Optics Communications 194 (Jul. 15, 2001); pp. 415-424.

Cumpston, B.H. et al.; "New Photopolymers based on Two-Photon Absorbing Chromophores and Application to Three-Dimensional Microfabrication and Optical Storage"; Mat. Res. Soc. Symp. Proc.; vol. 488.

Cumpston, B.H. et al.; "Two-photon polymerization initiators for three-dimensional optical data storage and microfabrication"; Letters to Nature, pp. 51-54, Mar. 4, 1999.

Dela Cruz, J.M. et al.; "Multiphoton intrapulse interference 3: Probing microscopic chemical environments"; J. Phys. Chem. A 2004.

Dietrich, P. et al.; "Determining the absolute carrier phase of a few-cycle laser pulse"; Optics Letters, vol. 25, No. 1, Jan. 1, 2000; pp. 16-18.

Ding, Y.; "Femtosecond pulse shaping by dynamic holograms in photorefractive multiple quantum wells"; Optics Letters; May 15, 1997; vol. 22, No. 10; pp. 718-720.

Dorrer, C. et al.; "Direct space-time characterization of the electric fields of ultrashort optical pulses"; Optics Letters, vol. 27, No. 7, Apr. 1, 2002; pp. 548-550.

Dorrer, Christophe et al.; "Precision and consistency criteria in spectral phase interferometry for direct electric-field reconstruction"; J. Opt. Soc. Am. B, vol. 19, No. 5, May 2002; pp. 1030-1038.

Drexler, W. et al.; In vivo ultrahigh-resolution optical coherence tomography; Optics Letters; Sep. 1, 1999; vol. 24, No. 17; pp. 1221-1223.

Dudley, John M. et al.; "Complete Characterization of Ultrashort Pulse Sources at 1550 nm"; IEEE Journal of Quantum Electronics, vol. 35, No. 4; Apr. 1999; pp. 441-450.

Dudovich, N. et al.; "Transform-limited pulses are not optimal for resonant multiphoton transitions"; Phys. Rev. Lett. 86, 47-50 (2001).

EVD-3000—Hand-held Explosives Detector; Internet publication from Safer America, Oct. 6, 2004.

Gallmann, L. et al.; "Spatially resolved amplitude and phase characterization of femtosecond optical pulses"; Optics Letters, vol. 26, No. 2, Jan. 15, 2001; pp. 96-98.

Gallmann, L. et al.; "Techniques for the characterization of sub-10-fs optical pulses: a comparison"; Appl. Phys. B 70 (Suppl), 2000; pp. S67-S75.

Garcia-Ripoll, J.J. et al.; "Speed Optimized Two-Qubit Gates with Laser Coherent Control Techniques for Ion Trap Quantum Computing"; Physical Review Letters; vol. 91, No. 5; Oct. 10, 2003; p. 157901-1-157901-4.

Geindre, J.P. et al.; "Single-shot spectral interferometry with chirped pulses"; Optics Letters, vol. 26, No. 20, Oct. 15, 2001; pp. 1612-1614.

Goswami, D.; "Optical pulse shaping approaches to coherent control"; Physics Reports; 374 (2003); p. 385-481.

Goswami, D.; "Ultrafast Pulse Shaping approaches to Quantum Computing"; Indian Institute of Technology; Dec. 24, 2003.

Hacker, M. et al.; "Frequency doubling of phase-modulated, ultrashort laser pulses"; Appl. Phys. B 73; (2001); pp. 273-277.

Hasan, T. et al.; "Photodynamic Therapy of Cancer"; Chapter 40 in Holland Frei Cancer Medicine, BC Dekker Inc. (2003).

Hillegas, C.W. et al.; "Femtosecond laser pulse shaping by use of microsecond radio-frequency pulses"; Optics Letters; May 15, 1994; vol. 19, No. 10; pp. 737-739.

Hornung, Thomas et al.; "Adapting optimal control theory and using learning loops to provide experimentally feasible shaping mask patterns"; Journal of Chemical Physics, vol. 115, No. 7; Aug. 15, 2001; pp. 3105-3111.

Hosseini, S. Abbas et al.; "Coherent control of multiphoton transitions with femtosecond pulse shaping"; Physical Review A, pp. 033410-1-033410-7.

Iaconis, C. et al.; "Direct Interferometric Techniques for Characterizing Ultrashort Optical Pulses"; IEEE Journal of Selected Topics in Quantum Electronics, vol. 4, No. 2; Mar./Apr. 1998; pp. 285-294.

Iaconis, C. et al.; "Spectral phase interferometry for direct electric-field reconstruction of ultrashort optical pulses"; Optics Letters, vol. 23, No. 10, May 15, 1998; pp. 792-794.

Imeshev, G. et al.; "Engineerable femtosecond pulse shaping by second-harmonic generation with Fourier synthetic quasi-phase-matching gratings"; Optics Leters; Jun. 1, 1998; vol. 23, No. 11; pp. 864-866.

Judson et al.; "Teaching Lasers to Control Molecules"; Phys. Rev. Ltrs.; vol. 68, No. 10; p. 1500; Mar. 9, 1992.

Kaindl, Robert A. et al.; "Generation, shaping, and characterization of intense femtosecond pulses tunable from 3 to 20 um"; J. Opt. Soc. Am. B, vol. 17, No. 12, Dec. 2000; pp. 2086-2094.

Kakehata, Masayuki et al., "Single-shot measurement of carrier-envelope phase changes by spectral interferometry"; Optics Letters, vol. 26, No. 18, Sep. 15, 2001; pp. 1436-1438.

Kane, Daniel J. et al.; "Single-shot measurement of the intensity and phase of an arbitrary ultrashort pulse by using frequency-resolved optical gating"; May 15, 1993, vol. 18, No. 10 Optics Letters; pp. 823-825.

Kane, Daniel J. et al.; "Single-shot measurement of the intensity and phase of a femtosecond UV laser pulse with frequency-resolved optical gating"; Jul. 15, 1994, vol. 19, No. 14; Optic Letters; pp. 1061-1063.

Kim, D.S. et al.; "Femtosecond pulse distortion in GaAs quantum wells and its effect on pump-probe or four-wave-mixing experiments"; Dec. 15, 1994; Physical Review B, vol. 50, No. 24, pp. 18240-18249.

Kohler, Bern et al.; "Phase and intensity characterization of femtosecond pulses from a chirped-pulse amplifier by frequency-resolved optical gating"; Mar. 1, 1995, vol. 20, No. 5, Optics Letters; pp. 483-485.

Kosik, Ellen M. et al.; "The effects of noise on ultrashort optical pulse measurement using SPIDER"; The Institute of Optics, University of Rochester, Rochester, NY; pp. 21-23, 2000.

Lange, H. Rudiger et al.; "Reconstruction of the Time Profile of Femtosecond Laser Pulses Through Cross-Phase Modulation"; IEEE Journal of Selected Topics in Quantum Electronics, vol. 4, No. 2; Mar./Apr. 1998; pp. 295-300.

Leibfried, D. et al.; "Quantum information with trapped ions at NIST"; Journal of Modern Optics; Apr.-May 2003; vol. 50, No. 6/7; p. 1115-1129.

Lozovoy, V.V.; "Multiphoton intrapulse interference II: Control of two- and three-photon laser induced fluorescence with shaped pulses"; J. Chem. Phys. 118 (7): 3187-3196 (Feb. 15, 2003).

Lu, Y.M. et al.; "Highly sensitive two-photon chromophores applied to three dimensional lithographic microfabrication: design, synthesis and characterization towards two-photon absorption cross section"; J. Mater Chem. 14(1): 75-80 (2004).

Matuschek, N.; "Back-side-coated chirped mirrors with ultra-smooth broadband dispersion characteristics"; Applied Physics B; 71, pp. 509-522, no date.

Meshulach, D. et al.; "Adaptive real-time femtosecond pulse shaping"; J. Opt. Soc. Am. B; May 1998; vol. 15, No. 5; pp. 1615-1619.

Meshulach, D. et al.; "Adaptive ultrashort pulse compression and shaping"; Optics Communications 138 (1997); pp. 345-348.

Meshulach, M. et al.; "Coherent quantum control of multiphoton transitions by shaped ultrashort optical pulses"; Phys. rev. A 60, 1287-1292 (1999).

Michelmann, K. et al.; "Measurement of the Page function of an ultrashort laser pulse"; Optics Communications, Oct. 15, 2001; pp. 163-170.

Nicholson, J.W. et al.; "Noise sensitivity and accuracy of femtosecond pulse retrieval by phase and intensity from correlation and spectrum only (PICASO)"; J. Opt. Soc. Am. B; vol. 19, No. 2; Feb. 2002; pp. 330-339.

Osborn, D.L. et al.; "Spectral and intensity dependence of spatially resolved two-photon conductivity defects on a GaAsP photodiode"; J. Appl. Phys. 89, 626-633 (2001).

Panasenko, Dmitriy et al; "Single-shot sonogram generation for femtosecond laser pulse diagnostics by use of two-photon absorption in a silicon CCD camera"; Aug. 15, 2002, vol. 27, No. 16; Optics Letters; pp. 1475-1477.

Parmeter, John E. et al.; "Overview of Explosives Detection Research and Development in Department 5848 at Sandia National Laboratories"; 16th Annual NDIA Security Technology Symposium & Exhibition; Jun. 26-29, 2000.

Pastirk, I. et al.; "Selective two-photon microscopy with shaped femtosecond pulses"; Opt. Express 11, 1695-1701 (2003).

Paye, J.; "How to Measure the Amplitude and Phase of an Ultrashort Light Pulse with an Autocorrelator and a Spectrometer"; IEEE Journal of Quantum Electronics, vol. 30, No. 11; Nov. 1994; pp. 2693-2697.

Postnikova, B.J. et al.; "Towards nanoscale three-dimensional fabrication using two-photon intitiated polymerization and near-field excitation"; Microelectron. Eng. 69(2-4): 459-465 (Sep. 2003).

Reid, D.T. et al.; "Amplitude and phase measurement of mid-infrared femtosecond pulses by using cross-correlation frequency-resolved optical gating"; Optics Letters, vol. 25, No. 19, Oct. 1, 2000; pp. 1478-1480.

Roy, I. et al.; "Ceramic-based nanoparticles entrapping water-soluble photosensitizing drugs: A novel drug carrier system for photodynamic therapy"; J. Am. Chem. Soc. 125:7860-7865 (2003).

Sandia tests new FAA explosives—detection portal at Albuquerque International Airport; Internet publication from Safer America; Sep. 15, 1997.

ScanMail 10K—Scanna; Internet publication from Safer America; 2003.

Schreier, F. et al.; "Femtosecond pulse shaping with a stratified diffractive structure"; Optics Communications 185 (2000); pp. 227-231.

Scully, M.O.; et al.; "FAST CARS: Engineering a laser spectroscopic technique for rapid identification of bacterial spores"; PNAS; vol. 99, No. 17; Aug. 20, 2002.

Spielmann, C. et al.; "Ultrabroadband Femtosecond Lasers"; IEEE Journal of Quantum Electronics; Apr. 1994; vol. 30, No. 4; pp. 1100-1114.

Stobrawa, G. et al.; "A new high-resolution femtosecond pulse shaper"; Appl. Phys. B 72 (2001); pp. 627-630.

Sullivan, A. et al.; "Quantitative investigation of optical phase-measuring techniques for ultrashort pulse lasers"; J. Opt. Soc. Am. B, vol. 13, No. 9, Sep. 1996; pp. 1965-1978.

Sun, H.B. et al.; "Two-photon laser precision microfabrication and its applications to micro-nano devices and systems"; J. Lightwave Technol. 21(3): 624-633 (Mar. 2003).

Sweetser, John N. et al.; "Transient-grating frequency-resolved optical gating"; Apr. 15, 1997, vol. 22, No. 8; Optics Letters; pp. 519-521.

Trebino, R. et al.; "Measuring Ultrashort Laser Pulses Just Got a Lot Easier!"; Optics & Photonics News; Jun. 2001; pp. 22-25.

Trebino, Rick et al.; "Measuring ultrashort laser pulses in the time-frequency domain using frequency-resolved optical gating"; Rev. Sci. Instrum. 68 (9), Sep. 1997; pp. 3277-3295.

Trebino, Rick et al.; "The Dilemma of Ultrashort-Laser-Pulse Intensity and Phase Measurement and Applications"; IEEE Journal of Quantum Electronics, vol. 35, No. 4, Apr. 1999; pp. 418-420.

Tull, J.X. et al.; "High-Resolution, Ultrafast Laser Pulse Shaping and Its Applications"; Advances in Magnetic and Optical Resonance; vol. 20;pp. 1-65 (1997).

VandenBout, D.A. et al.; "Discrete intensity jumps and intramolecular electronic energy transfer in the spectroscopy of single conjugated polymer molecules"; Science 277, 1074-1077 (1997).

Walmsley, Ian A. et al.; "Characterization of the electric field of ultrashort optical pulses"; J. Opt. Soc. Am. B, vol. 13, No. 11; Nov. 1996; pp. 2453-2463.

Walowicz, K.A. et al.; "Multiphoton intrapulse interference 1: Control of multiphoton processes in condensed phases"; J. Phys. Chem. A 106 (41): 9369-9373 (Oct. 17, 2002).

Warren, W.S.; "Chemistry with Photons"; Science; vol. 262; Nov. 12, 1993; pp. 1008-1009.

Weinacht, T.C. et al.; "Controlling the shape of a quantum wavefunction"; Nature; Jan. 1999; vol. 397; pp. 233-235.

Weiner, A.M. et al.; "Programmable Shaping of Femtosecond Optical Pulses by Use of 128-Element Liquid Crystal Phase Modulator"; IEEE Journal of Quantum Electronics; vol. 28, No. 4; Apr. 1992; p. 908-920.

Weiner, A.M.; "Femtosecond pulse shaping using spatial light modulators"; Rev. Sci. Instrum. vol. 71(5); pp. 1929-1960 (2000).

Weiner, Andrew M. et al.; "Femtosecond Pulse Shaping for Synthesis, Processing and Time-to-Space Conversion of Ultrafast Optical Waveforms"; IEEE Journal of Selected Topics in Quantum Electronics, vol. 4, No. 2; Mar./Apr. 1998; pp. 317-331.

White, W.E. et al.; "Direct measurement of the spectral phase of femtosecond pulses"; Apr. 15, 1995, vol. 20, No. 8; Optics Letters; pp. 904-906.

Xu, C. et al.; "Two photon optical beam induced current imaging throughout backside of integrated circuits"; Appl. Phys. Lett. 71, 2578-2580 (1997).

Yan, Y.J. et al.; "Electronic dephasing, vibrational relaxation, and solvent friction in molecular nonlinear optical line shapes"; J. Chems. Phys., Oct. 15, 1988; pp. 5160-5176.

Yang, W. et al.; "High-ratio Electro-optical Data Compression for Massive Accessing Networks Using AOM-based Ultrafast Pulse Shaping"; Journal of Optical Communications; 2001; vol. 22, No. 1; pp. 694-697.

Yelin, D. et al.; "Laser scanning third-harmonic-generation microscopy in biology"; Optics Express; Oct. 11, 1999; vol. 5, No. 8; pp. 169-175.

Zeidler, D. et al.; "Adaptive compression of tunable pulses from a non-collinear-type OPA to below 16 fs by feedback-controlled pulse shaping"; Appl. Phys. B 70[Suppl.]; 2000; pp. S125-S131.

Zheng, Z. et al.; "Coherent control of second harmonic generation using spectrally phase coded femtosecond waveforms"; Chem. Phys. 267, 161-171 (2001).

Zheng, Z. et al.; "Spectral phase corelation of coded femtosecond pulses by second-harmonic generation in thick nonlinear crystals"; Opt. Lett. 25, 984-986 (2000).

Dong Gun Lee et al.; "Coherent Control of High-Order Harmonics with Chirped Femtosecond Laser Pulses"; Physical Review Letters, vol. 87, No. 24, Dec. 10, 2001; pp. 243902-1-243902-4.

M. Armstrong et al.; "Versatile seven-femtosecond pulse compressor of parametrically amplified pulses using adaptive optics: studies of the primary events in protein dynamics"; Applied Physics B 74 (Suppl), 2002; pp. S127-S132.

D.S. Chemla et al; "Ultrafast phase dynamics of coherent emission from excitons in GaAs quantum wells"; Physical Review B, vol. 50, No. 12, Sep. 15, 1995; pp. 8439-8453.

Jerome Tignon et al.; "Spectral Interferometry of Semiconductor Nanostructures"; IEEE Journal of Quantum Electronics, vol. 35, No. 4; Apr. 1999; pp. 510-522.

Arthur L. Smirl et al.; "Heavy-Hole and Light-Hole Quantum Beats in the Polarization State of Coherent Emission from Quantum Wells"; IEEE Journal of Quantum Electronics, vol. 35, No. 4; Apr. 1999; pp. 523-531.

John D. Hybl et al; "Two-dimensional Fourier transform electronic spectroscopy"; Journal of Chemical Physics, vol. 115, No. 14; Oct. 8, 2001; pp. 6606-6622.

C. Iaconis et al.; "Direct measurement of the two-point field corelation function"; Optics Letters, vol. 21, No. 21; Nov. 1, 1996; pp. 1783-1785.

A.M. Weiner et al.; "Femtosecond Pulse Sequences Used for Optical Manipulation of Molecular Motion"; Reports; Mar. 16, 1990; pp. 1317-1319.

Ch. Warmuth et al.; "Studying vibrational wavepacket dynamics by measuring fluorescence interference fluctuations"; Journal of Chemical Physics, vol. 112, No. 11; Mar. 15, 2000; pp. 5060-5069.

Ch. Warmuth et al.; "Molecular quantum dynamics in a thermal system: fractional wave packet revivals probed by random-phase fluorescence interferometry"; Journal of Chemical Physics, vol. 114, No. 22; Jun. 8, 2001; pp. 9901-9910

G.G. Paulus et al.; "Absolute-phase phenomena in photoionization with few-cycle laser pulses"; Nature, vol. 414; Nov. 8, 2001; pp. 182-184.

Yaron Silberberg; "Physics at the attosecond frontier"; Nature, vol. 414, Nov. 29, 2001; pp. 494-495.

M. Hentschel et al.; "Attosecond metrology"; Nature, vol. 414; Nov. 29, 2001; pp. 509-513.

L. Lepetit et al.; "Linear techniques of phase measurement by femtosecond spectral interferometry for applications in spectroscopy"; J. Opt. Soc. Am. B, vol. 12, No. 12; Dec. 1995; pp. 2467-2474.

L. Lepetit et al.; "Two-dimensional nonlinear optics using Fourier-transform spectral interferometry"; Optics Letters, vol. 21, No. 8; Apr. 15, 1996; pp. 564-566.

K.C. Chu et al.; "Temporal interferometric measurement of femtosecond spectral phase"; Optics Letters, vol. 21, No. 22; Nov. 15, 1996; pp. 1842-1844.

W.J. Walecki et al.; "Characterization of the polarization state of weak ultrashort coherent signals by dual-channel spectral interferometry"; Optics Letters, vol. 22, No. 2; Jan. 15, 1997; pp. 81-83.

J.P. Likforman et al.; "Measurement of photon echoes by use of femtosecond Fourier-transform Spectral Interferometry"; Optics Letters, vol. 22, No. 14; Jul. 15, 1997; pp. 1104-1106.

Michel F. Emde et al.; "Spectral interferometry as an alternative to time-domain heterodyning"; Optics Letters, vol. 22, No. 17; Sep. 1, 1997; pp. 1338-1340.

X. Chen et al.; "Temporally and spectrally resolved amplitude and phase of coherent four-wave-mixing emission from GaAs quantum wells"; Physical Review B, vol. 56, No. 15; Oct. 15, 1997; pp. 9738-9743.

Christophe Dorrer; "Influence of the calibration of the detector on spectral interferometry"; J. Opt. Soc. Am. B; vol. 16, No. 7; Jul. 1999; pp. 1160-1168.

Allison W. Albrecht et al.; "Experimental distinction between phase shifts and time delays: Implications for femtosecond spectroscopy and coherent control of chemical reactions"; Journal of Chemical Physics, vol. 111, No. 24; Dec. 22, 1999; pp. 10934-10955.

Christophe Dorrer et al.; "Spectral resolution and sampling issues in Fourier-transform spectral interferometry"; J. Opt. Soc. Am. B, vol. 17, No. 10; Oct. 2000; pp. 1795-1802.

G. Roberts; "Abstract-Interference effects in femtosecond spectroscopy"; Philosophical Transactions Of The Royal Society Of London Series A-Mathematical Physical and Engineering Sciences; 360 (1794): 987-1021; May 15, 2002 (1 page).

B. Chatel et al.; "Role of quadratic and cube spectral phases in ladder climbing with ultrashort pulses"; Physical Review A 70; 2004; pp. 053414-1-053414-10.

Michael Messina et al.; "Quantum control of multidimensional systems: Implementation within the time-dependent Hartree approximation"; J. Chem Phys. 104; Jan. 1996; pp. 173-182.

D.H. Schirrmeister et al; "Femtosecond pulse dependence of dissipation in molecular systems"; Chemical Physics Letters Dec. 4, 1998; pp. 383-390.

Herschel Rabitz et al.; "Optimal Control of Molecular Motion: Design, Implementation and Inversion"; Acc. Chem. Res., vol. 33, No. 8; 2000; pp. 572-578.

R. deVivie-Riedle et al.; "Design and interpretation of laser pulses for the control of quantum systems"; Applied Physics B; 2000; pp. 285-292.

Moshe Shapiro et al.; On the Origin of Pulse Shaping Control of Molecular Dynamics; J. Phys. Chem. A, vol. 105, No. 105; 2001; pp. 2897-2902.

Y.J. Yan et al.; "Pulse shaping and coherent Raman spectroscopy in condensed phases"; J. Chem. Phys 94 (2); Jan. 15, 1991; pp. 997-1001.

Bern Kohler et al.; "Mode-Locking Matter with Light"; J. Phys. Chem 1993, 97; pp. 12602-12608.

Jeffrey L. Krause et al.; "Optical control of molecular dynamics: Molecular cannons, reflectrons and wave-packet focusers"; J. Chem. Phys. 99(9); Nov. 1, 1993; pp. 6562-6578.

V. Engel et al; "Two-photon wave-packet interferometry"; J. Chem Phys. 100 (8); Apr. 15, 1994; pp. 5448-5458.

Jeffrey L. Krause et al.; "Quantum Control of Molecular Dynamics: The Strong Response Regime"; J. Phys. Chem; 1995, 99; pp. 13736-13747.

Jianwei Che et al.; "Detection and Control of Molecular Quantum Dynamics"; J. Phys. Chem.; 1995; pp. 14949-14958.

M. Sterling et al.; "Interrogation and control of condensed phase chemical dynamics with linearly chirped pulses: 12 in solid Kr"; J. Chem. Phys. 104; May 1, 1996; pp. 6497-6506.

Jianwei Che et al.; "Semiclassical Dynamics and Quantum Control in Condensed Phases: Application to 12 in a Solid Argon Matrix"; J. Phys. Chem. 1996, 100; pp. 7873-7883.

Jianshu Cao et al.; "A simple physical picture for quantum control of wave packet localization"; J. Chem Phys., 107; Aug. 1, 1997; pp. 1441-1450.

Kenji Mishima et al.; "A theoretical study on laser control of a molecular nonadiabatic process by ultrashort chirped laser pulses"; Journal of Chemical Physics, vol. 109., No. 5; Aug. 1, 1998; pp. 1801-1809.

H.A. Kim et al.; "Expanded concept of the adiabatic population transfer using dressed states"; Physical Review A, vol. 59, No. 2; Feb. 1999; pp. 1404-1407.

Jianshu Cao et al.; "Molecular pie pulses: Population inversion with positively chirped short pulses"; Journal of Chemical Physics, vol. 113, No. 5; Aug. 1, 2000; pp. 1898-1909.

A.J. Wurzer et al.; "Highly localized vibronic wavepackets in large reactive molecules"; Applied Phys. B 71, 2000; pp. 405-409.

F. Legare et al.; "Laser pulse control of Raman processes by chirped non-adiabatic passage"; Journal of Raman Spectroscopy; 2000; pp. 15-23.

Moshe Shapiro et al.; "Coherently Controlled Asymmetric Synthesis with Achiral Light"; Physical Review Letters, vol. 84, No. 8; Feb. 21, 2000; pp. 1669-1672.

Gabriel Turinici et al.; "Quantum wavefunction controllability"; Chemical Physics 267; 2001; pp. 1-9.

M. Gruebele; "Fully quantum coherent control"; Chemical Physics 267; 2001; pp. 33-46.

V.S. Malinovsky et al.; "General theory of population transfer by adiabatic rapid passage with intense, chirped laser pulses"; The European Physical Journal D 14; 2001; pp. 147-155.

Z.W. Shen et al.; "Selective preparation of ground state wave-packets: a theoretical analysis of femtosecond pump-dump-probe experiments on the potassium dimmer"; The European Physical Journal D 14; 2001; pp. 167-172.

Sanislav S. Bychkov et al.; "Laser coherent control of molecular chiral states via entanglement of the rotational and torsional degrees of freedom"; Journal of Raman Spectroscopy; 2002; pp. 962-973.

S.E. Harris; "Control of Feshbach resonances by quantum interference"; Physical Review A66; 2002; pp. 010701-1-010701-4.

John M. Jean et al.; "Application of a multilevel Redfield theory to electron transfer in condensed phases"; J. Chem. Phys. 96; Apr. 15, 1992; pp. 5827-5842.

Bjarne Amstrup et al.; "Control of HOD photodissociation dynamics via bond-selective infrared multiphoton excitation and a femtosecond ultraviolet laser pulse"; J. Chem. Phys., vol. 97, No. 11; Dec. 1, 1992; pp. 8285-8295.

L.D. Ziegler et al.; "Nonlinear polarization description of phase-locked pulse-pair spectroscopy"; J. Chem. Phys., vol. 97, No. 7; Oct. 1, 1992; pp. 4704-4713.

S. Meyer et al.; "Photoelectron distributions from femtosecond pump/probe excitation with chirped probe pulses"; Journal of Chemical Physics, vol. 108, No. 18; pp. 7631-7636, May 8, 1998.

V.M. Akulin et al.; "Laser Control of Atomic Motion inside Diatomic Molecules"; J. Phys. Chem. A, vol. 102, No. 23; 1998; pp. 4310-4320.

Jianshu Cao et al., "Molecular Pi Pulse for Total Inversion of Electronic State Population"; Physical Review Letters, vol. 80, No. 7; Feb. 16, 1998; pp. 1406-1409.

Moshe Shapiro et al.; "Nonadiabatic wave packet dynamics: Experiment and theory in IBr"; Journal of Chemical Physics, vol. 110, No. 5; Feb. 1, 1999; pp. 2465-2473.

Zhenwen Shen et al.; "Pump-dump control and the related transient absorption spectroscopies"; Journal of Chemical Physics, vol. 110, No. 15; Apr. 15, 1999; pp. 7192-7201.

Kenji Mishima et al.; "Theoretical study on quantum control of photodissociation and photodesorption dynamics by femtosecond chirped laser pulses"; Journal of Chemical Physics, vol. 110, No. 16; Apr. 22, 1999; pp. 7756-7769.

H.S. Moon et al.; "Coherence control using the ratio of Rabi frequencies for complete coherent inversion in a four-level system"; J. Phys. B At. Mol. Phys. vol. 32; 1999; pp. 987-999.

Jeffrey A. Cina; "Nonlinear wavepacket interferometry for polyatomic molecules"; Journal of Chemical Physics, vol. 113, No. 21; Dec. 1, 2000; pp. 9488-9496.

F. Gelmukhanov et al.; "Dynamics of two-photon absorption by molecules and solutions"; J. Opt. Soc. Am. B, vol. 19, No. 5, May 2002; pp. 937-945.

Philip H. Bucksbaum; "Ultrafast control"; Nature magazine, vol. 421; Feb. 6, 2003; pp. 593-594. Kuhn & Weyn SR2 Sep. 4, 2001.

Christopher J. Bardeen et al.; "Effec of Pulse Shape on the Efficiency of Multiphoton Processes: Implications for Biological Microscopy"; Journal of Biomedical Optics, vol. 4, No. 3; Jul. 1999; pp. 362-367.

T. Hornung et al.; "Optimal control of one- and two-photon transitions with shaped femtosecond pulses and feedback"; Applied Physics B 71; 2000; pp. 277-284.

T. Brixner et al.; "Photoselective adaptive femtosecond quantum control in the liquid phase"; Nature magazine, vol. 414; Nov. 2001; pp. 57-60.

B.J. Pearson et al.; "Coherent control using adaptive learning algorithms"; Physical Review A, vol. 63; 2001; pp. 063412-1-063412-12.

Jennifer L. Herek et al.; "Quantum control of energy flow in light harvesting"; Nature magazine, vol. 417; May 30, 2002; pp. 533-535.

Nirit Dudovich et al.; "Single-pulse coherently controlled nonlinear Raman spectroscopy and microscopy"; Nature magazine, vol. 418; Aug. 1, 2002; pp. 512-514.

Dan Oron et al.; "Single-Pulse Phase-Contrast Nonlinear Raman Spectroscopy"; Physical Review Letters, vol. 89, No. 27; Dec. 30, 2002; pp. 27300-1-273001-4.

T. Brixner et al.; "Liquid-phase adaptie femtosecond quantum control: Removing intrinsic intensity dependencies"; Journal of Chemical Physics, vol. 118, No. 8; Feb. 22, 2003; pp. 3692-3701.

R. Netz et al.; "Observation of Selectivity of Coherent Population Transfer Induced by Optical Interference"; Physical Review Letters, vol. 90, No. 6; Feb. 14, 2003; pp. 063001-1-063001-4.

D.W. Schumacher et al.; "Phase Dependence of Intense Field Ionization"; Physical Review A, vol. 54, No. 5; Nov. 1996; pp. 4271-4278.

Christopher J. Bardeen et al.; "Feedback quantum control of molecular electronic population transfer"; Chemical Physics Letters 280; 1997; pp. 151-158.

Christopher J. Bardeen et al.; "Quantum Control of Population Transfer in Green Fluorescent Protein by Using Chirped Femtosecond Pulses"; J. Am. Chem. Soc., vol. 120, No. 50; 1998; 13023-13027.

Doron Meshulach et al.; "Coherent quantum control of two-photon transitions by a femtosecond laser pulse"; Nature magazine, vol. 396; Nov. 19, 1998; pp. 239-242.

A. Baltuska et al.; "Attosecond control of electronic processes by intense light fields"; Nature magazine, vol. 421; Feb. 6, 2003; pp. 611-615.

D.J. Maas et al.; "Population transfer via adiabatic passage in the rubidium quantum ladder system"; Physical Review A, vol. 59, No. 2; Feb. 1999; pp. 1374-1381.

Zohar Amitay et al.; "Phase-tailoring molecular wave packets to time shift their dynamics"; Chemical Physics 267; 2001; pp. 141-149.

T.C. Weinacht et al.; "Coherent learning control of vibrational motion in room temperature molecular gases"; Chemical Physics Letters 344; 2001; pp. 333-338.

R. van Leeuwen et al.; "Manipulation of differential electron yields via autoionizing wave-packet control"; Physical Review A, vol. 63; 2001; pp. 033403-1-033403-5.

Dan Oron et al.; "Quantum control of coherent anti-Stokes Raman processes"; Physical Review A, vol. 65; 2002; pp. 043408-1-043408-4.

Nirit Dudovich et al.; "Coherent Transient Enhancement of Optically Induced Resonant Transitions"; Physical Review Letters, vol. 88, No. 12; Mar. 25, 2002; pp. 123004-1-123004-4.

Jerome Degert et al.; "Realization of a Time-Domain Fresnel Lens with Coherent Control"; Physical Review Letters, vol. 89, No. 20; Nov. 11, 2002; pp. 203003-1-203003-4.

M. Wollenhaupt et al.; "Interferences of Ultrashort Free Electron Wave Packets"; Physical Review Letters, vol. 89, No. 17; Oct. 21, 2002; pp. 173001-1-173001-4.

R. Teets et al.; "Coherent Two-Photon Excitation by Multiple Light Pulses"; Physical Review Letters, vol. 38, No. 14; Apr. 4, 1977; lags. 760-764.

R.R. Jones; "Multiphoton Ionization Enhancement Using Two Phase-Coherent Laser Pulses"; Physical Review Letters, vol. 75, No. 8; Aug. 21, 1995; pp. 1491-1494.

D.J. Maas et al.; "Vibrational ladder climbing in NO by ultrashort infrared laser pulses"; Chemical Physics Letters 270; May 16, 1997; pp. 45-49.

Christopher J. Bardeen et al.; "Quantum control of I2 in the gas phase and in condensed phase solid Kr matrix"; J. Chem. Phys., vol. 106, No. 20; May 22, 1997; pp. 8486-8503.

D.J. Maas et al.; "Vibrational ladder climbing in NO by (sub)picosecond frequency-chirped infrared laser pulses"; Chemical Physics Letters 290; 1998; pp. 75-80.

Vladislav V. Yakovlev et al.; "Chirped pulse enhancement of multiphoton absorption in molecular iodine"; Journal of Chemical Physics, vol. 108, No. 6, Feb. 8, 1998; pp. 2309-2313.

Radoslaw Uberna et al.; "Phase and amplitude control in the formation and detection of rotational wave packets in the E1Eg state of Li2"; Journal of Chemical Physics, vol. 108, No. 22; pp. 9259-9274, Jun. 8, 1998.

John M. Papanikolas et al.; "Erratum: Manipulation of rovibrational wave packet composition in the Li2 E(Eg) shelf state using intermediate state selection and shaped femtosecond laser pulses"; J. Chem. Phys. 107, 4172; 1997; p. 10830.

T.C. Weinacht et al.; "Measurement of the Amplitude and Phase of a Sculpted Rydberg Wave Packet"; Physical Review Letters; vol. 80, No. 25; Jun. 22, 1998; pp. 5508-5511.

Radoslaw Uberna et al.; "Phase control of wavepacket dynamic using shape femtosecond pulses"; Faraday Discuss, vol. 113; 1999; pp. 385-400.

T.C. Weinacht et al.; "Toward Strong Field Mode-Selective Chemistry"; J. Phys. Chem. A, vol. 103, No. 49; 1999; pp. 10166-10168.

Mohamed Aziz Bouchene et al.; "Wavepacket interferometry with chirped pulses"; J. Phys. B At. Mol. Opt. Phys. 32; 1999; pp. 5167-5177.

D.J. Maas et al.; "Rotational interference in vibrational ladder climbing in NO by chirped infrared laser pulses"; Physical Review A, vol. 60, No. 2; Aug. 1999; pp. 1351-1362.

R. van Leeuwen et al.; "Coherent Control of the Energy and Angular Distribution of Autoionized Electrons"; Physical Review Letters, vol. 82, No. 14; Apr. 5, 1999; pp. 2852-2855.

Celine Nicole et al.; "Saturation of wave-packet interferences: Direct observation of spin precession in potassium atoms"; Physical Review A, vol. 60, No. 3; Sep. 1999; pp. R1755-R1758.

Mohamed Aziz Bouchene et al.; "Interplay between wave packet interferences and second harmonic generation"; Optics Communications 181; 2000; pp. 327-336.

Radoslaw Uberna et al.; "Ultrafast spectroscopy of wavelength-dependent coherent photoionization cross sections of Li2 wave packets in the E1Eg state: The role of Rydberg states"; Journal of Chemical Physics, vol. 114, No. 23; Jun. 15, 2001; pp. 10311-10320.

Lorenzo Pesce et al.; "Quantum dynamics simulation of the ultrafast photoionization of Li2"; Journal of Chemical Physics, vol. 114, No. 3; Jan. 15, 2001; pp. 1259-1271.

M.F. DeCamp et al.; "Dynamics and coherent control of high-amplitude optical phonons in bismuth"; Physics Review B, vol. 64; 2001; pp. 092301-1-092301-3.

J. Ahn et al.; "Quantum Phase Retrieval of a Rydberg Wave Packet Using a Half-Cycle Pulse"; Physical Review Letters, vol. 86, No. 7; Feb. 12, 2001; pp. 1179-1182.

Sebastien Zamith et al.; "Observation of Coherent Transients in Ultrashort Chirped Excitation of an Undamped Two-Level System"; Physical Review Letters, vol. 87, No. 3; Jul. 16, 2001; pp. 033001-1-033001-4.

Hans U. Stauffer et al.; "Simultaneous phase control of Li2 wave packets in two electronic states"; Journal of Chemical Physics, vol. 116, No. 3. Jan. 15, 2002; pp. 946-954.

Joshua B. Ballard et al.; "Optimization of wave packet coefficients in Li 2 using an evolutionary algorithm: The role of resonant and nonresonant wavelengths"; Journal of Chemical Physics, vol. 116, No. 4; Jan. 22, 2002; pp. 1350-1360.

Elizabeth Mirowski et al.; "Effect of nonresonant frequencies on the enhancement of quantum beat amplitudes in rovibrational states of Li2: The role of state spacing"; Journal of Chemical Physics, vol. 117, No. 24; Dec. 22, 2002; pp. 11228-11238.

S.N. Pisharody et al.; "Phase-controlled stair-step decay of autoionizing radial wave packets"; Physical Review A, vol. 65; 2002; pp. 033418-1-033418-10.

R. Netz et al.; "Coherent population dynamics of a three-level atom in spacetime"; Physical Review A, vol. 65; pp. 043406-1-043406-12, (2000).

Joshua B. Ballard et al.; "Simultaneous control of time-dependent population transfer dynamics and wave-packet quantum interferences in Li2 by shaped ultrafast pulses"; Physical Review A 66; 2002; pp. 043402-1-043402-7.

Dan Oron et al.; "Narrow-Band Coherent Anti-Stokes Raman Signals from Broad-Band Pulses"; Physical Review Letters, vol. 88, No. 6; Feb. 11, 2002; pp. 063004-1-063004-4.
M.M. Salour et al.; "Observation of Ramsey's Interference Fringes in the Profile of Doppler-Free Two-Photon Resonances"; Physical Review Letters, vol. 38, No. 14; Apr. 4, 1977; pp. 757-760.
N.F. Scherer et al.; "Time resolved dynamics of isolated molecular systems studied with phase-locked femtosecond pulse pairs"; J. Chem Phys. vol. 93, No. 1; Jul. 1, 1990; pp. 856-857.
J.S. Melinger et al.; "Adiabatic population inversion in I2 vapor with picosecond laser pulses"; J. Chem Phys. vol. 95, No. 3; Aug. 1, 1991; pp. 2210-2213.
J.J. Gerdy et al.; "Femtosecond selective control of wave packet population"; Chemical Physics Letters, vol. 171, No. 1/2; Jul. 27, 1990; pp. 1-4.
Norbert F. Scherer et al.; "Fluorescence-detected wave packet interferometry: Time resolved molecular spectroscopy with sequences of femtosecond phase-locked pulses"; J. Chem. Phys., vol. 95, No. 3; Aug. 1, 1991; pp. 1487-1511.
N.F. Scherer et al.; "Fluorescence-detected wave packet interferometry. II. Role of rotations and determination of the susceptibility"; J. Chem. Phys., vol. 96, No. 6; Mar. 15, 1992; pp. 4180-4194.
L.D. Noordam et al.; "Redistribution of Rydberg States by Intense Picosecond Pulses"; Physical Review Letters, vol. 68, No. 10; Mar. 9, 1992; pp. 1496-1499.
J.S. Melinger et al.; "Generation of Narrowband Inversion with Broadband Laser Pulses"; vol. 68, No. 13; Mar. 30, 1992; pp. 2000-2003.
B. Broers et al.; "Efficient Population Transfer in a Three-Level Ladder System by Frequency-Swept Ultrashort Laser Pulses"; Physical Review Letters, vol. 69, No. 14; Oct. 5, 1992; pp. 2062-2065.
R.R. Jones et al.; "Ramsey Interference in Strongly Driven Rydberg Systems"; Physical Review Letters, vol. 71, No. 16; Oct. 18, 1993; pp. 2575-2578.
J.F. Christian et al.; "Rubidium electronic wavepackets probed by a phase-sensitive pump-probe technique"; Optics Communications, vol. 103, No. 1/2; Nov. 1, 1993; pp. 79-84.
J.S. Melinger et al.; "Adiabatic population transfer with frequency-swept laser pulses"; J. Chem. Phys. vol. 101, No. 8; Oct. 15, 1994; pp. 6439-6454.
P. Balling et al.; "Interference in climbing a quantum ladder system with frequency-chirped laser pulses"; Physical Review A, vol. 50, No. 5; Nov. 1994; pp. 4276-4285.
D.W. Schumacher et al.; "Phase Dependence of Intense Field Ionization: A Study Using Two Colors"; Physical Review Letters, vol. 73, No. 10; Sep. 5, 1994; pp. 1344-1347.
L. Marmet et al.; "Observation of Quasi-Landau Wave Packets"; Physical Review Letters, vol. 72, No. 24; Jun. 13, 1994; pp. 3779-3782.
Valerie Blanchet et al.; "One-color coherent control in Cs2 Observation of 2.7 fs beats in the ionization signal"; Chemical Physics Letters, vol. 233; Feb. 25, 1995; pp. 491-499.
R.R. Jones et al.; "Bound-state interferometry using incoherent light"; J. Phys. B. 28 At. Mol. Opt. Phys.; 1995; pp. L405-L411.
D.W. Schumacher et al.; "Programmable cesium Rydberg wave packets"; Physical Review A, vol. 52, No. 6; Dec. 1995; pp. 4719-4726.
R.R. Jones; "Interference Effects in the Multiphoton Ionization of Sodium"; Physical Review Letters, vol. 74, No. 7; Feb. 13, 1995; pp. 1091-1094.
Bern Kohler et al.; "Quantum Control of Wave Packet Evolution with Tailored Femtosecond Pulses"; Physical Review Letters, vol. 74, No. 17; Apr. 24, 1995; pp. 3360-3363.
M. Ovchinnikov et al.; "Quantum interference in resonant Raman spectra of I2 in condensed media"; J. Chem. Phys., vol. 106, No. 13; Apr. 1, 1997; pp. 5775-5778.
Richard M. Williams et al.; "Compositional control of rovibrational wave packets in the E(1 Eg) "shelf" state of Li2 via quantum-state-resolved intermediate state selection"; J. Chem. Phys. vol. 106, No. 20; May 22, 1997; pp. 8310-8323.
John M. Papanikolas et al.; "Manipulation of rovibrational wave packet composition in the Li2 E(1Eg) shelf state using intermediate state selection and shaped femtosecond laser pulses"; J. Chem. Phys., vol. 107, No. 11; Sep. 15, 1997; pp. 4172-4178.
Valerie Blanchet et al.; "Temporal Coherent Control in Two-Photon Transitions: From Optical Interferences to Quantum Interferences"; Physical Review Letters, vol. 78, No. 14; Apr. 7, 1997; pp. 2716-2719.
R. Zadoyan et al.; "Wavepacket diagnosis with chirped probe pulses"; Chemical Physics, vol. 233; 1998; pp. 353-363.
M.A. Bouchene et al.; "Temporal coherent control induced by wave packet interferences in one and two photon atomic transitions"; The European Physical Journal D, vol. 2; 1998; pp. 131-141.
Valerie Blanchet et al.; "Temporal coherent control in the photoionization of Cs2: Theory and experiment"; Journal of Chemical Physics, vol. 108, No. 12; Mar. 22, 1998; pp. 4862-4876.
R.A. Bartels et al.; "Nonresonant Control of Multimode Molecular Wave Packets at Room Temperature"; Physical Review Letters, vol. 88, No. 3; Jan. 21, 2002; pp. 033001-1 through 033001-4.
T. Brixner et al.; "Abstract- Femtosecond quantum control"; Advances In Atomic, Molecular, And Optical Physics, vol. 46; 46: 1-54; 2001 (1 page).
T. Brixner et al.; "Abstract-Photoselective adaptive femtosecond quantum control in the liquid phase"; NATURE; 414 (6859): 57-60; Nov. 1, 2001 (1 page).
B. Dayan et al.; "Coherent control with broadband squeezed vacuum"; arXiv:quant-ph/0302038 v1; Feb. 5, 2003 (4 pages).
B. Dayan et al.; "Two Photon Absorption and Coherent Control with Broadband Down-Converted Light"; Physical Review Letters, vol. 93, No. 2; Jul. 9, 2004; pp. 023005-1-023005-4.
B. Dayan et al.; "Nonlinear Interactions with an Ultrahigh Flux of Broadband Entangled Photons"; Physical Review Letters, PRL 94; Feb. 4, 2005, 2004; pp. 043602-1-043602-4.
N. Dudovich et al.; "Single-pulse coherent anti-Stokes Raman spectroscopy in the fingerprint spectral region"; J. of Chem. Phys., vol. 118, No. 20; May 22, 2003; pp. 9208-9215.
D. Oron et al.,; "Femtosecond Phase-and-Polariation Control for Background-Free Coherent Anti-Stokes Raman Spectroscopy"; Physical Review Letters, vol. 90, No. 91; May 30, 2003; pp. 213902-1-213902-4.
N. Dudovich et al.; "Quantum Control of the Angular Momentum Distribution in Multiphoton Absorption Processes"; Physical Review Letters, vol. 93, No. 10; Mar. 12, 2004; pp. 103003-1-103003-4.
D. Oron et al.,; "All-optical processing in coherent nonlinear spectroscopy"; Physical Review A 70; 2004; pp. 023415-1-023415-4.
J.G. Underwood et al.,; "Switched Wave Packets: A Route to Nonperturbative Quantum Control"; Physical Review Letters, vol. 90, No. 22; Jun. 6, 2003; pp. 223001-1-223001-4.
M. Renard et al.; "Controlling ground-state rotational dynamics of molecules by shaped femtosecond laser pulses"; Physical Review A 69; 2004; 043401-1-043401-6.
A. Powe et al.; "Molecular Fluorescence, Phosphorescence, and Chemiluminescence Spectrometry"; Anal. Chem., vol. 76, No. 15; Aug. 15, 2004; pp. 4614-4634.
D. Abramavicius et al.; "Disentangling multidimensional femtosecond spectra of excitons by pulse shaping with coherent control"; J. of Chem. Phys., vol. 120, No. 18; May 8, 2004; pp. 8373-8378.
M.C. Chen et al.; "Coherent control multiphoton processes in semiconductor saturable Bragg reflector with freezing phase algorithm"; Appl. Phys. B. 80; 2005; pp. 333-340.
W. Wohlleben et al.; "Coherent Control for Spectroscopy and Manipulation of Biological Dynamics"; Chem. Phys. Chem., 6; 2005; pp. 850-857.
T. Okada et al.; "Optical control of two-photon excitation efficiency of β-perylene crystal by pulse shaping"; Amer. Inst. of Phys., vol. 121, No. 13; Oct. 1, 2004; pp. 6386-6391.
V. Prokhorenko et al.; "Coherent control of the population transfer in complex sovated molecules at weak excitation. An experimental study"; The J. of Chem. Phys., 122; 2005; 184502-1-184502-11.
A. Prakelt et al.; "Phase control of two-photon transition with shaped femtosecond laser-pulse sequences"; Physical Review A 70; 2004; pp. 063407-1-06407-10.

B.J. Pearson et al.; "Control of Raman Lasing in the Nonimpulsive Regime"; Physical Review Letters, vol. 92, No. 24; Jun. 18, 2004; pp. 243003-1-243003-4.

Derryck T. Reid; "Algorithm for Complete and Rapid Retrieval of Ultrashort Pulse Amplitude and Phase from a Sonogram"; IEEE Journal of Quantum Electronics; vol. 35, No. 11, Nov. 1999; pp. 1584-1589.

I.G. Cormack et al.; "Rapid measurement of ultrashort-pulse amplitude and phase from a two-photon absorption sonogram trace"; J. Opt. Soc. Am. B; vol. 18, No. 9, Sep. 2001; pp. 1377-1382.

E. Tokunaga et al.; "Frequency-domain interferometer for femtosecond time-resolved phase spectroscopy"; Optics Letters, vol. 17, No. 16; Aug. 15, 1992, pp. 1131-1133.

Victor Wong et al.; "Analysis of ultrashort pulse-shape measurement using linear interferometers"; Optics Letters, vol. 19, No. 4; Feb. 15, 1994; pp. 287-289.

Victor Wong et al.; "Linear filter analysis of methods for ultrashort-pulse-shape measurements"; J. Opt.Soc. Am. B, vol. 12, No. 8; Aug. 1995; pp. 1491-1499.

David M. Jonas et al.; "Femtosecond Wavepacket Spectroscopy: Influence of Temperature, Wavelength and Pulse Duration"; J. Phys. Chem.; 1995; pp. 2594-2608.

J. Peatross et al.; "Temporal decorrelation of short laser pulses"; J. Opt. Soc. Am. B, vol. 15, No. 1; Jan. 1998; pp. 216-222.

McGraw-Hill Encyclopedia Of Science & Technology, 6th Ed.; "Mass spectrometry"; 1987; pp. 492-502 (12 pages).

Ocean Optics Inc.; "HR4000 High-resolution Spectrometer" http://oceanoptics.com/products/hr4000.asp; Jun. 25, 2005 (p. 1 of 4-p. 4 of 4).

Ocean Optics Inc.; "USB2000 Miniature Fiber Optic Spectrometer" http://oceanoptics.com/products/usb2000.asp; Jun. 25, 2005 (p. 1 of 7-p. 6 of 7).

Ocean Optics Inc.; "S2000 Miniature Fiber Optic Spectrometer" http://oceanoptics.com/products/s2000.asp; Jun. 25, 2005 (p. 1 of 4-p. 4 of 4).

Kovtoun et al.; "Mass-correlated pulsed extraction: theoretical analysis and implementation with a linear matrix-assisted laser desorption/ionization time of flight mass spectrometer"; Journal of the American Society for Mass Spectrometry, Elsevier Science Inc.; vol. 11, No. 10; Oct. 2000; pp. 841-853.

M. Schurenberg et al.; "Abstract-Laser desorption/ionization mass spectrometry of peptides and proteins with particle suspension matrixes"; Analytical Chemistry; 71 (1):221-229; Jan. 1, 1999 (1 page).

F. Hillenkamp et al.;"Abstract-Matrix-assisted laser desorption/ionisation, an experience"; International Journal Of Mass Spectrometry; 200 (1-3); 71-77; Dec. 25, 2000 (1 page).

K.D. Belfield et al.; "Multiphoton-absorbing organic materials for microfabrication, emerging optical applications and non-destructive three-dimensional imaging"; J. of Phys. Organic Chem., 13; 2000; pp. 837-849.

Mitra et al.; "Nonlinear Limits to the Information Capacity of Optical Fibre Communications"; Nature, vol. 411; Jun. 28, 2001; pp. 1027-1030.

B. Natarajan et al.; "Abstract-Innovative pulse shaping for high-performance wireless TDMA"; IEEE Communications Letters; 5 (9): 372-374; Sep. 2001 (1 page).

A. Pe're et al.; Optical Code-Division Multiple Access Using Broad-Band Parametrically Generated Light; J. of Lightwave Tech.; vol. 22, No. 6; Jun. 2004; pp. 1463-1471.

J.J. Garcia-Ripoll et al.; "Speed Optimized Two-Qubit Gates with Laser Coherent Control Techniques for Ion Trap Quantum Computing"; Physical Review Letters, vol. 91, No. 15; Oct. 10, 2003; pp. 157901-1-157901-4.

J. Ahn et al.; "Information Storage and Retrieval Through Quantum Phase"; Science Magazine, vol. 287; Jan. 21, 2000; pp. 463-465.

Greg Taft et al.; "Measurement of 10-fs Laser Pulses"; IEEE Journal of Selected Topics in Quantum Electronics, vol. 2, No. 3, Sep. 1996; pp. 575-585.

Daniel J. Kane et al.; "Simultaneous measurement of two ultrashort laser pulses from a single spectrogram in a single shot"; Optical Society of America; vol. 14, No. 4; Apr. 1997; pp. 935-943.

Peter J. Delfyett et al.; "Joint Time-Frequency Meaurements of Mode-Locked Semiconductor Diode Lasers and Dynamics Using Frequency-Resolved Optical Gating"; IEEE Journal of Quantum Electronics, vol. 35, No. 4, Apr. 1999; pp. 487-500.

David N. Fittinghoff et al.; "Frequency-Resolved Optical Gating Measurement of Ultrashort Pulses Passing Through a High Numerical Aperture Objective"; IEEE Journal of Quantum Electronics, vol. 35, No. 4, Apr. 1999; pp. 479-486.

Andrius Baltuska et al.; "Second-Harmonic Generation Frequency-Resolved Optical Gating in the Single-Cycle Regime"; IEEE Journal of Quantum Electronics, vol. 35, No. 4, Apr. 1999; pp. 459-478.

Hilary K. Eaton et al.; "Investigating Nonlinear Femtosecond Pulse Propagation with Frequency-Resolved Optical Gating"; IEEE Journal of Quantum Electronics, vol. 35, No. 4, Apr. 1999; pp. 451-458.

Craig W. Siders et al.; "Multipulse Interferometric Frequency-Resolved Optical Gating"; IEEE Journal of Quantum Electronics, vol. 35, No. 4, Apr. 1999; pp. 432-440.

Atsushi Yabushita et al.; "SHG FROG and XFROG methods for phase/intensity characterization of pulses propagated through an absorptive optical medium"; Optics Communications; Oct. 15, 2001; pp. 227-232.

Roger G.M.P. Koumans et al.; "Time-Resolved Optical Gating Based on Dispersive Propagation: A New Method to Characterize Optical Pulses"; IEEE Journal of Quantum Electronics, vol. 36, No. 2, Feb. 2000; pp. 137-144.

Daniel J. Kane et al.; "Convergence test for inversion of frequency-resolved optical gating spectrograms"; Optics Letters, vol. 25, No. 16, Aug. 15, 2000; pp. 1216-1218.

Julie A. Gruetzmacher et al.; "Time and Frequency-Gated FID: a New Approach to Study the Vibrational Dephasing of Water"; Ultrafast Phenomena XII, 66; pp. 530-532.

Juan L.A. Chilla et al.; "Analysis of a Method of Phase Measurement of Ultrashort Pulses in the Frequency Domain"; IEEE Journal of Quantum Electronics, vol. 27, No. 5, May 1991; pp. 1228-1235.

David N. Fittinghoff et al.; "Noise sensitivity in frequency-resolved optical-gating measurements of ultrashort pulses"; J. Opt. Soc. Am. B, vol. 12, No. 10, Oct. 1995; pp. 1955-1967.

Noriaki Tsurumachi et al.; "Interferometric observation of femtosecond free induction decay"; Optics Letters, vol. 19, No. 22, Nov. 15, 1994; pp. 1867-1869.

C. Dorrer et al.; "Characterization of chirped-pulse amplification systems with spectral phase interferometry for direct electric-field reconstruction"; Applied Physics B 70 (Suppl.), 2000; pp. S77-S84.

C. Radzewicz et al.; "A poor man's FROG"; Optics Communications, Dec. 15, 2000; pp. 329-333.

C. Dorrer et al.; "Spatio-temporal characterization of the electric field of ultrashort optical pulses using two-dimensional shearing interferometry"; Applied Physics B74 (Suppl.), 2002; pp. S209-S217.

K.H. Hong et al.; "Time-frequency analysis of chirped femtosecond pulses using Wigner distribution function"; Applied Physics B74 (Suppl), 2002; pp. S231-S236.

Christophe Dorrer et al.; "Accuracy criterion for ultrashort pulse characterization techniques: application to spectral phase interferometry for direct electric field reconstruction"; Appl. Phys. B 74, vol. 19, No. 5, May 2002 ; pp. 1019-1029.

Kazunori Naganuma et al; "General Method for Ultrashort Light Pulse Chirp Measurement"; IEEE Journal of Quantum Electronics, vol. 25, No. 5; Jun. 1989; pp. 1225-1233.

Y. Ding et al.; "Time-Domain Image Processing Using Dynamic Holography"; IEEE Journal of Selected Topics in Quantum Electronics, vol. 4, No. 2; Mar./Apr. 1998; pp. 332-341.

Chris Iaconis et al; "Self-Referencing Spectral Interferometry for Measuring Ultrashort Optical Pulses"; IEEE Journal of Quantum Electronics, vol. 35, No. 4; Apr. 1999; pp. 501-509.

Jung-Ho Chung et al.; "Ambiguity of Ultrashort Pulse Shapes Retrieved From the Intensity Autocorrelation and the Power Spectrum"; IEEE Journal on Selected Topics of Quantum Electronics, vol. 7, No. 4; Jul./Aug. 2001; pp. 656-666.

V. Kabelka et al.; "Time-frequency imaging of a single ultrashort light pulse from anularly resolved autocorrelation"; Optics Letters, vol. 20, No. 1; Jun. 1, 1995; pp. 1301-1303.

Paul R. Bolton et al.; "Propagation of intense, ultrashort laser pulses through metal vapor: refraction-limited behavior for single pulses"; J. Opt. Soc. Am. B, vol. 13, No. 2; Feb. 1996; pp. 336-346.

June-Koo Rhee et al.; "Real-time dispersion analyzer of femtosecond laser pulses with use of a spectrally and temporally resolved upconversion technique"; J. Opt. Soc. Am. B, vol. 13, No. 8; Aug. 1996; pp. 1780-1785.

Marco A. Krumbugel et al.; "Direct ultrashort-pulse intensity and phase retrieval by frequency-resolved optical gating and a computational neural network"; Optics Letters, vol. 21, No. 2; Jan. 15, 1996; pp. 143-145.

David N. Fittinghoff et al.; "Measurement of the intensity and phase of ultraweak, ultrashort laser pulses"; Optics Letters, vol. 21, No. 12; Jun. 15, 1996; pp. 884-886.

T. Feurer et al.; "Measuring the temporal intensity of ultrashort laser pulses by triple correlation"; Appl. Phys. B; 1998; pp. 163-168.

Alfred Kwok et al.; "Frequency-Resolved Optical Gating Using Cascaded Second-Order Nonlinearities"; Journal of Selected Topics in Quantum Electronics, vol. 4, No. 2; Mar./Apr. 1998; pp. 271-277.

Daniel J. Kane; "Real-Time Measurement of Ultrashort Laser Pulse Using Principal Component Generalized Projection"; IEEE Journal of Selected Topics in Quantum Electronics; vol. 4, No. 2; Mar./Apr. 1998; pp. 278-284.

Scott A. Diddams et al.; "Characterizing the Nonlinear Propagation of Femtosecond Pulses in Bulk Media"; IEEE Journal of Selected Topics in Quantum Electronics, vol. 4, No. 2; Mar./Apr. 1998; pp. 306-316.

Michael J. Stimson et al.; "Noisy-light correlation functions by frequency resolved optical gating"; J. Opt. Soc. Am. B, vol. 15, No. 2; Feb. 1998; pp. 505-514.

J. W. Nicholson et al.; "Full-field characterization of femtosecond pulses by spectrum and cross-correlation measurements"; Optics Letters, vol. 24, No. 23; Dec. 1, 1999; pp. 1774-1776.

F. Romstad et al.; "Measurement of Pulse Amplitude and Phase Distortion in a Semiconductor Optical Amplifier: from Pulse Compression to Breakup"; IEEE Photonics Technology Letters, vol. 12, No. 12; Dec. 2000; pp. 1674-1676.

Tzu-Ming Liu et al.; "Triple-optical autocorrelation for direct optical pulse-shape measurement"; Applied Physics Letters, vol. 81, No. 8; Aug. 19, 2002; pp. 1402-1404.

Yoshihiro Takagi et al.; "Multiple- and single-shot autocorrelator based on two-photon conductivity in semiconductors"; Optics Letters, vol. 17, No. 9; May 1, 1992; pp. 658-660.

Thomas J. Dunn et al.; "Experimental Determination of the Dynamics of a Molecular Nuclear Wave Packet via the Spectra of Spontaneous Emission"; Physical Review Letters, vol. 70, No. 22; May 31, 1993; pp. 3388-3391.

A.N. Naumov et al.; "Frequency-time and time-space mappings for single-shot coherent four-wave mixing with chirped pulses and broad beams"; Journal of Raman Spectroscopy, 2001; pp. 960-970.

E.T.J. Nibbering et al.; "Spectral determination of the amplitude and the phase of intense ultrashort optical pulses"; J. Opt. Soc. Am. B, vol. 13, No. 2; Feb. 1996; pp. 317-329.

Victor Wong et al.; "Ultrashort-pulse characterization from dynamic spectrograms by iterative phase retrieval"; J. Opt. Soc. Am. B, vol. 14, No. 4; Apr. 1997; pp. 944-949.

Sarah M. Gallagher et al.; "Heterodyne detection of the complete electric field of femtosecond four-wave mixing signals"; J. Opt. Soc. Am. B, vol. 15, No. 8; Aug. 1998; pp. 2338-2345.

C. Dorrer et al.; "Single-shot real-time characterization of chirped-pulse amplification systems by spectral phase interferometry for direct electric-field reconstruction"; Optics Letters, vol. 24, No. 22; Nov. 15, 1999; pp. 1644-1646.

C. Dorrer; "Implementation of spectral phase interferometry for direct electric-field reconstruction with a simultaneously recorded reference interferogram"; Optics Letters, vol. 24, No. 21; Nov. 1, 1999; pp. 1532-1534.

C.Y. Chien et al.; "Single-shot chirped-pulse spectral interferometry used to measure the femtosecond ionization dynamics of air"; Optics Letters, vol. 25, No. 8; Apr. 15, 2000; pp. 578-580.

J.W. Nicholson et al.; "Unbalanced third-order correlations for full characterization of femtosecond pulses"; Optics Letters, vol. 25, No. 24; Dec. 15, 2000; pp. 1801-1803.

Sergey Yeremenko et al.; "Frequency-resolved pump-probe characterization of femtosecond infrared pulses"; Optics Letters, vol. 27, No. 13; Jul. 1, 2002; pp. 1171-1173.

J. M. Dudley, et al.; "Direct measurement of pusle distortion near the zero-disperson wavelength in an optical fiber by frequency-resolved optical gating"; Optics Letters, vol. 22, No. 7; Apr. 1, 1997; 457-459.

M.C. Chen et al.; "Freezing phase scheme for fast adaptive control and its application to characterization of femtosecond coherent optical pulses reflected from semiconductor saturable absorber mirrors"; J. Opt. Soc. Am. B, vol. 22, No. 5; May 2005; pp. 1134-1142.

I. Amat-Roldan et al.; "Measurement of electric field by interferometric spectral trace observation"; Optics Letters, vol. 30, No. 9; May 1, 2005; pp. 1063-1065.

I. Amat-Roldan et al.; "Starch-based second-harmonic-generated colinear frequency-resolved optical gating pulse characterization at the focal plane of a high-numerical-aperture lens"; Optics Letters, vol. 29, No. 19; Oct. 1, 2004; pp. 2282-2284.

Gregory D. Goodno et al.; "Ultrafast heterodyne-detected transient-grating spectroscopy using diffractive optics"; Optical Society of America, vol. 15, No. 6, Jun. 1998; pp. 1791-1794.

L. Misoguti et al.; "Generation of Broadband VUV Light Using Third-Order Cascaded Processes"; Physical Review Letters, vol. 87, No. 1, Jul. 2, 2001; pp. 013601-1-013601-4.

D. Zeidler et al.; "Amplification of tailored white-light continuum"; Applied Physics, B74 (Suppl), 2002; pp. S51-S56.

T. Brixner et al.; "Generation and characterization of polarization-shaped femtosecond laser pulses"; Applied Physics B74 (Suppl), 2002; pp. S133-S144.

Jeffrey L. Krause et al.; "Creating and Detecting Shaped Rydberg Wave Packets"; Physical Review Letters, vol. 79, No. 25; Dec. 22, 1997; pp. 4978-4981.

S. Backus et al.; "16-fs, 1-µ J ultraviolet pulses generated by third-harmonic conversion in air"; Optics Letters, vol. 21, No. 9; May 1, 1996; pp. 665-667.

Julie A. Gruetzmacher et al.; "Few-cycle mid-infrared pulse generation, characterization and coherent propagation in optically dense media"; Review of Scientific Instruments, vol. 73, No. 6; Jun. 2002; pp. 2227-2233.

T. Kobayashi et al.; "Tunable visible and near-infrared pulse generator in a 5 fs regime"; Appl. Phys. B 70 (Suppl); 2000; pp. S239-S246.

A. Poppe et al; "Few-cycle optical waveform synthesis"; Applied Physics B 72; 2001; pp. 373-376.

Peifang Tian et al.; "Ultrafast measurement of two-photon absorption by loss modulation"; Optics Letters, vol. 27, No. 18; Sep. 15, 2002; pp. 1634-1636.

M. Hentschel et al.; "Generation of 0.1-TW optical pulses with a single-stage Ti:sapphire amplifier at a 1-kHz repetition rate"; Appl. Phys. B 70 [Suppl.]; 2000; pp. S161-S164.

Zipfel, W.R. et al.; "Nonlinear magic: multiphoton microscopy in the biosciences"; Natire Biotechnology, 121 (11); Nov. 2003; pp. 1369-1377.

Larsen, D.R. et al.; "Water soluable quantum dots for multiphoton imaging in vivo"; Science 300; May 30, 2003; pp. 1435-1436.

Photogen Technologies, Inc., "Photogen-Technology"; www.photogen.com/body/tech_body.html; Dec. 20, 2001 (19 pages).

W.M. Sharman et al.; "Photodynamic therapeutics: basic principles and clinical applications"; DDT, vol. 4, No. 11; Nov. 1991; pp. 507-517.

Allison Albrecht Ferro et al.; "Complete femtosecond linear free induction decay, Fourier algorithm for dispersion relations and accuracy of the rotating wave approximation"; Journal of Chemical Physics, vol. 114, No. 10; Mar. 8, 2001; pp. 4649-4656.

J.P. Ogilvie et al.; "Fourier transform measurement of two-photon excitation spectra: applications to microscopy and optimal control"; Optics Letters, vol. 30, No. 8; Apr. 15, 2005; pp. 911-913.

Sharman, W.M. et al.; "Targeted photodynamic therapy via receptor mediated delivery systems"; Adv. Drug Delivery Rev. 56(1); Jan. 2004; pp. 53-76.

D. Lalovic et al.; "Quantum mechanics in terms of non-negative smoothed Wigner functions"; Physical Review A, vol. 46, No. 3; Aug. 1, 1992; pp. 1206-1212.

Christopher J. Bardeen et al.; "Using time-dependent rate equations to describe chirped pulse excitation in condensed phases"; Chemical Physics Letters 302; 1999; pp. 405-410.

Yu-Chen Shen et al.; "What can short-pulse pump-probe spectroscopy tell us about Franck Condon dynamics?"; Journal of Chemical Physics, vol. 110. No. 20; May 22, 1999; pp. 9793-9806.

M. Ovchinnikov et al.; "Semiclassical molecular dynamics computation of spontaneous light emission in the condensed phase: Resonance Raman spectra"; Journal of Chemical Physics, vol. 114, No. 16; Apr. 22, 2001; pp. 7130-7143.

S. Yeremenko et al.; "The criterion of pulse reconstruction quality based on Wigner representation"; Applied Physics B 70 (Suppl); 2000; pp. S109-S117.

David C. Clary; "Quantum Theory of Chemical Reaction Dynamics"; Science, vol. 279, Mar. 20, 1998; p. 1879.

B.D. Fainberg; "Diagram Technique for Nonlinear Optical Spectroscopy in the Fast Electronic Dephasing Limit"; Journal of the Chinese Chemical Society, 47; 2000; pp. 579-582.

Chantal Daniel et al.; "Deciphering the Reaction Dynamics Underlying Optimal Control Laser Fields"; Science Magazine, vol. 299; Jan. 24, 2003; pp. 536-539.

T. Witte et al.; "Controlling molecular ground-state dissociation by optimizing vibrational ladder climbing"; Journal of Chemical Physics, vol. 118, No. 5; Feb. 1, 2003; pp. 2021-2024.

R.J. Levis et al.; "Closing the Loop on Bond Selective Chemistry Using Tailored Strong Field Laser Pulses"; The Journal of Physical Chemistry, vol. 106, No. 27; Jul. 11, 2002; pp. 6427-6444.

Mustafa Demirplak et al.; "Optical control of molecular dynamics in a liquid"; Journal of Chemical Physics, vol. 116, No. 18; May 8, 2002; pp. 8028-8035.

M. Bergt et al.; "Time-resolved organometallic photochemistry Femtosecond fragmentation and adaptive control of CpFe(CO)2X (X=Cl,Br,1)"; Journal of Organometallic Chemistry 661; 2002; pp. 199-209.

Ben R. Torralva et al; "Mechanisms for laser control of chemical reactions"; Journal of Modern Optics, vol. 49, No. 3/4; 2002; pp. 593-625.

N.H. Damrauer et al.; "Control of bond-selective photochemistry in CH2BrCl using adaptive femtosecond pulse shaping"; The European Physical Journal D, 20, 2002; pp. 71-76.

L. Windhorn et al.; "Molecular dissociation by mid-IR femtosecond pulses"; Chemical Physics Letters 357, May 3, 2002; pp. 85-90.

Robert J. Levis et al.; "Selective Bond Dissociation and Rearrangement with Optimally Tailored, Strong-Field Laser Pulses"; Science Magazine, vol. 292; Apr. 27, 2001; pp. 709-713.

T. Brixner et al.; "Problem complexity in femtosecond quantum control"; Chemical Physics 267; 2001; pp. 241-246.

O.M. Sarkisov et al.; "Control of elementary chemical reactions by femtosecond light pulses"; Quantum Electronics, vol. 31, No. 6; 2001; pp. 483-488.

Julie A. Mueller et al.; "Competing isomeric product channels in the 193 nm photodissociation of 2-chloropropene and in the unimolecular dissociation of the 2-propenyl radical"; Journal of Chemical Physics, vol. 114, No. 10; Mar. 8, 2001; pp. 4505-4521.

Chantal Daniel et al.; "Analysis and control of laser induced fragmentation processes in CpMn(CO)3"; Chemical Physics 267; 2001; pp. 247-260.

A. Glass et al.; "Control of the photodissociation of CsCl"; Applied Physics B 71; 2000; pp. 267-276.

T. Frohnmeyer et al.; "Femtosecond pump-probe photoelectron spectroscopy on Na2: a tool to study basic coherent control schemes"; Applied Physics B 71; 2000; pp. 259-266.

M. Bergt et al.; "Controlling the Femtochemistry of Fe(CO)5"; J. Phys. Chem. A, vol. 103, No. 49; 1999; pp. 10381-10387.

A. Assion et al.; "Coherent control by a single phase shaped femtosecond laser pulse"; Chemical Physics Letters 259; Sep. 13, 1996; pp. 488-494.

Langchi Zhu et al.; "Coherent Laser Control of the Product Distribution Obtained in the Photoexcitation of HI"; Science Magazine, vol. 270; Oct. 6, 1995; pp. 77-80.

Yu-hui Chiu et al.; "Vibrational mode effects, scattering dynamics and energy disposal in reaction of C2H2 with methane"; J. Chem. Phys., vol. 102, No. 3; Jan. 15, 1995; pp. 1199-1216.

J.S. Keller et al.; "Selective bond fission in methyl mercaptan at 193 nm via radial derivative coupling between the 21A" and 11A" adiabatic electronic states"; J. Chem. Phys. vol. 96, No. 6; Mar. 15, 1992; pp. 4324-4329.

I. Bar et al.; "Mode-selective bond fission: Comparison between the photodissociation of HOD (0,0,1) and HOD (1,0,0)"; J. Chem. Phys. vol. 95, No. 5; Sep. 1, 1991; pp. 3341-3346.

Michael J. Bronikowski et al.; "Bond-specific chemistry: OD:OH product ratios for the reactions H+HOD(100) and H+HOD(001)"; J. Chem. Phys., vol. 95, No. 11; Dec. 1, 1991; pp. 8647-8648.

I. Bar et al.; "Direct observation of preferential bond fission by excitation of a vibrational fundamental: Photodissociation of HOD (0,0,1)"; J. Chem. Phys., vol. 93, No. 3; Aug. 1, 1990; pp. 2146-2148.

R.L. VanderWal et al.; "Selectively breaking the O-H bond in HOD"; J. Chem. Phys., vol. 92, No. 1; Jan. 1, 1990; pp. 803-805.

Neil Shafer et al.; "Isotope effect in the photodissociation of HDO at 157.5 nm"; J. Chem. Phys., vol. 90, No. 11; Jun. 1, 1989; pp. 6807-6808.

L.J. Butler et al.; "The electronic state-selective photodissociation of CH2BrI at 248, 210 and 193 nm"; J. Chem. Phys. vol. 86, No. 4; Feb. 15, 1997; pp. 2051-2074.

L.J. Butler et al.; "Bond selective photochemistry in CH2BrI through electronic excitation at 210 nm"; J. Chem. Phys., vol. 84, No. 7; Apr. 1, 1986; pp. 4104-4106.

David J. Tannor et al.; "Control of selectivity of chemical reaction via control of wave packet evolution"; J. Chem. Phys., vol. 83, No. 10; Nov. 15, 1985; pp. 5013-5018.

Christopher J. Bardeen et al.; "Quantum Control of NaI Photodissociation Reaction Product States by Ultrafast Tailored Light Pulses"; J. Phys. Chem. A, vol. 101, No. 20; 1997; pp. 3815-3822.

V.A. Apkarian; 'Comment on "Time-resolved laser induced harpoon reactions"'; J. Chem. Phys. vol. 106, No. 12; Mar. 22, 1997; pp. 5298-5299.

R.B. Vrijen et al.; "Limitations on quantum ladder climbing in complex systems"; Physical Review A, vol. 56, No. 3; Sep. 1997; pp. 2205-2212.

Lutfur R. Khundkar et al.; "Ultrafast Molecular Reaction Dynamics in Real-Time: Progress Over a Decade"; Annu. Rev. Phys. Chem., 1990; pp. 15-60.

Stuart A. Rice; "Optical control of reactions"; Nature magazine, vol. 403; Feb. 3, 2000; pp. 496-497.

Richard N. Zare; "Laser Control of Chemical Reactions"; Science magazine, vol. 279; Mar. 20, 1998; pp. 1875-1879.

Stuart A. Rice; "Active Control of Molecular Dynamics: Coherence versus Chaos"; Journal of Statistical Physics, vol. 101, Nos. 1/2; 2000; pp. 187-212.

Herschel Rabitz et al.; "Whither the Future of Controlling Quantum Phenomena?"; Science magazine, vol. 288; May 5, 2000; pp. 824-828.

Yuri T. Mazurenko; "Spectral Holography and Spectral Nonlinear Optics of Ultrashort Pulses"; Journal of the Chinese Chemical Society, vol. 47, No. 4A; 2000; pp. 679-683.

Marcos Dantus; "Coherent Nonlinear Spectroscopy: From Femtosecond Dynamics to Control"; Annu. Rev. Phys. Chem. 2001; pp. 639-679, C1-C7.

Stuart A. Rice; "Interfering for the good of a chemical reaction"; Nature magazine; vol. 409; Jan. 18, 2001; pp. 422-426.

Wolfgang Kiefer et al.; "Femtosecond time-resolved spectroscopy of elementary molecular dynamics"; Naturwissenschaften; 2002; pp. 250-258.

Alois Renn et al.; "Multidimensional Holography by Persistent Spectral Hole Burning"; The Journal of Physical Chemistry A, vol. 106, No. 13; Apr. 4, 2002; pp. 3045-3060.

T.C. Weinacht et al.; "Using feedback for coherent control of quantum systems"; Journal of Optics B: Quantum and Semiclassical Optics; 2002; pp. R35-R52.

Niels E. Henriksen; "Laser control of chemical reactions"; Chem. Soc. Rev. 3137 42; 2002; pp. 37-42.

Stuart A. Rice et al.; "Active control of product selection in a chemical reaction: a view of the current scene"; Phys. Chem. Chem. Phys.; 2002; pp. 1683-1700.

Allen J. Bard et al.; "Holy Grails in Chemistry"; American Chemical Society, vol. 28, No. 3; Mar. 1995.

Marcos Dantus; "Ultrafast Probing and Control of Molecular Dynamics: Beyond the Pump-Probe Method"; pp. 169-188. Kuhn & Weyh SRZ Sep. 4, 2001.

Bern Kohler et al.; "Controlling the Future of Matter"; Acc. Chem. Res., vol. 28, No. 3; 1995; pp. 133-140.

M.R. Fetterman et al.; "Propagation of Complex Laser Pulses in Optically Dense Media"; The American Physical Society, Physical Review Letters, vol. 82, No. 20, May 17, 1999; pp. 3984-3987.

D. Yelin et al.; "Adaptive femtosecond pulse compression"; Optics Letters, vol. 22, No. 23, Dec. 1, 1997; pp. 1793-1795.

A.V. Sokolov; "Subfemtosecond compression of periodic laser pulses"; Optics Letters, vol. 24, No. 17, Sep. 1, 1999; pp. 1248-1250.

H.S. Eisenberg et al.; "Phase Defects in Self-Focusing of Ultrashort Pulses"; Physical Review Letters, vol. 83, No. 3, Jul. 19, 1999; pp. 540-543.

D.M. Villeneuve et al.; "Using frequency-domain manipulation of stretched femtosecond laser pulses to create fast rise and fall times on picosecond pulses"; Applied Physics B74 (Suppl), 2002; pp. S157-S161.

Dai-Sik Kim et al., "Femtosecond-pulse distortion in quantum wells"; Appl. Phys B 74, vol. 48. No. 24; Dec. 15, 1993; pp. 17902-17905.

Anthony P. Peirce et al.; "Optimal control of quantum-mechanical systems: Existence, numerical approximation and applications"; Physical Review A, vol. 37, No. 12; Jun. 15, 1988; pp. 4950-4964.

J.M. Geremia et al.; "Incorporating physical implementation concerns into closed loop quantum control experiments"; Journal of Chemical Physics, vol. 113, No. 24; Dec. 22, 2000; pp. 10841-10848.

Thomas Hornung et al.; "Teaching optimal control theory to distill robust pulses even under experimental constraints"; Physical Review A, vol. 65; 2002; pp. 021403-1-021403-4.

Jianshu Cao et al.; "Intrapulse Dynamical Effects in Multiphoton Processes: Theoretical Analysis"; J. Phys. Chem. A; vol. 102, 1998; pp. 4284-4290.

Amichay Vardi et al.; "Laser catalysis with pulses"; Physical Review A, vol. 58, No. 2; Aug. 1998; pp. 1352-1360.

Kazuya Takasago et al.; "Evaluation of Femtosecond Pulse Shaping with Low-Loss Phase-Only Masks"; IEEE Journal of Selected Topics in Quantum Electronics, vol. 4, No. 2; Mar./Apr. 1998; pp. 346-352.

M.E. Fermann et al.; "Shaping of ultrashort optical pulses by using an integrated acousto-optic tunable filter"; Optics Letters, vol. 18, No. 18; Sep. 15, 1993; pp. 1505-1507.

V.L. da Silva et al.; "Nonlinear pulse shaping and causality"; Optics Letters, vol. 18, No. 8; Apr. 15, 1993; pp. 580-582.

E. Zeek et al.; "Adaptive pulse compression for transform-limited 15-fs high-energy pulse generation"; Optics Letters, vol. 25, No. 8; Apr. 15, 2000; pp. 587-589.

A. Apolonski et al.; "Controlling the Phase Evolution of Few-Cycle Light Pulses"; Physical Review Letters, vol. 85, No. 4; Jul. 24, 2000; pp. 740-743.

Christophe Dorrer et al.; "Phase Amplitude Coupling in Spectral Phase Modulation"; IEEE Journal of Selected Topics in Quantum Electronics, vol. 4, No. 2; Mar./Apr. 1998; pp. 342-345.

David J. Jones et al.; "Carrier-Envelope Phase Control of Femtosecond Mode-Locked Lasers and Direct Optical Frequency Synthesis"; SCIENCE magazine, vol. 288, Apr. 28, 2000; pp. 635-639.

Vladimir Kalosha et al.; "Generation of Single Dispersion Precompensated 1-fs Pulses by Shaped-Pulse Optimized High-Order Stimulated Raman Scattering"; Physical Review Letters, vol. 88, No. 10; Mar. 11, 2002; pp. 103901-1-103901-4.

Donna Strickland et al.; "Compression Of Amplified Chirped Optical Pulses"; Optics Communications; vol. 55, No. 6; Oct. 15, 1985; pp. 447-449.

H. Wang et al.; "Abstract-20-fs pulse shaping with a 512-element phase-only liquid crystal modulator"; IEEE Journal Of Selected Topics In Quantum Electronics; 7 (4): 718-727; Jul./Aug. 2001 (1 page).

L. Xu et al.; "Abstract-Programmable chirp compensation for 6-fs pulse generation with a prism-pair-formed pulse shaper"; IEEE Journal Of Quantum Electronics; 36 (8): 893-899; Aug. 2000 (1 page).

CVI Laser Corporation; "TNM-2 Negative Group Velocity Dispersion Mirrors"; www.cvilaser.com/ultra-fast; Jan. 13, 2002 (2 pages).

H. Takada et al.; "Large-ratio stretch and recompression of sub-10-fs pulses utilizing dispersion managed devices and a spatial light modulator"; Appl. Phys. B 74 [Suppl.]; 2002; pp. S253-S257.

N. Karasawa et al.; Optical pulse compression to 5.0 fs by by use only a spatial light modulator for phase compensation; J. Opt. Soc. Am. B, vol. 18, No. 11; Nov. 2001; pp. 1742-1746.

C.P.J. Barty et al.; "Generation of 18-fs, multiiterawatt pulses by regenerative pulse shaping and chirped-pulse amplification"; Optics Letters, vol. 21, No. 9; May 1, 1996; pp. 668-670.

Marcos Dantus; GeneticAlgorithm-v4.nb to simulate an adaptive genetic algorithm;Oct. 2001; pp. 1-7.

M. Hacker et al.; "Iterative Fourier transform algorithm for phase-only pulse shaping"; Optics Express, vol. 9, No. 4, Aug. 13, 2001; pp. 191-199.

T. Brixner et al.; "Feedback-controlled optimization of amplified femtosecond laser pulses"; Applied Physics B 68; 1999; pp. 281-284.

A. Efimov et al.; "Minimization of dispersion in an ultrafast chirped pulse amplifier using adaptive learning"; Appl. Phys. B 70 (Suppl); 2000; pp. S133-S141.

D. Zeidler et al.; "Evolutionary algorithms and their application to optimal control studies"; Physical Review A, vol. 64; 2001; pp. 023420-1-023420-13.

C. Rangan et al.; "Optimally shaped terahertz pulses for phase retrieval in a Rydberg-atom data register"; Physical Review A, vol. 64; 2001; pp. 033417-1-033414-5.

T. Tanabe et al.; "Compensation for a Transfer Function of a Regerative Amplifier to Generate Accurately Shaped Ultrashort Pulses in Both the Amplitude and Phase"; IEE J. of Selected Topics in QUantum Elecronics, vol. 10, No. 1; Jan./Feb. 2004; pp. 221-228.

Zeek, Erik; "Pulse Shaping For High-Harmonic Generation;" Dissertation Submitted in Partial Fulfillment of the Requirements for the Degree of Doctor of Philosophy (Applied Physics) in the University of Michigan, 2000; 126 pages.

* cited by examiner

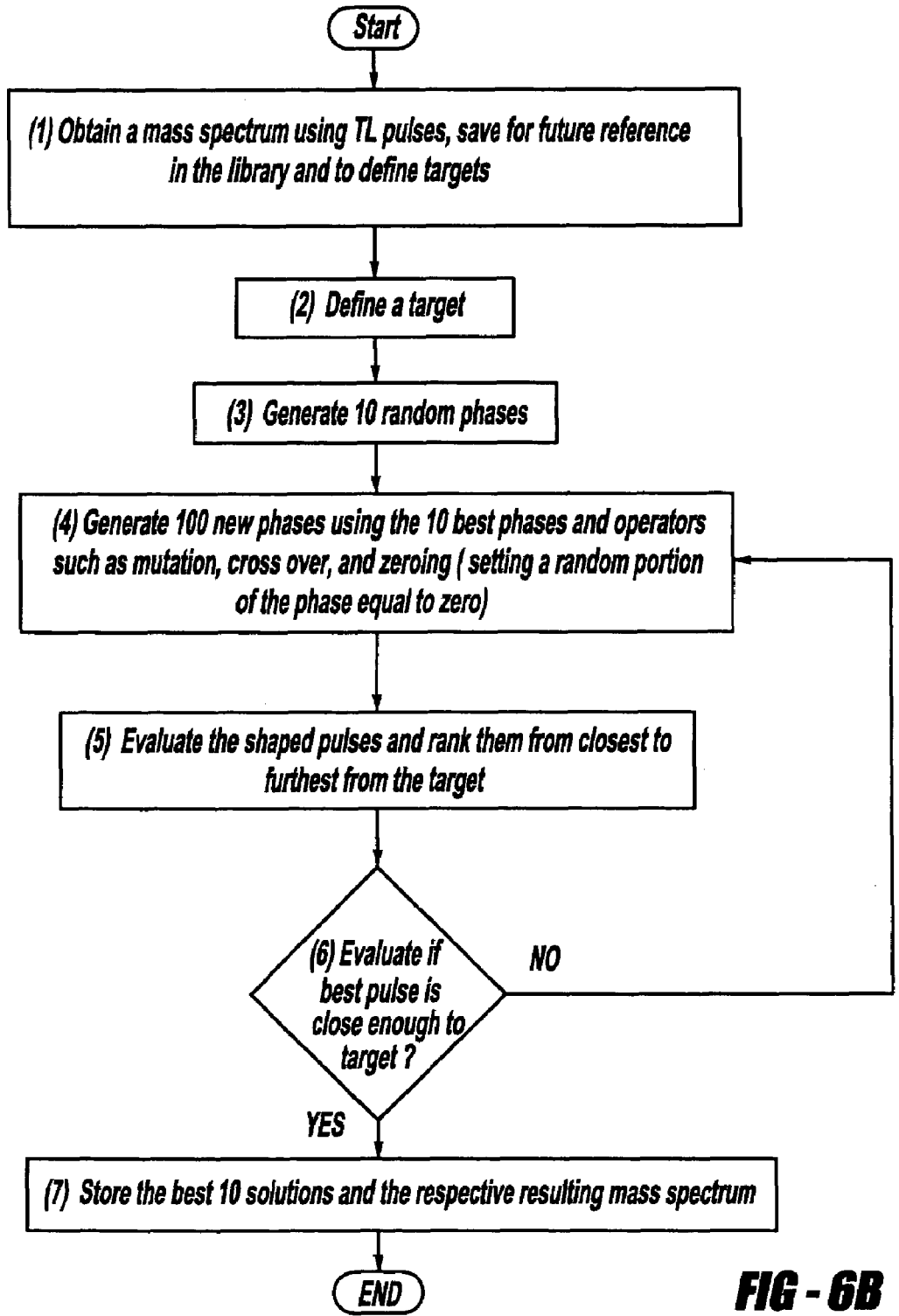

LASER AND ENVIRONMENTAL MONITORING SYSTEM

CROSS REFERENCE TO RELATED APPLICATIONS

This is a continuation-in-part of Ser. No. 10/791,377, filed Mar. 2, 2004, which is a continuation-in-part of Ser. No. 10/265,211, filed Oct. 4, 2002, which is a continuation-in-part of PCT/US02/02548, filed Jan. 28, 2002, which claims priority to provisional application 60/265,133, filed Jan. 30, 2001. Furthermore, this is continuation-in-part of Ser. No. 10/265,211, filed Oct. 4, 2002, which is a continuation-in-part of PCT/US02/02548, filed Jan. 28, 2002, which claims priority to provisional application 60/265,133, filed Jan. 30, 2001. This is also a continuation-in-part of Ser. No. 10/628,874, filed Jul. 28, 2003, which is a continuation of PCT/US02/02548, filed Jan. 28, 2002, which claims priority to provisional application 60/265,133, filed Jan. 30, 2001. All of these applications are incorporated by reference herein.

BACKGROUND

The present invention generally relates to a monitoring system and more particularly to a laser and environmental monitoring system.

Conventionally, laser desorption mass spectrometry has been used with a fixed laser beam pulse shape and computers for simple chemical analysis processes on purified molecules. The laser beam pulse shape was not considered an important parameter and was not modified; whatever fixed shape was set by the manufacturer for the ultraviolet laser was used in the tests. The general concept of typically laser selective ion formation from molecules in a molecular beam is disclosed in the following publication: Assion et al., "Control of Chemical Reactions by Feedback-Optimized Phase-Shaped Femtosecond Laser Pulses," *Science*, Vol. 282, page 919 (Oct. 30, 1998). The pulse shaping process with a learning algorithm is disclosed in Judson et al., "Teaching Lasers to Control Molecules," *Physical Review Letters*, Vol. 68, No. 10, page 1500 (Mar. 9, 1992). It is noteworthy, however, that the Assion article discloses use of an 80 femtosecond laser pulse and requires molecules to be isolated in a molecular beam, while the Judson article discloses use of a one nanosecond laser pulse and is purely conceptual as it does not include experimental results.

Commercially practical femtosecond lasers have been unavailable until recently. For example, lasers which can generate 10 femtosecond or less laser pulse durations have traditionally been extremely expensive, required unrealistically high electrical energy consumption (for extensive cooling, by way of example) and depended on laser dyes that had to be replenished every month thereby leading to commercial impracticality.

Ultrashort pulses are prone to suffer phase distortions as they propagate through or reflect from optics because of their broad bandwidth. There has been significant progress in correcting these unwanted phase distortions. There have been recent experimental attempts to purposely shape the phase of ultrashort pulses since shaped pulses have been shown to increase the yield of certain chemical reactions and multiphoton excitation, although the mechanism for the observed changes remains unknown in most cases. As usually practiced, the output waveform is determined by the Fourier transform (FT) of a spatial pattern transferred by a mask or a modulator array onto the dispersed optical spectrum. The introduction of liquid crystal modulator arrays and acousto-optic (A/O) modulators into FT pulse shapers led to computer programmable pulse shaping, with millisecond and microsecond reprogramming times, respectively, and widespread adoption of this technique. These shaped pulses require a very large data set and in many cases, complex learning calculations for determining the pulse shaping characteristics for a particular application. The optimal pulse for the particular application is not known in advance. Since the variation shape of the possible pulse shapes is huge, scanning the entire parameter space is impossible and as such the optimized pulse shape could not have been predicted by theory. For a pulse shaper with N pixels, one can generate $(P*A)^N$ shaped pulses, where P and A are the number of different phases and amplitudes a pixel can take. If it is assumed 100 pixels, each taking 10 different amplitude values and 100 different phase values, the number of different pulses is of order of magnitude $10^{300}$. This dataset is extremely large, therefore, while in principle, the field exists to achieve the desired photonic transformation or excitation, finding it is a great challenge. It would be desirable for a system to control ultrashort pulses with a smaller dataset, operable to generate very complex pulse shapes that are optimal for the particular application and are highly reproducible.

Additionally, monitoring the environment for chemical and biological agents, including explosives, from terrorist threats or from industrial contamination has become a necessity for reasons of national security and the well being of humans. Conventional devices are only designed for use to detect a single known agent or are inaccurate. Accordingly, to avoid a costly false positive or false negative identification, it would be desirable to employ femtosecond laser and control technology to environmental monitoring.

SUMMARY OF THE INVENTION

In accordance with the present invention, a laser and monitoring system is provided. In another aspect of the present invention, the system includes a laser, pulse shaper and detection device. A further aspect of the present invention employs a femtosecond laser and binary pulse shaping (BPS). Still another aspect of the present invention uses a laser beam pulse, a pulse shaper and a SHG crystal. In yet another aspect of the present invention, the multiphoton intrapulse interference phase scan (hereinafter "MIIPS") method is used to characterize the spectral phase of femtosecond laser pulses and to correct them. A further aspect of the system of the present invention is employed to monitor environmental chemical and biological agents, including toxins, explosives, and diseases, among others.

The laser and environmental monitoring system of the present invention is advantageous over conventional constructions since the present invention allows for automated analysis and identification of molecules in complex mixtures. It is envisioned that the present invention is capable of fast (for example, one second), accurate (for example, even in a chemically complex environment), robust (for example, stand alone, closed-loop and portable) and reproducible sensing. Operationally, the system employs a computer controlled pulse shaping module which interfaces with a commercially available femtosecond pulsed laser and mass spectrometry module thereby using cost effective instruments. The system operates on the principle of molecular control based on shaped laser fields and using genetic and evolutionary, learning search methods, whereby a series of laser fields are chosen to unequivocally identify each chemical or biological agent of interest based on their electronic and nuclear structure. In case of a positive identification, the unit automatically contacts a command center and/or changes the state of a building heating, ventilating and air conditioning system in order to advantageously minimize spreading of the agent or to neutralize the agent, in a very fast and real-time analysis and feedback manner. Additional advantages and features of the present invention will become apparent from the following description and appended claims, taken in conjunction with the accompanying drawings.

BRIEF DESCRIPTION OF THE DRAWINGS

FIG. 1 is a diagrammatic perspective view showing a first preferred embodiment building employing the laser and environmental monitoring system of the present invention;

FIG. 2 is a diagrammatic side view showing a second preferred embodiment building employing the system;

FIGS. 3 and 4 are diagrammatic views showing the preferred embodiment system;

FIG. 5 is a diagrammatic view showing the preferred embodiment system employing MIIPS;

FIGS. 6A-C are flow charts showing the operation of the preferred embodiment system in the evolutionary learning, library mode;

FIGS. 7, 8A and 8B are flow charts for the method and computer software operation employed with the preferred embodiment system;

FIG. 9 is a schematic representation of an SLM-256 (CRI, Inc.) amplitude/phase mask employed with one variation of the preferred embodiment system;

FIG. 10 shows a diagrammatic representation of the direction of electric field rotation which is different for the two liquid crystal masks employed with the preferred embodiment system of FIG. 9;

FIG. 11 shows an experimentally measured transmission as a function of voltage used for calibration of the SLM mask of FIG. 9 proposed to be employed with the present invention;

FIG. 12 shows experimental demonstration of phase characterization followed by compensation proposed to be employed with the present invention system (the transform limited pulse width retrieved from FROG was 28-fs, the MIIPS traces are shown on the left column and the SHG-FROG traces are shown on the right column);

FIG. 13 shows schematic representations of three binary phase masks that have been optimized by a genetic learning program to maximize the indicated intensity ratio of the fragment ions labeled a, b and c, as proposed to be employed with the present invention system;

FIG. 14 is a flow chart showing the operation of the preferred embodiment system used in the field to monitor the environment;

FIG. 15 is a perspective view showing a first alternate embodiment of the present invention system; and FIG. 16 is a perspective view showing a second alternate embodiment of the present invention system;

DETAILED DESCRIPTION OF THE PREFERRED EMBODIMENTS

A laser and environmental monitoring system 1 is provided to monitor airborne chemical and biological agents in the desired environmental specimen or target area. This unit, because of its sensitivity, can be used to sense smoke from a fire. Referring to FIG. 1, a first preferred embodiment system 1 of the present invention includes a multi-story building 2, having a plurality of wings with interconnecting hallways, with each wing having separate ventilating systems, such as heating/ventilating/air conditioning climate control units (hereinafter "HVAC" units) 3. A laser and detection apparatus 21 is housed in a self-contained unit 4 with inlet valve controls 5. Furthermore, an HVAC control unit 6, a fire door/alarm/sprinkler emergency control unit 7 and a remote command center 8, such as a public safety or fire department 8, are also provided. Laser and detection apparatus 21 includes a femtosecond laser, pulse shaping optics, a mass spectrometer and a computer controller 37 as will be discussed in greater detail hereinafter. Computer controller 37 is electrically connected to HVAC controller 6, emergency controller 7, and command center 8 to allow for automatic two way communications. Computer controller 37 of unit 4 further automatically controls valve settings of a manifold or the like coupled to ducts 9, flexible hoses or other conduits which are coupled to an exhaust plenum in each discrete room, floor and/or wing subject to environmental monitoring.

FIG. 2 discloses a second preferred embodiment building employing the system 1 of the present invention. In this embodiment, air analysis and monitoring unit 4 is directly coupled within the exhaust conduits for each of the three floors of the building shown. This embodiment is employed separately with each building wing or separate building structure, and multiple communication lines can optionally couple the computer controllers of each unit 4 with a main command station computer or the like.

Referring to FIGS. 1, 2 and 14, for both preferred embodiments, monitoring and air analysis unit 4 is initially set up at its manufacturing facility with a library of pre-stored data of acceptable background data, unacceptable chemical and biological agent data, and the corresponding pulse shaping control data. The self-contained unit 4 is subsequently installed at the facility or building 2. Unit 4 is acting as an "artificial nose" in that it receives exhausted air from inside the target environmental area (depending upon the HVAC ducting and zone configuration), as selectively regulated by the valve controls 5 in coordination with the laser and detection computer controller 37. Upon installation and set up, and optionally at regular intervals of known-safe conditions, the laser and detection computer controller 37 senses or monitors acceptable background chemicals in the air, such as oxygen, carbon dioxide, chlorine (if adjacent a swimming pool), benzene (if adjacent a bus station or high volume street), or hexachlorabenzene (if the building is a hospital), or the like. These acceptable background chemicals are automatically stored in the memory of computer controller 37 and matched with pulse shapes and mass spectrums previously stored in the library of data. Active baseline subtraction is thereafter employed during regular environmental monitoring so these benign chemicals and their fragments are not mistakenly considered part of a dangerous compound, thereby reducing the risk of creating a false detection and warning.

Subsequently, the monitoring and analysis unit 4 automatically samples air from each environmental target area at a repetition rate of approximately one per minute, a rate which is then increased to approximately one thousand times per second if an unusual background chemical or undesirable agent is detected. The background and regularly monitored chemical analyses are stored in the computer memory for later automatic and/or manual comparisons in the event of agent detection. The varying sample rate minimizes the memory and historical trend information from becoming overwhelmed with unnecessary results, and the variable repetition rate saves laser power costs and prolongs the life of laser components and detection equipment.

If an undesirably harmful chemical or biological agent is sensed then the laser and detection computer controller will automatically override and dictate action of the HVAC controller 6 and/or emergency controller 7, while transmitting warning and other calculated information to the command center 8. Examples of such undesirable agents include and are not limited to: methane, propane, mustard gas, nerve agents, phosgene, vinyl chloride, cyanide, anthrax and other pathogens and diseases. Depending upon the agent sensed and calculated, the computer controller will initiate low impact counter-measures such as causing closure of the HVAC dampers or exhaust doors in order to isolate the infected room and environment while further analysis is ongoing at a very high rate. Monitoring unit 4 will also recalibrate itself and use multiple shaped pulses to reduce the likelihood of error, and to insure that there is no mass spec overlap of results between undesired agents and acceptable chemicals. The unit will further calculate a confidence percentage of the test results compared to an unacceptable agent believed to have been identified based on previously stored library data. If a low confidence level is determined then the unit will rapidly conduct one or more further tests on the environment within seconds of the initial noteworthy reading.

If the confidence level calculated of an undesirable agent is statistically significant then laser and detection computer controller 37 will enact serious counter-measures such as turning off and isolating all HVAC units, causing closure of fire doors, and/or sending alarms to evacuate humans from the building. The laser and detection computer will also send the appropriate warnings and information to the command center and department 8 including currently calculated values and historical trends. Furthermore, monitoring unit 4 will continue sensing all environmental areas within the building so as to track movement and cross-contamination between environmental areas for use by emergency personnel. As an additional option, the computer controller of monitoring unit 4 will enact neutralizing actions depending upon the agent determination, such as opening external building exhaust vents and/or windows in order to flush out the contaminant agent to the external atmosphere, turn on the water sprinklers within the building, and/or inject direct countermeasures such as the introduction of an antidote chemical into the inlet side of the HVAC system so as to neutralize the agent.

On a more detailed level within monitoring unit 4, operational parameters such as ultimate sensitivity are initially obtained: once six pre-determined shaped laser pulses (as more fully described hereinafter for the library) are found for a given molecule, together with the TL pulse (also as more fully described hereinafter for the library), the system is ready to make a positive identification of that particular chemical. In fact, every time the measurement is performed with a different pulse shape, the accuracy is improved exponentially with the number of independent measurements. This multidimensional analysis of the present invention is believed to make it a million times more accurate than presently used mass spectrometry units. The goal is to build a library of multidimensional spectra that result from shaped laser pulses that have been optimized for maximum contrast for each given chemical or biological threat agent (and their analogs). It is important to optimize the pulses for each molecule, because each molecule has a distinct electronic and nuclear structure that determines its susceptibility for ionization and fragmentation. It is noteworthy again that the evolutionary learning program searches will only be used in a laboratory setting and not in the field with the preferred embodiment system.

The present invention pulse shaper monitoring of the environment will be carried out as follows. Every second, the unit will obtain a mass spectrum using TL pulses. Under these conditions, the system is at its highest sensitivity. If a mass spectrum indicates that a possible chemical agent is present, the system immediately narrows the list of possibilities based on the available TL mass spectrum and performs tests with the first three fields defined in the library for the suspected chemical agents. These subsequent tests are run at the maximum repetition rate. Within seconds the unit should have confirmation of the suspected chemical agent(s) present. At this point the unit runs a calibration test to make sure that the laser, shaper and mass spectrometer are operating within specifications. The unit performs three additional measurements with the final three shaped laser pulses for a final and definitive determination. If the identification is positive for a known threat, the unit contacts a command center and uplinks the experimental data used to make the determination. The command center has the required information to make the best strategic decision based on solid information within a minute of detection. Additional rounds of tests can be requested from the command center, with each full cycle taking less than one minute to complete. The speed and efficiency of the method is achieved by having previously determined the six best shaped laser pulses for each molecule. The pulse shapes in the library are determined using the automated evolutionary learning program in a laboratory setting. Updated pulse shape libraries are periodically uploaded to the computer controller of the monitoring device.

One of the advantages of the system and method of the present invention is that it is robust enough to operate in the presence of a complex chemical environment. For example, if the building environment being monitored is next to many automotive vehicles or a bus stop, the unit will detect diesel, gasoline and exhaust fumes. Under these conditions, it will be imperative to take advantage of the multidimensional properties of the present invention. TL pulses will yield mass spectra with a number of suspect ion masses. However, upon further analysis, the unit will determine that no unacceptable, dangerous chemicals are present. If these conditions persist, the computer will automatically define a background level of contaminants and actively subtract it. The power of multidimensional analysis is extremely valuable if a mixture of chemical agents is present. The present invention system would have no problems determining which chemicals are present even under these adverse conditions. Finally, if a new chemical threat is developed by a terrorist group, the command center can update all the units in the field with a new library that contains the spectrometric signature that is obtained by multidimensional laser interrogation of that compound. The addition to the library would take less than a day to generate in the laboratory, and would be available for immediate use by the monitoring unit upon upload.

One laser and detector unit creates the library. That unit is in a laboratory and is capable of handling nasty chemicals. The other unit, is compact and automated and uses the libraries prepared by the first unit. The second unit can be compact and is field transportable. Both units have fs laser, shaper, miips, binary shaping, computer controller. The only difference is that one is used to generate the library in a laboratory setting. The other one is fully automated and field deployable. It is made to be a closed box that requires minimum maintenance.

Pulse Shaping System

Figure 3:
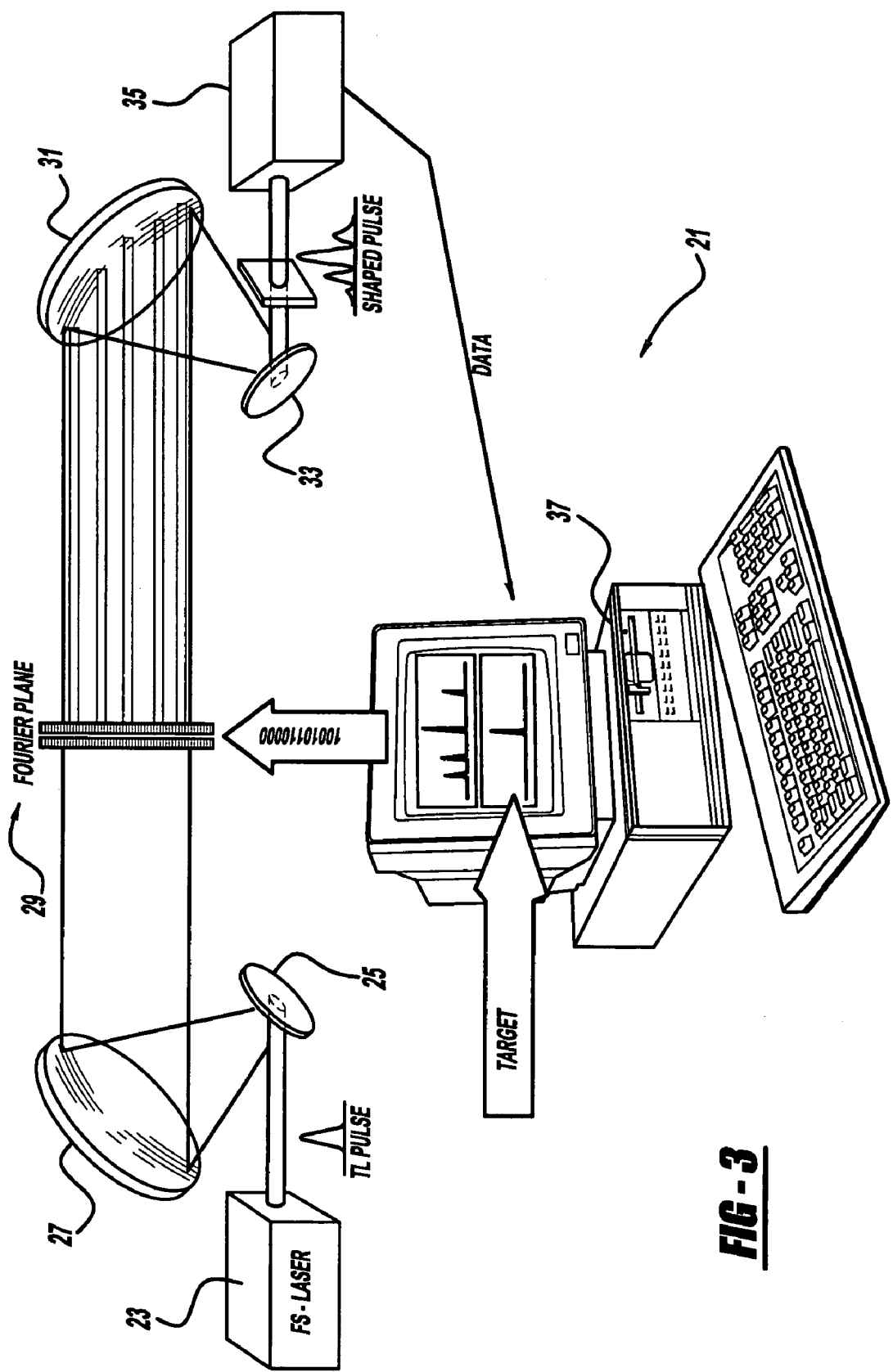
Figure 4:
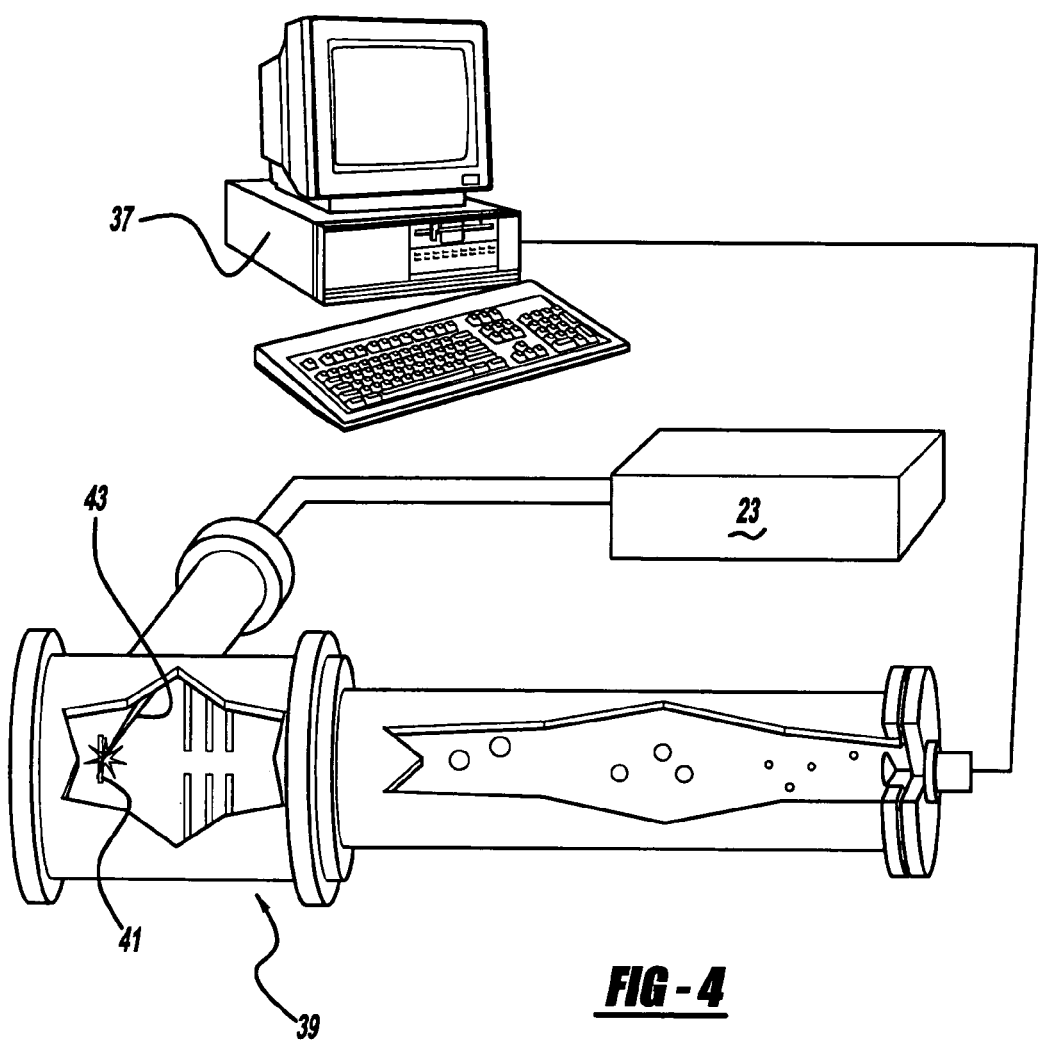

The preferred embodiment of a control system and apparatus 21 of the present invention for use with the laser and environmental monitoring system is generally shown in FIGS. 3 and 4. Apparatus 21 includes a femtosecond laser 23, an upstream grating 25, an upstream convex mirror 27, a spatial light modulator 29, a downstream concave mirror 31, a downstream grating 33, a detection device 35, and a personal computer 37. The pulse shaper is the entire optical setup from grating to grating. As will be discussed later, the gratings can be replaced by a prism, and the spatial light modulator can be a deformable mirror, a liquid crystal spatial light modulator or a microelectronic micromechanical system MEMS. The pulse shaper can also be reflective instead of transmissive. Finally, the pulse shaper can also be an accousto optic shaper.

Personal computer 37 has a microprocessor based electrical control system, memory, an output screen, a data storage device, an input keyboard, and a storage disk. More specifically, the detection device is a mass spectrometer 39. Bursts or pulses of a laser beam 43 are emitted from laser 23, through the optics 25, 27, 31 and 33, as well as through the spatial light modulator 29 for detection and sensing by spectrometer 39 for further evaluation, analysis, comparison and subsequent control by personal computer 37.

The laser is preferably an ultra-fast femtosecond laser capable of high peak intensity (with a typical peak greater than $10^{14}$ watts/cm$^2$) which preferably emits laser beam pulses of less than 100 femtosecond duration, and more preferably at or less than 50 femtoseconds, and for the environmental monitoring applications even more preferably as short as 10 femtosecond duration, for each pulse burst or shot. The intense optical pulses are formed in a Kerr-Lens mode locked titanium sapphire oscillator. Such lasers are capable of producing hundreds of nanometers of coherent bandwidth, although only about 50 nm are typically used. The output is amplified in a 1 kHz regenerative chirped pulsed amplifier. The output pulse is typically 100 fs long with a central wavelength of 800 nm and total pulse energy of 0.1 to 1 mJ. Preferred lasers include: the Kapteyn and Murnane femtosecond laser oscillator, which can produce less than 15 fs pulses at 100 MHz; the Hurricane model from Spectra Physics Inc., which is diode pumped and gives 0.8 mJ per pulse with sub-50 fs pulses at 1 kHz; and the CPA-2001+model from Clark-MXR Inc., which gives 1.3 mJ per pulse with sub-150 fs pulses at 1 kHz, pumping a Clark-MXR Inc. non-collinear parametric amplifier (hereinafter "NOPA") which produces 0.2 mJ per pulse, and is capable of generating sub-20 fs pulses. A Ytterbium Tungstenate laser may also be desirable. A time of flight mass spectrometer (TOF-MS), and a compact Ocean Optics spectrometer, are preferred for detection purposes. The entire system is preferably mounted on a vibration-damping optical table.

A Fourier plane pulse shaper is preferably used with the present invention for the transmissive construction illustrated with this embodiment. Ultra-short laser pulses contain from one to fifty optical cycles, and last only a few femtoseconds. This is much faster than most current electronics and therefore shaping with fast time gates is very difficult. On the other hand, because of the uncertainty principle, the optical spectrum spans tens to hundreds of nanometers. Such a large bandwidth is relatively easy to measure and to filter, and there are several techniques to shape the spectrum in the frequency domain, and thereby shape the temporal pulse upon recompression.

In order to access the frequency domain and the individual frequency components that comprise the pulse, a geometric arrangement is employed, using two back-to-back spectrometers. The spectrometers are especially designed to introduce no net temporal dispersion: that is, all colors pass through the spectrometers within the same amount of time. The first spectrometer (including grating 25 and mirror 27) spreads the unshaped pulse spectrum along a line according to its dispersion function y($\alpha$). The light intercepts spatial amplitude and phase mask spatial light modulator 29 at this point. The mask output then forms the entrance to a second spectrometer (including grating 33 and mirror 31) which recombines the colors into a single shaped pulse.

The heart of the pulse shaper is the programmable 256 pixel liquid-crystal mask (consisting of two overlapping 128 pixel liquid crystal arrays) that is placed at the Fourier plane 29. For the applications envisioned herein, the mask must be capable of shifting the phase of individual frequencies. For alternate embodiment pulse shapers, a different electronically programmable mask that is capable of controlling phase has been demonstrated: a liquid crystal display (hereinafter "LCD"), an acousto-optic modulator (hereinafter "AOM"), a deformable mirror, and a permanently deformed mirror. A LCD pulse shaper can be obtained from CRI Co. and has a modulator electronic driver.

The AOM consists of an anti-reflection coated Tellurium Dioxide (TeO$_2$) crystal with a piezo electric transducer glued onto one end. The central frequency of the acoustic wave is $\alpha c/2\pi=200$ MHz. The acoustic velocity vs in the crystal is 4.2 km/s and the light pulse spends less than 10 ps in the crystal, so the acoustic wave moves less than 0.002 $\lambda$ acoustic during the transit of the light field through the crystal. Since the acoustic wave is essentially frozen as the optical pulse travels through the crystal, the complex amplitude of the acoustic wave traveling through the crystal in the y direction, A(t) cos$\alpha$ct=A(y/vs)cos$\alpha$ct, is mapped onto the optical field E($\alpha$) as it passes through the AOM. If some of the dispersed optical field encounters a weak acoustic wave, that frequency is attenuated; if the acoustic wave carrier is shifted by phase angle ø, that phase shift is imposed on the optical field. This pulse shaper has a total efficiency of about 20% including the diffraction efficiency of the AOM and the diffraction efficiency of the gratings. The diffracted light is used and the undiffracted "zero order" beam is blocked, to allow full modulation of both amplitude and phase in the shaped beam. The shaped beam then has the form $$E_{shaped}(\omega)=E_{input}(\omega)x\alpha(\omega)xe^{i\phi(\omega)t}$$

where a($\omega$)$e^{i\phi(\omega)}$=A[y($\omega$)/v$_s$]; $\alpha$ is the frequency, and e is a constant.

Fixed pulse shaping optics, such as chirped mirrors or permanently etched reflective masks, can also be employed. The laser pulses are fed into the pulse shaper where the grating 25 causes dispersion. Curved mirror 27 focuses the spectrum onto Fourier plane 29. Changes in the phase ø of the spectral components indicated by the computer are used to tailor the laser pulse before reconstruction with second curved mirror 31 and grating 33. Once shaped, a small portion of the pulse is directed to spectrometer 39 for evaluation and calibration using MIIPS. The greater percentage of the laser, for example 95%, is sent towards the mass spectrometer for monitoring purposes.

In this embodiment, the phase and amplitude masks of the pulse shaper are controlled by the computer wherein the laser pulse shape takes a dynamic role. The microprocessor within personal computer 37 will then control laser 23, receive an essentially real time feedback input signal from spectrometer 39, and then perform calculations, comparisons and evaluations, and possibly automatic variation of subsequent pulse shapes. These automated steps can be substituted with manual user calculations and decisions if desired based on personal computer outputs.

As applied to the environmental monitoring applications herein, selective control of multiphoton processes in large molecules, including proteins, is possible using a simple pulse shaping method that is based on taking maximum advantage of the multiphoton intrapulse interference caused in short pulses with large bandwidths, and the resulting fluctuations in the electromagnetic pulse. The results show an extraordinary level of control that is robust and sample independent, with contrast ratios near two orders of magnitude. Such large contrast ratios allow for more precise cancellation control of undesired photons and other laser beam characteristics, such that nonlinear transitions induced by each pulse are controlled. Moreover, a fs-pulse shaper arrangement can be used to achieve selective fragmentation of the sample molecules, and this property can be exploited for identification. The details of the underlying technology will be described in greater detail hereinafter. Alternately, instead of the LCD-SLM used in FIG. 5 to introduce phase functions prestored in the memory unit of the controller, phase functions can be incorporated into a passive optical component such as a turret with different static phase masks manufactured on a transparent substrate. The turret can toggle the static phase masks in front of the mirror (see FIG. 5). A system with such a turret would reduce the complexity and expense of computer controlled LCD-SLM. Nevertheless, the ability to run a MIIPS test is valuable to make sure that the laser is operating properly, thus, a computer controller pulse shaper will be preferred for this application.

Multiphoton Intrapulse Interference

A multiphoton intrapulse interference phase scan (hereinafter "MIIPS") system and method are preferably employed with the environmental monitoring system of the present invention to characterize the spectral phase of the femtosecond laser pulses. The phase across the spectrum of an ultrafast pulse can affect the multiphoton process in a number of ways. Phase can increase the pulse length and hence reduce the peak intensity of the pulse, thereby preventing saturation, a common result under high intensity excitation. Phase can also be used to synchronize changes in the electric field with intramolecular wave packet dynamics. Finally, phase can be used to cause interference in the way multiple frequencies combine to achieve multiphoton excitation. This process is known as multiphoton intrapulse interference (hereinafter "MII").

The technique of MII and its application to control multiphoton processes is based on rationally designing an electric field required to achieve a particular target with a minimum number of parameters. The method is based on calculating the amplitude of the nth-order electric field and comparing it to the absorption spectrum of the molecules being controlled. This provides a strong physical understanding of the control process, which can be very useful in the interpretation of experiments where the field is optimized by computer programs based on evolutionary learning or similar methods. For strong field photofragmentation and ionization, required for environmental monitoring, no such calculations are possible. Therefore, determination of the optimum pulse shapes to identify each molecule will be obtained experimentally using a learning method.

Multiphoton intrapulse interference phase scan is capable of both pulse characterization and compensation of subsequent pulses. Within minutes, the pulses are characterized and compensated to yield transform-limited (hereinafter "TL") or user-specified shaped pulses at the sample. This capability is important for the present invention to make sure the pulse shaper and laser are operating within specifications.

MIIPS is a single-beam method that does not require an interferometer. To make a precise and accurate measurement of the spectral phase using MIIPS, a known phase delay is imposed on the frequencies that make up the pulse using a calibrated pulse shaper. The pulse shaper 121 essentially behaves as two back-to-back spectrometers. In one embodiment, shown in FIG. 5, the pulse emitted by laser 123 is dispersed with a grating and collimated with a 200-mm cylindrical lens 133. At the Fourier plane, where all the frequencies are isolated, their phases are manipulated by a computer-controlled LCD spatial light modulator (hereinafter "SLM"). The SLM applies the reference phase function to the input pulse. The resulting pulse is then retro reflected and reconstituted to the time domain and the output is picked by mirror 131. The SLM can be updated every pulse (presently limited to 1 kHz). The LCD has a 250-ms response time, so in principle it can be updated at 4 kHz. A small percent of the output beam is reflected by a partially reflective mirror 513 and is analyzed by focusing (with lens 515) onto a 0.10-mm-thick beta barium borate crystal 507 for second-harmonic generation (hereinafter "SHG") in its path, usually at the place where optimum pulses are required. The use of the second harmonic is important to the method. The average SHG output is collimated by second lens 515 and directed to a dispersive spectrometer 503 and detected by a detector array 511. For each reference phase function that is introduced by the computer-controlled SLM, a different spectrum is recorded and stored in computer controller 531. In a sense, the pulse autocorrelates itself at the SHG crystal.

Pulse characterization involves the introduction of a reference phase-modulation function of the form $\Phi = \alpha \cos(\gamma \Omega - \delta)$, where $\alpha$ is the magnitude of the phase delay, $\gamma$ is the periodicity $\Omega$ is the frequency detuning from the carrier frequency of the pulse, and $\delta$ is the position in the spectrum at which the cosine function is equal to one. The reference phase function, with typical values $\alpha = 2\pi$, and $\gamma =$ pulse duration, is programmed into the SLM and scanned for different values of $\delta$ ranging from 0 to $2\pi$. For each value of $\delta$, the spectrum of the frequency-doubled pulse changes, achieving a maximum in the spectral region over which the SLM compensates for the phase distortions.

Qualitatively, the distance between the diagonal features determines linear chirp while the angle between the features determines the quadratic chirp. The full quantitative determination of the spectral phase by integration can be obtained. Once the MIIPS system has characterized the pulse and retrieved the phase distortions inherent to the pulses, it can use that information to drive the SLM such that it compensates for the distortions. The first step in compensation is to take the phase determined from the first scan and program it into the SLM with a negative sign so that it subtracts the distortions. The system carries out a new phase scan to determine the remaining spectral phase modulation (usually about 10% of the original). Typically, three such iterations will yield transform-limited pulses. Because the laser is not focused in the pulse shaper, the method can be used with pulses that are relatively high in energy. Pulses ranging from about 10 pJ to about 30 mJ and pulse durations from less than 5 to about 500 fs can be used. Once the pulses are compensated (transform-limited), the laser can be focused to produce peak intensities from about $10^{12}$ to about $10^{18}$ W/cm$^2$, depending on the input energy.

Figure 5:
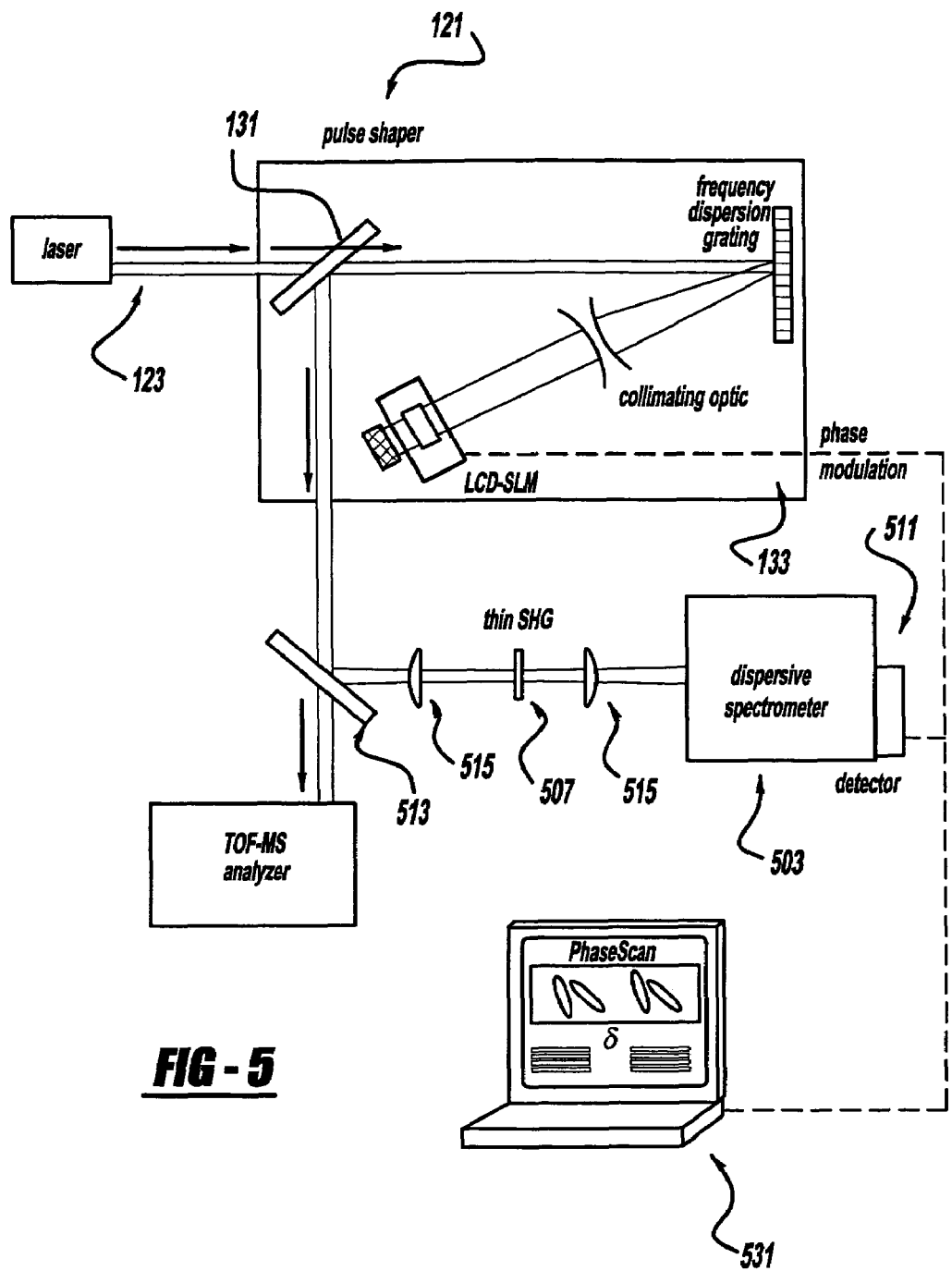

This single beam method is capable of retrieving the magnitude and sign of second and third order phase modulation (in other words, linear and quadratic chirp) directly, without iteration or inversion procedures. MIIPS achieves accurate phase retrieval from chirped ultrashort pulses. For MIIPS, no synchronous autocorrelation, beam splitting, or time delays are required because the second harmonic spectrum depends on the relative phases of all frequencies within the pulse. The amplitude of the pulse is obtained directly from a spectrometer in a communications receiver. Referring to FIG. 5, in order to precisely determine of the phase of all frequency components in a pulse from a femtosecond laser 123, a pulse shaper, such as the one described in A. M. Weiner, "Femtosecond pulse shaping using spatial light modulators," Rev. Sci. Instrum. 71, pp. 1929-1960 (2000), is employed to introduce a reference phase function designed to yield this information directly, as further described hereinafter. The shaped pulses are frequency doubled by a thin SHG crystal 507 and the output is directed to spectrometer 503.

The MIIPS method is based on the principle that second harmonic generation, as well as other nonlinear optical processes, depend on the phase function $\phi(\omega)$ across the spectrum of the laser pulse. Higher order phase distortions, such as self-phase modulation and quadratic phase components can be obtained from the curvature of the line defined by the maximum SHG response. The MIIPS can be programmed to find the phase distortions on the laser pulses directly by integration and to introduce a compensation phase function that eliminates the distortions. This mode of operation can be used to find arbitrary phase deformations and yield transform limited pulses, which in a MIIPS scan, look like straight parallel lines separated by $\pi$.

The present invention provides a system and method to characterize the spectral phase of femtosecond pulses. This single beam method is capable of retrieving the magnitude and sign of linear and quadratic chirp with high resolution. Pulse retrieval is based on analytical expressions that yield the phase distortion, without iteration or inversion procedures. Linear and quadratic chirp values, and to some extent cubic chirp values, are important because there are knobs on the laser that can be used to correct for this distortion by mechanically adjusting the grating spacing in the laser beam amplifier compressor. The method can be used with very short pulses. This adjustment can be automatically controlled with the computer controlled software. The method is very versatile, and can be used with high or very low intensity pulses for any wavelength for which low cost, off-the-shelf SHG crystals exist. MIIPS can also be used by obtaining third or higher order harmonics in gases. The maximum signal makes the method useful for the characterization of pulses in wavelength regions for which SHG crystals are not available.

Second—Harmonic Generation with Powders

For some variations of the present invention, chemical powders, adhered onto transparent quartz carriers, are employed in place of thin SHG crystals. The powder embodiment is presently preferred to significantly reduce cost in high energy (for example, one nanojoule or greater) applications such as for MIIPS, nonlinear optical characterizations and FROG analysis. The chemical powder is preferably Potassium Dihydrogen Phosphate (KDP or KD*P) or Beta Barium Borate, which is glued onto a glass, microscope slide using a silicone-rubber or cyanoacrylate ($C_5H_5NO_2$) adhesive. Type I phase matching is used. The power particle size is preferably between about 0.5 to 20 microns, depending on the focusing length, intensity of the laser and the sensitivity of the detector. Furthermore, the powder approach is advantageous by having large variety of random crystal orientations therein which creates improved average results for laser pulses shorter than 20 fs.

Binary Phase Shaping

Laser control is dominated by interference between different nonlinear optical pathways connecting the initial and final states. The challenge is finding the proper phase for each frequency within the pulse to achieve constructive interference at the desired pathway and destructive interference elsewhere. To a very good approximation, it is sufficient to set the phase of different frequency components of femtosecond pulse to two values separated by $\pi$. To obtain a very good approximation, it is sufficient to set the phase of different frequency components of a femtosecond pulse to two values separated by $\pi$. The phase between photons of different frequencies takes only two values, preferably 0 or $\pi$, to maximize or minimize a given pathway. Any two values whose difference is $\pi$ work equivalently well. This method is defined as binary phase shaping (hereinafter "BPS"). BPS is preferably used to solve the problem of selective multiphoton excitation with ultrashort laser pulses. The use of a small number of phase values between 3 and 10 is regarded as a trivial extension of our binary approach.

In order to control the behavior of molecules under the intense radiation of a femtosecond laser, it important to modulate the phase of the frequencies within the bandwidth of the pulse. For the invention being described, this implies, finding the best binary value for each of the spectral components that traverses a discrete region in the shaper corresponding to a pixel. In some shapers, the pixel may be discrete as in a liquid crystal, or a moving MEMS component. In other cases the pixel may be continuous as a region in an AO crystal or a deformable mirror. The appropriate phases that generate a specific desired outcome that is useful in the identification of a chemical, is found using the learning algorithm illustrated by the flowcharts in FIG. 6.

In another variation of the present invention, specific phase functions designed to produce a specific time-domain fluctuation of the electric field in the time domain will be programmed in the analyzer, and the behavior of all chemical agents of interest evaluated for their behavior when interrogated by these specific phase functions. These functions could be introduced as fixed optics produced by etching or other micromachining methods, or programmed on 128-pixel SLM or a SLM with greater than 256 pixels.

A titanium-sapphire regeneratively amplified laser is preferably employed, which can be obtained from Coherent Lasers, and it is capable of generating pulses as short as 30 fs. The spectral phase of the pulse is tailored using a computer-controlled pulse shaper. Preferably, the pulses are centered near 800 nm. A Ytterbium laser, centered at 1040 nm, may alternately be used. The spectral phase of each pulse is corrected using the MII phase-scan (MIIPS) method, which compensates phase distortions to obtain transform-limited (TL) pulses. The binary phase is introduced as an addition to the compensation phase. About 1% of the shaped laser pulse intensity, with energy ~0.003 mJ per pulse and 1 kHz repetition rate, is focused, to a spot size of ~20 microns in diameter, on a 100 micron thin beta barium borate ($\beta$BBO) type I SHG crystal. The frequency-doubled light is collected with an optical fiber and dispersed on a compact spectrometer, preferably obtainable from Ocean Optics. This setup is used at regular intervals to ascertain that the laser system and pulse shaper are operating properly. Most of the intensity of the laser beam with energy ~0.3 mJ is directed towards the TOF-MS where it interacts with the sampled air, causing photofragmentation and ionization.

The advantage of BPS is that computational redundancies are greatly reduced. For BPS and 128 active pixels, the search space is reduced by hundreds of orders of magnitude compared to arbitrary phase and amplitude pulse shaping as discussed above. The resulting space is small enough that a greater percentage of the search space can be evaluated experimentally. A learning feedback method or simple evolutionary learning computer program can quickly converge towards significantly improved solutions. BPS is expected to have significant technological advantages. A retardation equivalent to $\pi$ is easy and fast to obtain and calibrate. Permanently etched masks can be made in advance and used for specific applications.

Library Evolutionary Learning Computer Program

Initially, the pulse shaper is programmed for monitoring the environment based on requirements of a library of data stored in memory of the computer. Fast, accurate and reproducible monitoring of the environment for chemical and biological agents, will not usually permit the pulse shaper to run in an evolutionary learning mode in the field, although such field use still falls within the scope of the present invention. Instead, a much more efficient mode of operation is used, whereby the unit is continuously monitoring the environment with transform-limited (TL) pulses. Under these circumstances, the unit takes a fraction of a second to make preliminary, but highly sensitive measurements. In the event that a suspected molecular ion fragment is detected, then the unit activates a library search for the pre-stored suspected agents and employs a series of pre-programmed shaped pulses to make an absolute identification. While in the search mode, the unit can speed by three to six orders of magnitude in repetition rate to provide the fastest analysis possible. Because it is using a pre-programmed series of shaped pulses, the whole identification process can be completed in under a minute.

The evolutionary learning program, shown in flow chart 6B and used in a laboratory setting to define a library of pulses, begins with an initial random population of pulse shapes, each characterized by binary code that specifies the phase for each pixel in the pulse shaper device. Each pulse shape is tested for its fitness (ability to generate the result that most resembles a target selected in advance). New sets of pulse parameters are created by modifying (mutating) and recombining (via crossover) elements of the best of the previous pulse shapes to create new ones (survival of the fittest). This basic series of processes is iterated and the fitness converges toward a "best" value.

In simple terms, the role of the pulse shaper is to advance or retard individual frequencies within a laser pulse by a factor of $\pi$. For example, in a TL pulse, all the frequencies are locked, and have net zero retardation. In this case, the spectral phase is flat. The pulse shaper can be used on a TL pulse to make some frequencies arrive before others. In these general terms, a pulse shaper can be defined by a number of parameters: input bandwidth, frequency resolution, and maximum retardation. The spectral resolution of a pulse-shaper setup is determined at the Fourier plane, where the pulse is resolved in the frequency domain. The phase retardation must be calibrated and checked for accuracy and reproducibility. This step will be done by MIIPS as described earlier.

For example, the pulse shaper shown in FIG. 5 is in the 2f reflective configuration is provided in combination with a dispersion grating, a cylindrical mirror, the phase-retardation unit, which, in this case, is a liquid crystal spatial light modulator (LC-SLM), and a retro reflector mirror. The SLM unit is located at the Fourier plane of the shaper. As mentioned above, at the Fourier plane, the pulses are spread into their frequency components where each can be delayed separately. Experimentally, spatial light modulators have a finite resolution that is determined by the number of individual liquid crystal elements (pixels) and the optics that disperse the spectrum over the SLM. The liquid crystal is birefringent, therefore, depending on the polarization of the incoming light, a voltage can introduce pure phase retardation or a combination of phase retardation and polarization rotation. The key parameter for determining the optical resolution is the focal spot size that is projected by the lens across the SLM. The optical setup must take into account the effective confocal parameter. The SLM unit is about 1 cm thick such that a setup with a sufficiently long confocal parameter is needed to preserve the spectral resolution.

The frequency resolution of the pulse shaper is determined by the number of pixels in the SLM, as described above. Frequency resolution plays two different roles. First, one can think of frequency resolution in the time domain. Because of the Fourier transform relation between spectral and time resolution, the higher the spectral resolution, the longer the pulses that can be produced by the pulse shaper and the higher the finesse with which one can control narrow frequency resonances in the sample. This is of particular importance for samples that have narrow resonances, like gas-phase systems. The number of active pixels can be related to the overall complexity of the resulting shaped pulse. 128 active pixels is adequate for effecting molecular control and influencing ionization and fragmentation.

Figure 9:
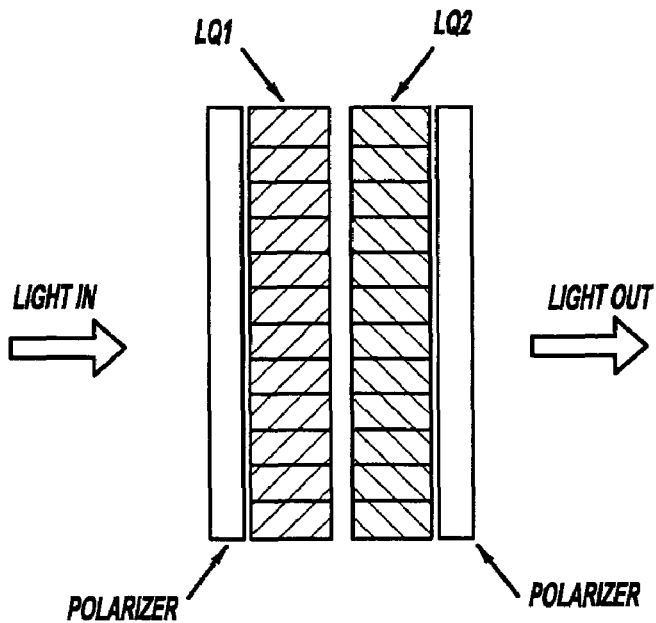
Figure 10:
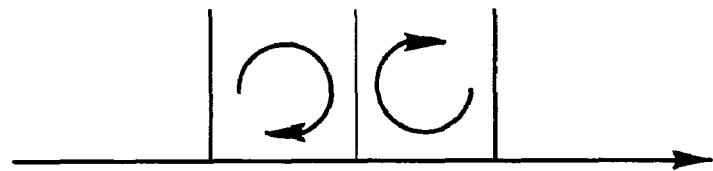
Figure 11:
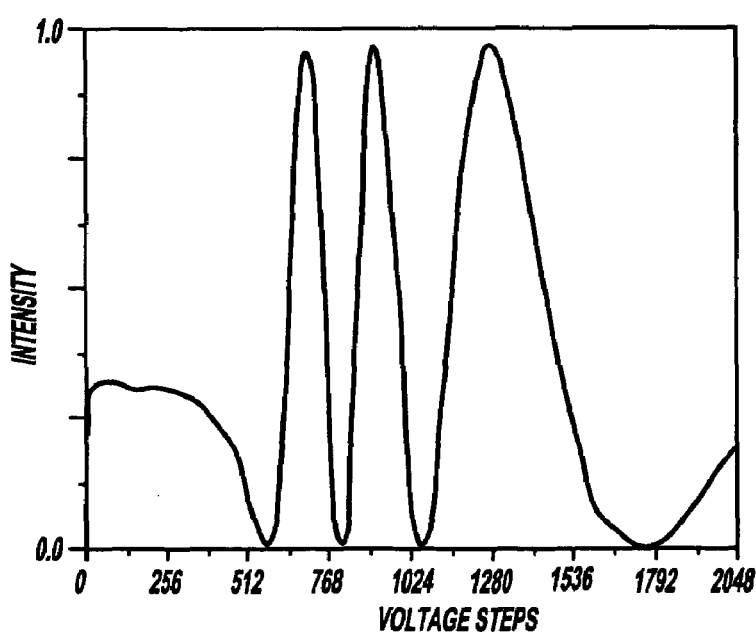

When the optical axis of the liquid crystal mask is oriented at a 45° angle with respect to the polarization of the incident electric field, polarization rotation is introduced in addition to retardance. When two such SLM units are lapped back-to-back and in opposite angles of rotation, and they are flanked by input and output polarizers, one can control phase and amplitude of the transmitted light. The double-mask SLM unit operation is illustrated in FIGS. 9-11. Referring to FIG. 10, a light incident from the left goes through a polarizer and then transmits through the first liquid crystal plate, where it undergoes retardation and polarization rotation. When the light reaches the second liquid crystal plate, it undergoes retardation, but this time polarization rotation takes place in the opposite direction. Finally, a second polarizer is used for amplitude control. When the polarization is rotated away from the incident, horizontal direction, it is attenuated by the second polarizer. A rotation of 90 degrees results in zero transmission. This polarization dependence is very useful for calibration of the pulse shaper. Ramping the voltage of one of the liquid crystal plates while maintaining the other at a constant voltage results in the transmission function, shown in FIG. 11, which can be used to accurately calibrate the dependence of retardance on voltage. The total retardation $\phi$ is determined experimentally taking advantage of changes in the transmission given by:

$$T=\cos^2[\pi(R_1(V_1)-R_2(V_2))/\lambda],$$

where R(V) is the retardance as a function of voltage introduced by each SLM unit. By fixing $V_2$ and scanning $V_1$, $T(V_1)$ is measured and $R_1(V_1)$ is calculated by the computer (except for a constant). $R_2(V_2)$ is obtained by measuring $T(V_2)$ while keeping $V_1$ constant. Knowing $R_1(V_1)$ and $R_2(V_2)$, the phase delay $\phi$ is calculated according to:

$$\phi=\pi(R_1(V_1)+R_2(V_2))/\lambda.$$

It is possible to program the pulse shaper through the computer to provide amplitude-only or phase-only pulse shaping, using the formulas given above. The pulse shaper can be programmed to automatically perform a full calibration, a process that usually takes a matter of minutes. When the LCD in the elements is not oriented at 45 degree angle, a half-wavelength plate can be used to rotate the polarization of the beam and perform the calibration.

Figure 12:
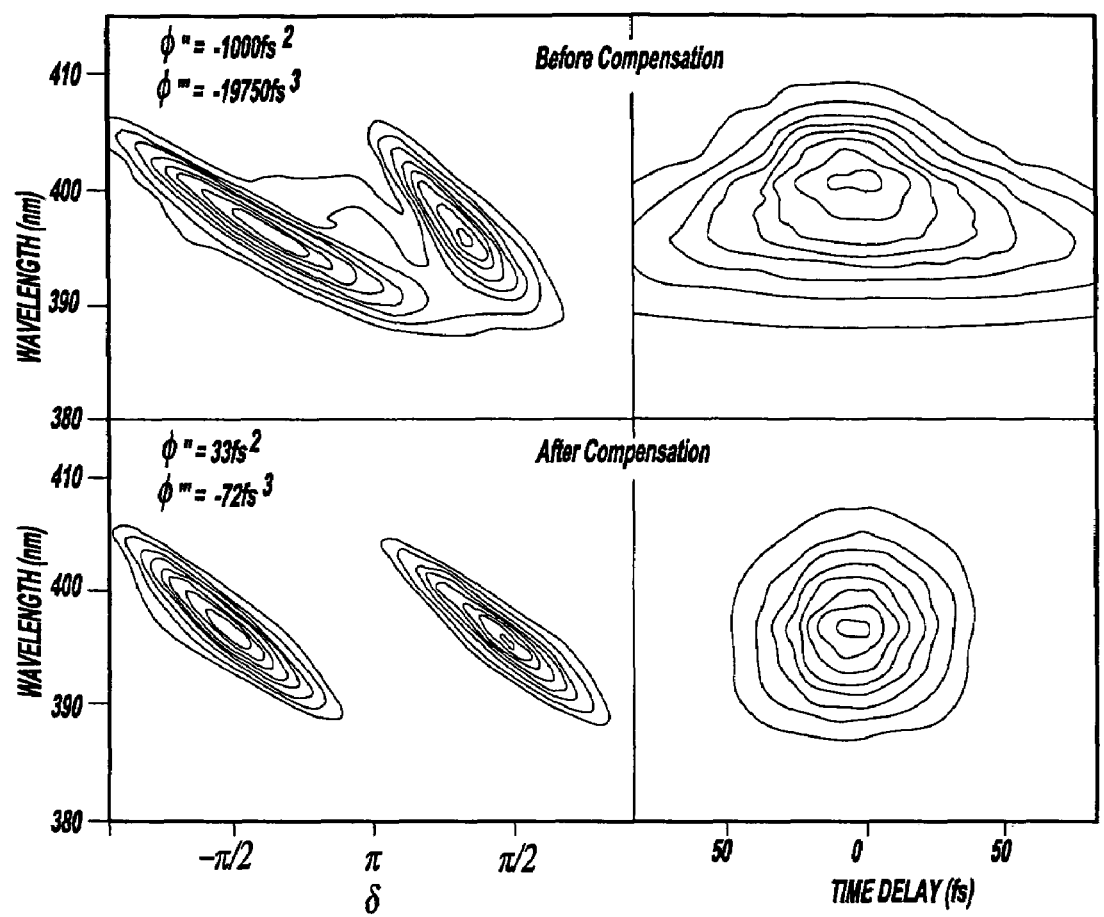

Once the shaping unit is calibrated, it is imperative that the pulse shaper compensates the phase deformations in the femtosecond laser system. Even under ideal conditions, a commercial femtosecond laser produces pulses with phase deformations that are primarily quadratic or cubic in the frequency domain. Multiphoton Intrapulse interference phase scan (MIIPS) automatically determines the spectral phase deformations and compensates for them. Within a minute, the phase distortions are eliminated and TL pulses are obtained (see FIG. 12) where distorted pulses are shown (before) and compensated pulses are obtained after MIIPS. TL pulses are identified by MIIPS by producing straight parallel lines separated by $\pi$. The MIIPS method is believed to be at least one order of magnitude more accurate than alternative methods commercially available. The shaper calibration described above, together with accurate phase characterization and compensation provided by MIIPS, are important steps that are believed to ensure the robustness and reproducibility sought by the system of the present invention.

The monitoring system depends on the identification of certain shaped laser fields that will produce different uniquely identifiable fingerprints from each chemical or biological compound. The search for these shaped laser fields requires the search of a large parameter space using the evolutionary learning program. BPS reduces the search space and drastically increases the reproducibility. Each chemical will be entrained in a molecular beam, which will be interrogated at right angles by the focused shaped laser field. The mass spectrum resulting from ionization and fragmentation will be recorded and compared to others. The evolutionary learning program will have a search target and will determine the shape that best approaches the target.

Figure 13:
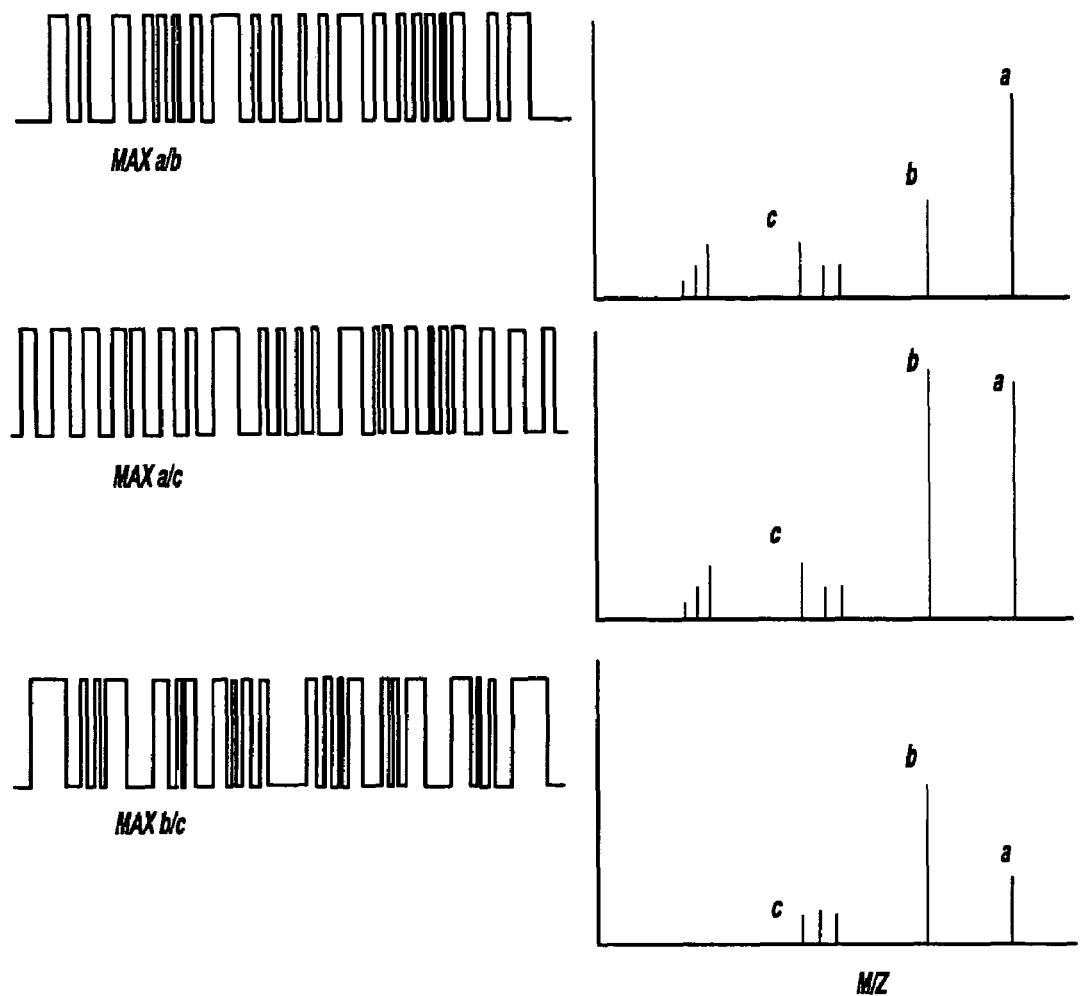
Figure 14:
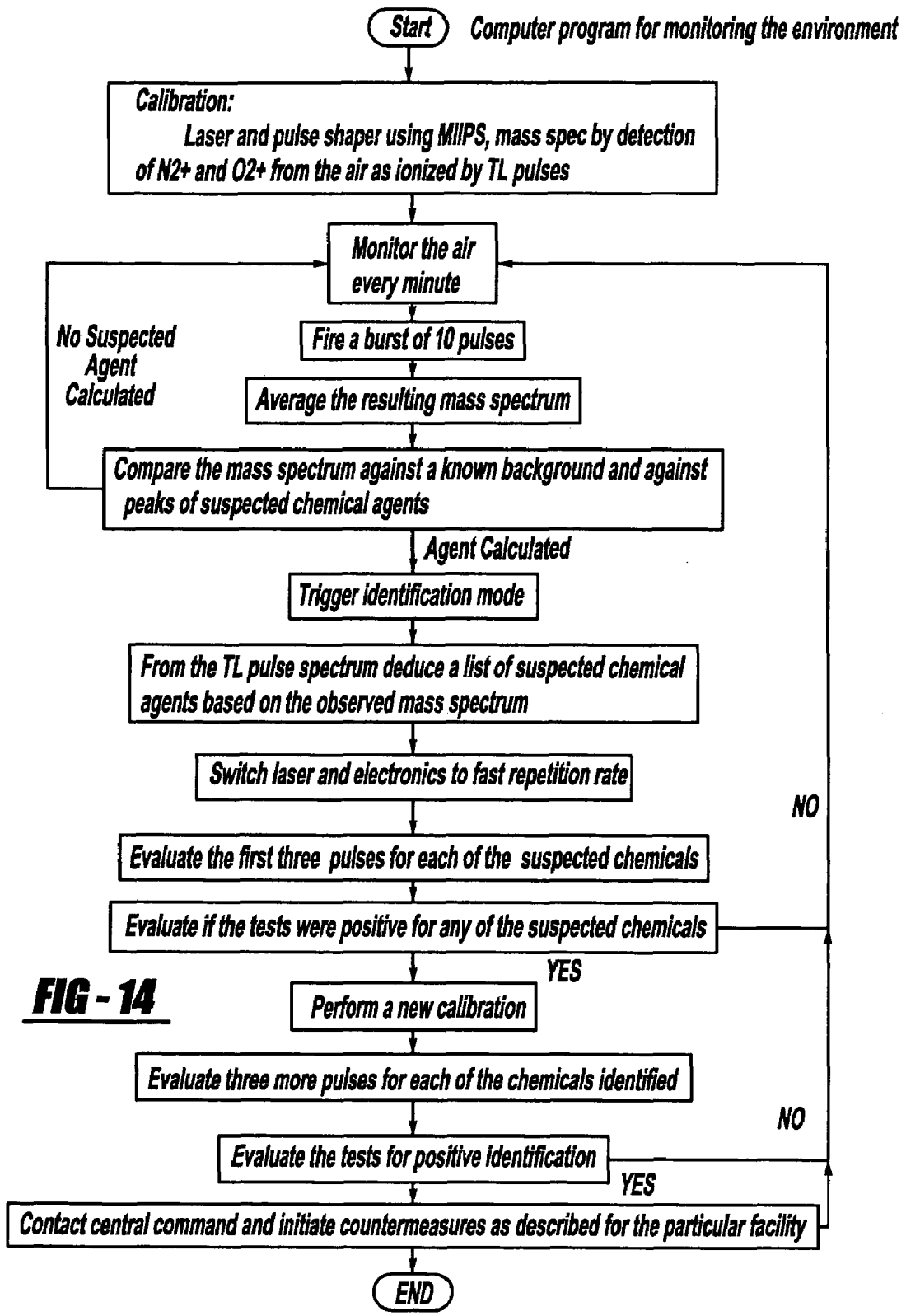

The ability of strong shaped laser fields to influence the ionization and fragmentation of molecules is utilized in order to find uniquely identifying pulses shapes for each molecule. Because laser-molecule control depends on the electronic and nuclear structure of the molecule, no two compounds would yield the same results. Reference should be made to FIG. 13. Specifically, the peak with the largest mass (a), and the subsequent two highest peaks (b) and (c), respectively, are labeled. Six targets are optimized. The first three are those that increase the following peak to valley ratios (a/b), (a/c), and (b/c). The final three laser shapes are those that generate the lowest values for the same ratios. In order to maximize the identification capabilities of the method, the six pulses are required to produce identifiably different results with the six different pulse shapes and different regarding the ionization fragmentation pattern obtained by excitation with TL pulses. This scheme is outlined as an illustration for the strategy to be used for identifying the pulses to be included in a library, but other strategies could be conceived.

An evolutionary learning computer program (ELC), also known as a learning feedback method, is initially employed in the environmental monitoring system of the present invention to determine and pre-store a library of the undesired agents and the acceptable background chemicals. The phase masks of the pulse shaper are controlled by computer 37 (see FIG. 3) and 531 (see FIG. 5). The adaptive laser source is part of a learning feedback method or ELC that modifies the laser pulse shape based on its success at optimizing the yield of charged agents, which may include chemicals or proteins. In the present application, the laser pulse shape takes a dynamic role. Pulse shapes are envisioned which include sequences of pulses where each pulse in the sequence plays a different role, for example, melting, excitation, selective fragmentation, proton transfer and evaporation.

The physical process runs itself by an intelligent "feedback" method by means of an intelligent loop. The learning method tries various pulse shapes, assesses their success in achieving the desired target excitation, and uses the knowledge gained in this way to improve the pulse shapes on subsequent laser shots, all with only minimal intervention of the researcher or system user. Changing conditions are automatically corrected within the learning method or feedback loop.

Reference should now be made to FIGS. 6-8B. The feedback software is implemented with an initial random population of pulse shapes. Each pulse shape is characterized by a series of numbers that specify the spectral phase and amplitude in each of the wavelengths or frequencies within the pulse. This particular parameterization for the pulse shape is itself subject to optimization; this makes the algorithm adaptive. The most important part of the method is the test for fitness of a given pulse shape. Each pulse shape is tested for its ability to generate the result that most resembles a target selected in advance. For example, the program will calculate the ratio between the amplitude at the desired protein signal and the background. Once relative success is quantified, a new generation of pulse shapes is produced by mating different parts of the amplitude and phase information from pairs of the most fit pulse shapes from the current generation. In addition, the method prescribes a small probability (15%) of random changes or mutations in the successful pulse shapes. Furthermore, a new set (10%) of pulses is generated by setting random portions of the phase mask to zero, thus generating new phase masks. Once the new set of individual phases is generated they are evaluated experimentally. This basic series of processes is iterated until the fitness converges on a "best" value.

The convergence and robustness of the feedback method solutions can be measured in two different ways. First, the variance in the amplitude and phase information itself can be monitored. As the feedback method converges on a solution, the values fall into a narrow range that produces the best result. Over the course of many generations, some of the parameters become very stable, which is an indication that those spectral phases and amplitudes are particularly important for driving the process that determines fitness. Secondly, the information for different initial conditions is monitored. If the feedback method is working it should converge to a similar result.

New sets of parameters are created by modifying and combining elements of previous pulse shapes to create new ones. This is carried out by statistical operators that act on the phases and amplitudes of the pulse shapes. Operators that can be used include multi-point crossover, mutation, as discussed above.

A well-chosen set of operators can greatly enhance the performance of the feedback method and lend additional physical insight. However, the proper choice is usually far from obvious, so the method is allowed to adapt itself by letting it choose how often to use a given operator to produce new pulse shapes. The use of adaptive operators helps speed up convergence, and, perhaps more importantly, it helps shed light on the control mechanism at work. For example, crossover is more effective in the beginning of the algorithm when there is maximal uncertainty, since it does a good job of mixing up the information of the initial pulse shapes. It becomes less effective as the feedback method converges to the best solutions, since at this point there is much less change in the parameters, so there is no longer a need to drastically change the information. Ideally, the learning program learns from its past mistakes and does not test possible pulse shapes which it now knows will fail, which saves a considerable amount of computing time.

For each pulse shape, a number of spectra will be obtained. The number of laser shots that are averaged per pulse shape will depend on achievement of a statistically significant spectrum. At first, when the pulse shapes are the result of random phases and amplitudes we imagine that up to 1000 repetitions may be needed to distinguish the more efficient pulse shapes. This will allow one pulse shape per second. As the selection process proceeds large gains in efficiency can be expected. The final stages of the optimization may be carried out at a rate of 100 different pulse shapes per second. The goal is to reach single pulse, femto-mol sensitivity. The second goal is to define a series of such pulses that generates uniquely different spectra from the same compound. It is the predictable different behavior that a compound exhibits when interrogated by each of the optimized shaped pulses, the response patter, that will be used for positive identification. A given response that will stand out even in the presence of a chemically complex environment.

The learning feedback software employed in the present invention control system and apparatus is more fully described as follows. The preliminary investigation method and computer software steps for analyzing a pre-test unknown sample or specimen can be observed in FIG. 7. For any new system, the test should start with pre-defined pulse shapes in order to obtain a basic understanding of the system. Among the pre-defined pulses, the shortest pulse is expected to ionize molecules on the surface of the sample with minimum decomposition, the longest pulse is expected to mimic the nanosecond experiments where the chemical undergoes substantial fragmentation. The microprocessor within personal computer 37 (see FIGS. 3 and 4) will then control laser 23 in accordance with step D, receive an essentially real time feedback input signal from mass spectrometer 39 in accordance with step F and then perform calculations, comparisons and evaluations in accordance with steps G, H and I. These automated steps can be substituted with manual user calculations and decisions if desired based on personal computer outputs.

Figure 6A:
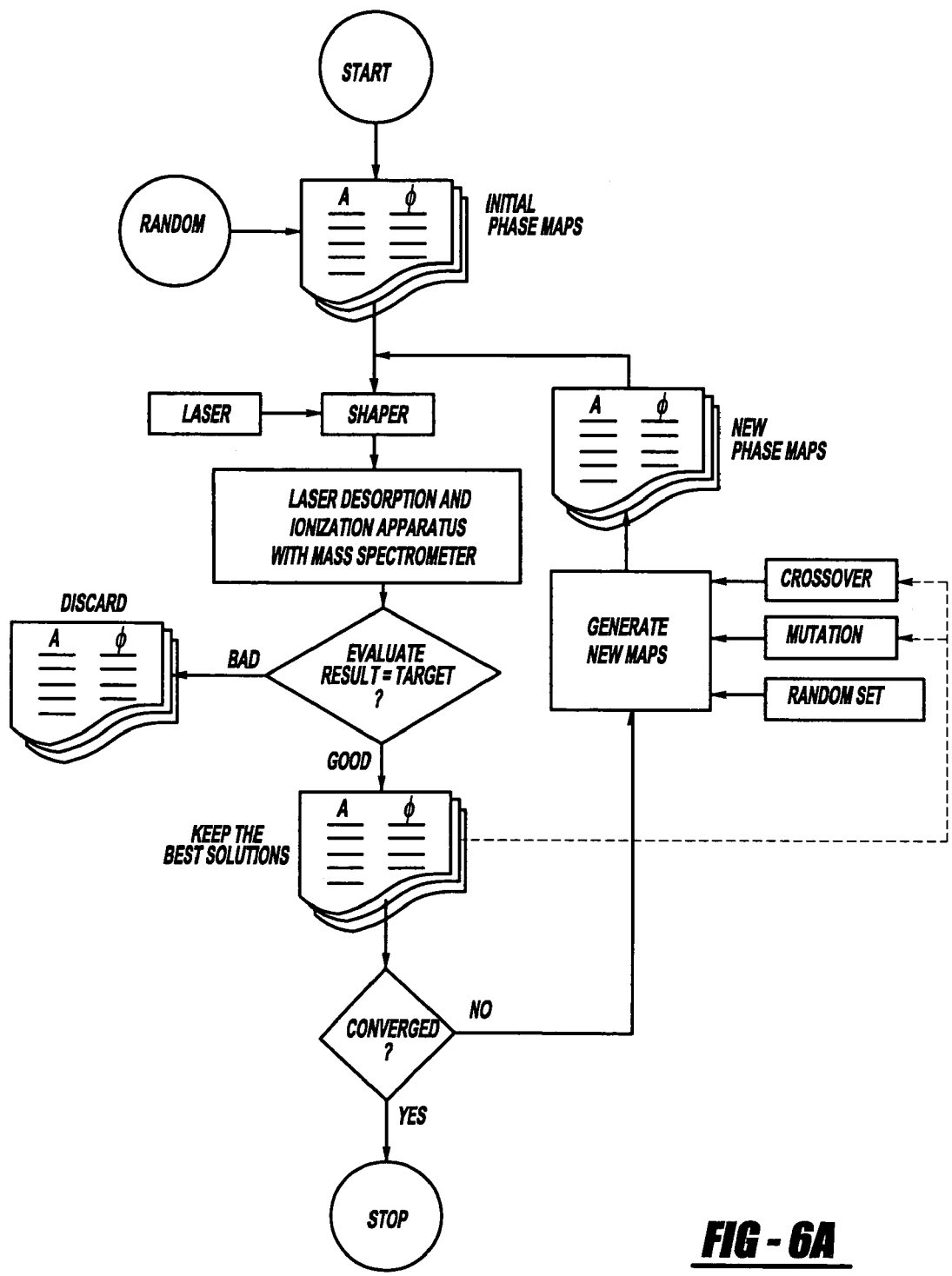
Figure 8A:
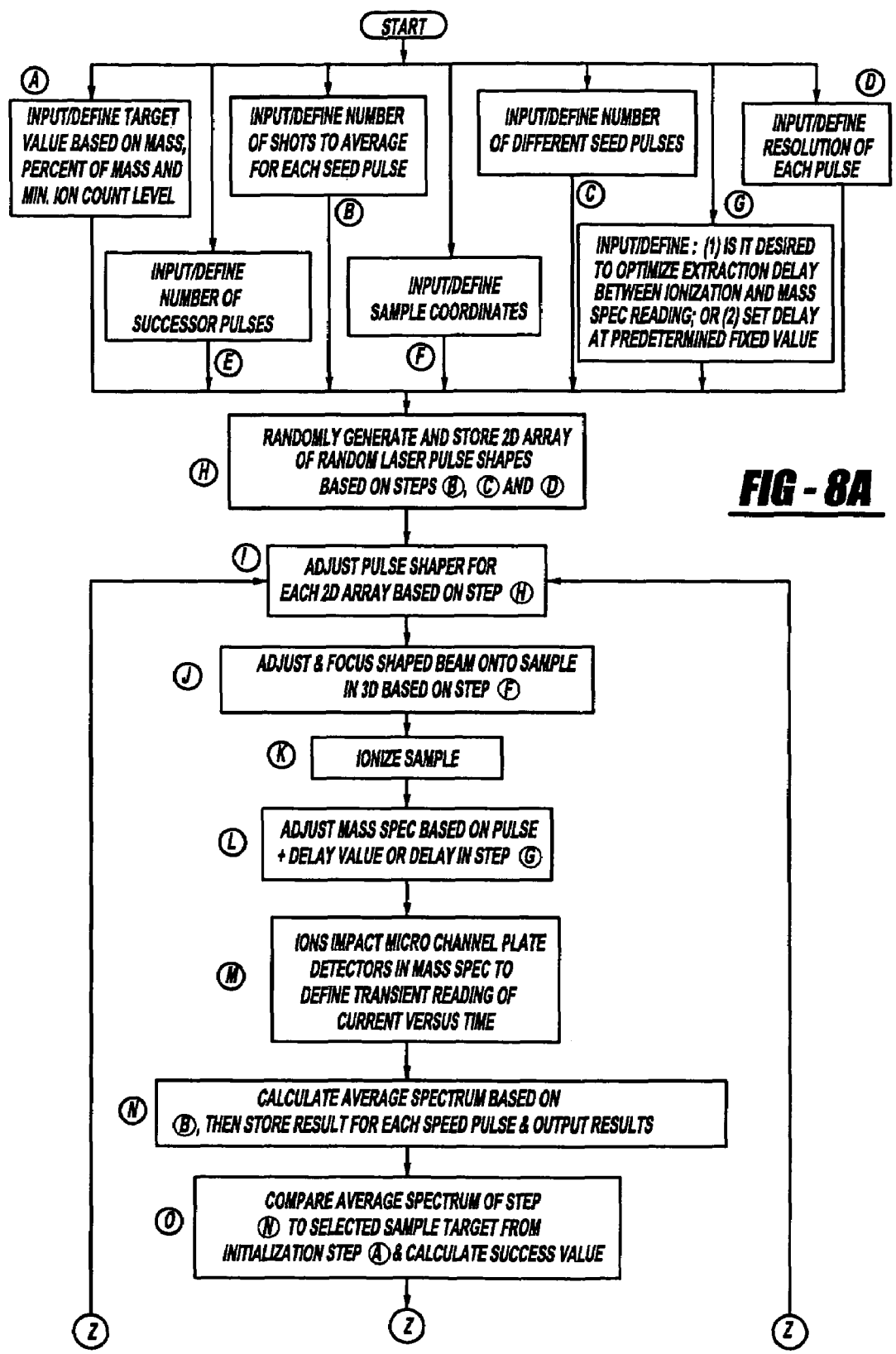
Figure 8B:
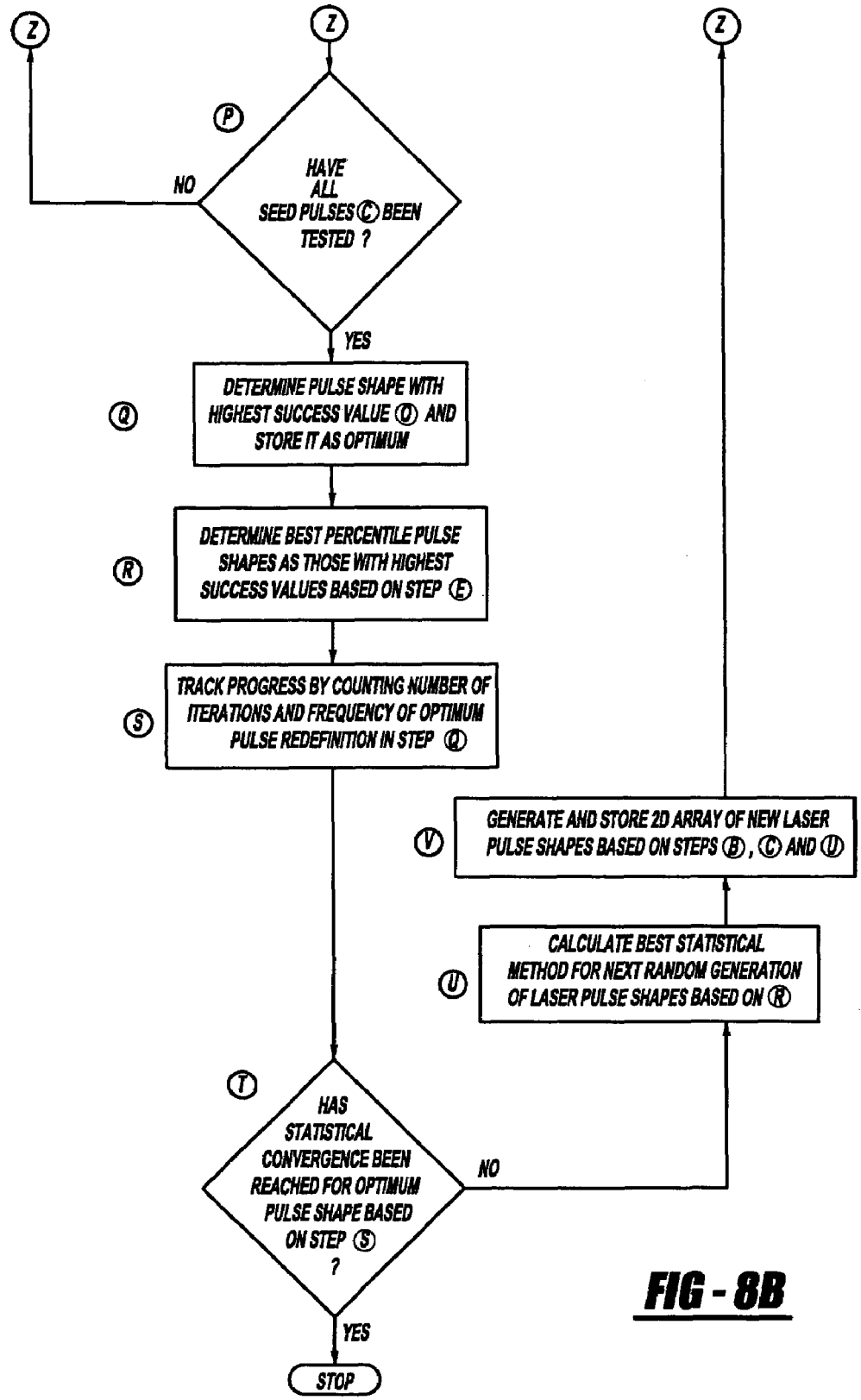

The objective of the software routine of FIGS. 6B, 8A and 8B is to aid in the selection of unique identification shaped pulses that will become integral part of the library for field monitoring. An optional alternate embodiment subroutine includes shooting a long nanosecond laser beam pulse on a solid target to cause a layer of the solid to evaporate. The evaporated compounds are then analyzed by the shaped laser pulses. The short pulse of approximately 50 femtoseconds is shaped and focused on the plume of gases in order to look for fragmentation and sample identification. The long and short pulse combinations can be used in addition to or without the benefit of pulse shaping. Otherwise, the control system and apparatus are the same as discussed herein. This combination is specially useful for the study of non-volatile compounds such as spores and other biological agents. Another alternate variation is where particulate matter in the air is deposited on a sticky matrix and then a nanosecond laser is used to desorb it and then the fs laser is used to analyze the particles for biological agents such as spores. This would pertain to the case where two pulses are used, the first one is a nanosecond or femtosecond pulse and is only used for desorption. The second pulse after an adjustable delay time, is used for fragmentation and further ionization.

The real time learning feedback method and computer software will now be described in greater detail. This method and software are employed to statistically optimize the repetitive identification of molecularly complex and unknown samples or specimens in a highly automated and relatively quick manner. The data that is obtained in the mass spectrometer for each laser pulse consists of a two-dimensional array of numbers which are stored in random access memory of the personal computer. The first column of the array contains arrival times for the ions, when the data is obtained from the time-of-flight mass spectrometer. Equivalent numbers can be obtained from different mass spectrometry units such as quadrupole or ion-cyclotron spectrometers. This numbers can be converted to a mass assuming a charge for the species. The second number identifies the shaped pulse that caused the specific mass spectrum. The data acquisition involves collecting a data set that unequivocally identifies a chemical compound even when it is a small percent of a complex mixture.

Each pulse shape is defined by a one-dimensional array of numbers which are stored in random access memory of the personal computer or otherwise accessible on a read only basis by the personal computer from a disk or the like. The length of the array determines the resolution with which the spectrum of the laser pulse is being sculpted. For a liquid spatial-light modulator, the number of pixels typically determines this number. The array of numbers determines the phase delay for every pixel. The entire array of phases determines the final shape of the output pulse. The shortest pulse is pre-defined as the shortest duration possible for the laser system will the longest pulse is pre-defined as the longest pulse that can be made with the pulse shaper. A two-pulse combination is pre-defined as the combination of an unshaped pulse with a shaped pulse. Pre-defined ultraviolet or infrared pulses at 400 or 800 nm, for example, can be used.

Step R allows the microprocessor to determine the best pulse shape with the highest success value and store it as the optimum value in the random access memory of the central processing unit. The computer will then pick approximately the ten percent best pulse shapes based on the highest success values and then reset the discarded values and automatically generate new laser pulse shapes in step V for subsequent testing iterations on the same specimen. The generation of new seed pulses is important for the success of the feedback method. The goal is to arrive at the optimum pulse in the shortest number of iterations making sure that one has searched the entire range of parameters, the global maximum. The "cost functional" refers to the statistical pressure that is placed on the optimum pulse shape in order to simplify it. For example, once an optical pulse shape or other characteristic is found, it may be important to determine how sensitive the outcome is to each of its amplitude and phase components. Perhaps a much lower resolution can produce the results. The simpler the pulse the easier it is to reproduce and interpret the results in terms of physical concepts. For certain cases, the shape can be simple enough that it can be prepared without a shaper which would allow for a less expensive alternative to the preferred pulse shaping; for example, a combination of two or three different 800 nm pulses, or a combination of infra-red and ultra-violet pulses could be employed as a modified or optimized pulse. Once statistical convergence has been determined by the personal computer, then the test is complete by determining the optimum pulse characteristics (whether they be pulse shape, pulse duration or any other such variable laser beam characteristic) for the corresponding and now post-test identified specimen.

Figure 6C:
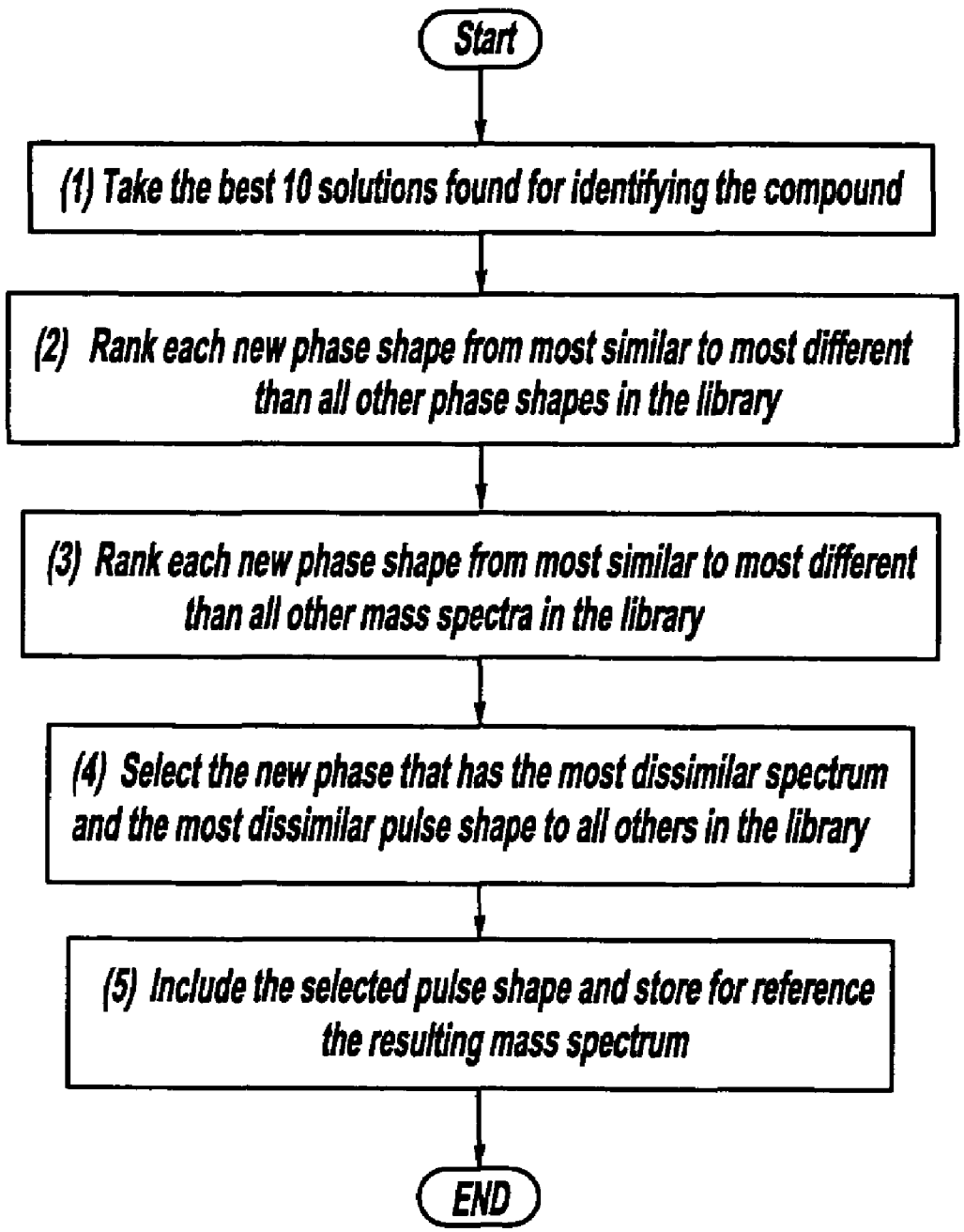
Figure 7:
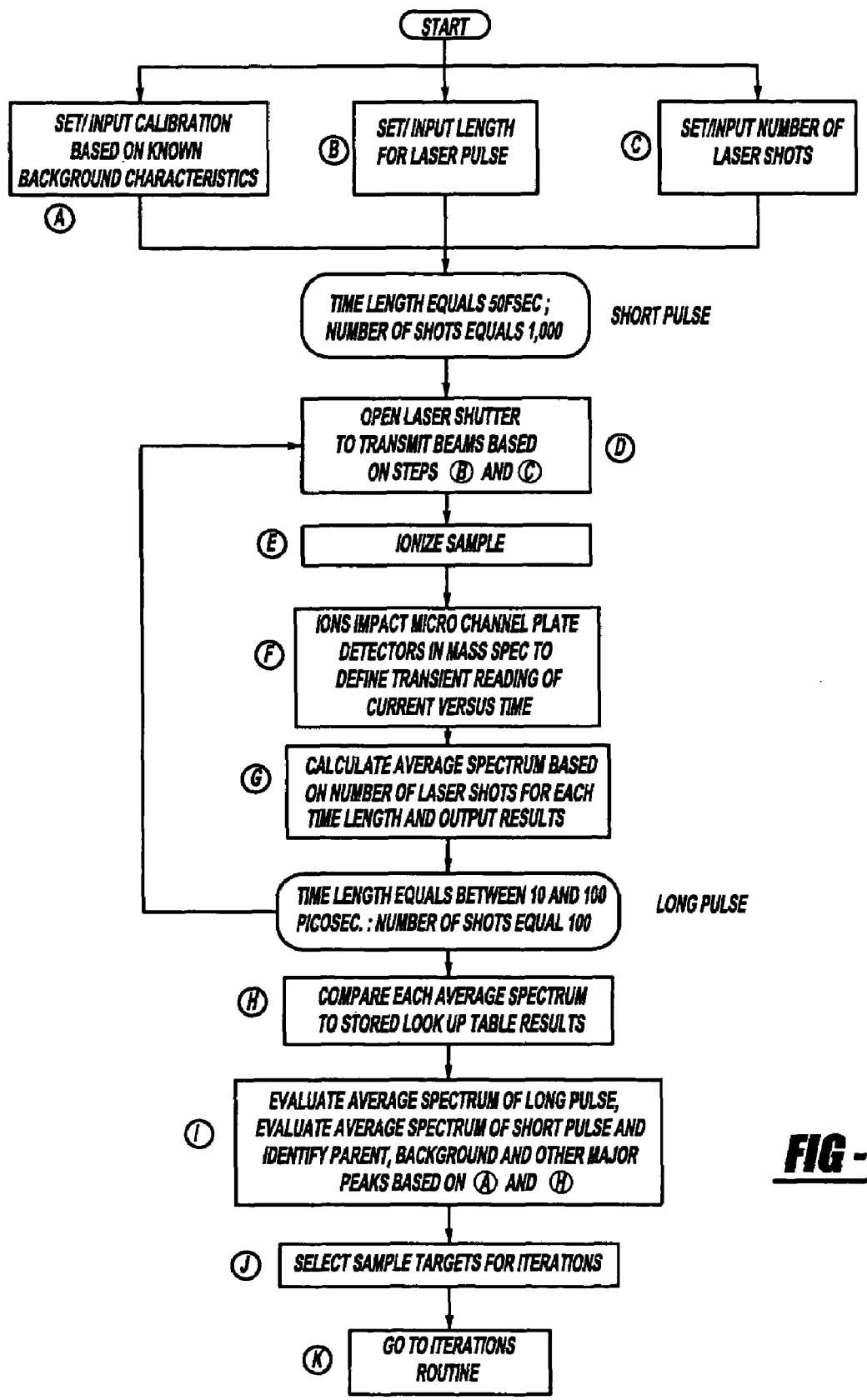

Subsequently, FIG. 6C illustrates the computer program and method for inclusion of a desired phase shape for acceptable background items and unacceptable agents. The ten statistically best pulse/phase shaping solutions are used which identify the chemical compound. These are then automatically ranked by the computer controller based on recognizable differences with previously stored phase shapes. These are then, in turn, ranked based on differences to other previously stored mass spectrum data. Next, the controller automatically selects for storage in memory, the new phase and pulse shaping characteristics for a specific chemical compound or agent that do not overlap with previously stored data. This method significantly reduces the chance of erroneous identifications and determinations.

ALTERNATE APPLICATIONS

Figure 15:
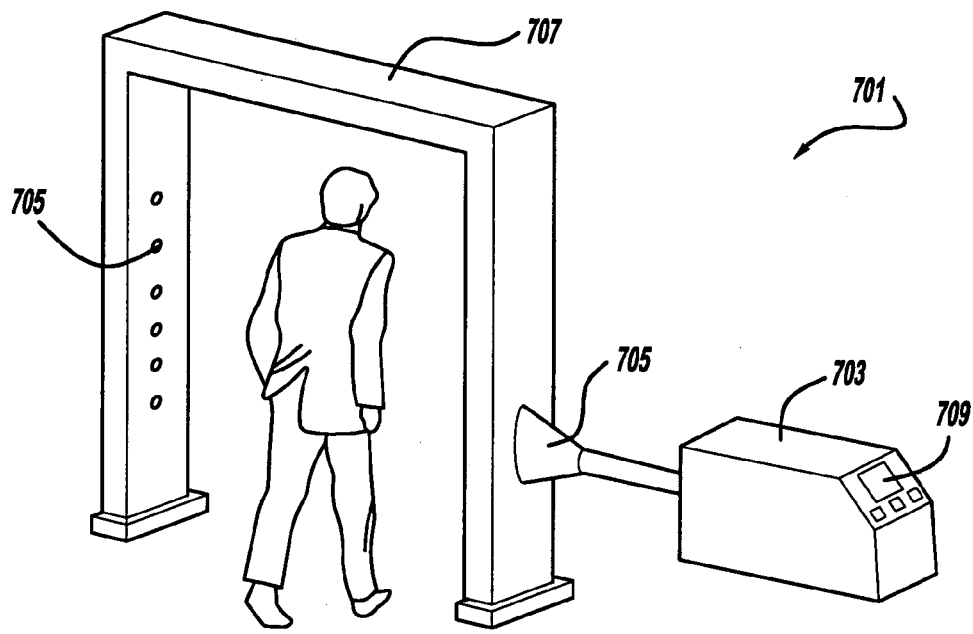

FIG. 15 illustrates a first alternate embodiment use of a laser and environmental monitoring system 701 of the present invention. In this embodiment, a monitoring unit 703, having a femtosecond laser, pulse shaper, mass spectrometer and computer, are fluidically coupled to various inlet ports 705 within walls of a metal detector, security checkpoint unit 707. Such a device is installed within an airport, building entry way, train station or other location of public access. The monitoring unit is set up to sense and determine if explosives or other undesired chemicals are present on the person, luggage or other item being moved adjacent inlet ports 705. A read out of the sensed undesirable chemical or biological (including a disease) agent is projected upon a CRT output screen 709 and warning lights or alarms can be activated. Active baseline subtraction and library comparisons are employed as was previously disclosed.

Figure 16:
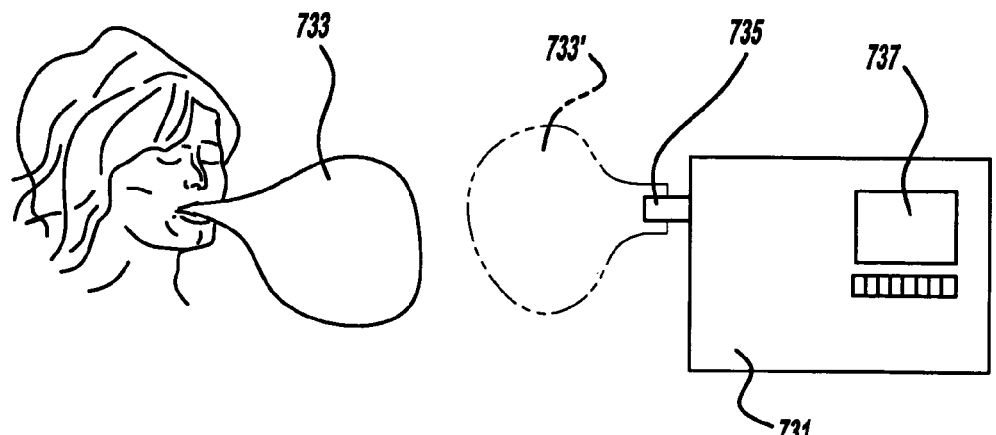

A second alternate embodiment is illustrated in FIG. 16. In this exemplary embodiment, an environmental monitoring unit 731 is employed to sense an undesired disease or illness agent such as diabetes, hepatitis, SARS, or for drug and alcohol testing. The person first breathes into a balloon 733 or directly into an inlet tube 735. If the balloon variation is employed, the balloon is attached to inlet tube 735 which then flows the breathed out air containing various chemicals into the mass spectrometer contained within monitoring unit 731. Through use of a femtosecond laser, pulse shaper, computer and previously stored library of data, in a manner previously disclosed herein, an output display 737 will automatically disclose if any of the undesired agents are present.

While various embodiments have been disclosed herein, it should be appreciated that other modifications may be made that are covered by the system and methods of the present invention. For example, alternate lasers, chemicals, optics, computer controllers and HVAC devices can be employed as long as they function as described. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A system comprising:
a) a laser operable to emit a laser beam pulse;
b) a pulse shaper operable to shape the laser beam pulse;
c) a detector operable to receive the shaped pulse and detect characteristics of an environmental agent;
d) a controller connected to the detector determining if the agent is harmful in response to the detected characteristics; and
e) multiphoton intrapulse interference phase scan software being used for pulse characterization and compensation, the software comprising instructions operable causing multiphoton intrapulse interference to be created in the laser beam pulse.

2. The system of claim 1 further comprising a building ventilation system coupled to the detector.

3. The system of claim 2 wherein the detector is coupled to multiple zones of the building ventilation system, and the controller automatically and selectively determines if any of a variety of the harmful agents are present in each building area separated by the zones.

4. The system of claim 1 wherein the laser beam shaper employs two phase values separated by $\pi$.

5. The system of claim 1 wherein the laser beam pulse shaper includes at least one collimating optic and a grating.

6. The system of claim 1 wherein a bandwidth of the laser is dispersed across at least a majority of pixels of a phase modulator of the pulse shaper.

7. The system of claim 1 wherein the agent is a chemical molecule.

8. The system of claim 1 wherein the agent is a biological pathogen.

9. The system of claim 1 further comprising a security checkpoint unit located adjacent a movable item, the detector being coupled to the checkpoint unit, and the detector and controller operably determining if an undesired agent is present on the movable item, wherein the agent is an explosive.

10. The system of claim 1 wherein the agent is a human breathable disease.

11. The system of claim 1 wherein the controller automatically varies a sampling rate of the detector depending upon the determination results.

12. The system of claim 1 further comprising a countermeasure procedure being automatically initiated by the controller in order to reduce harmful effects of the harmful agent, if presence of the agent is automatically determined.

13. The system of claim 1 wherein the detector is a mass spectrometer and the laser pulse is of a duration less than about 50 femtoseconds.

14. A system comprising:
(a) a building including a ventilation system;
(b) a laser and detection device coupled to the ventilation system; and
(c) a controller connected to and operating the laser and detection device;
(d) the laser and detection device repetitively receiving air samples from the ventilation system and the controller determining if an undesirable agent is present;
(e) the controller automatically enacting a countermeasure to reduce the harmfulness if the undesirable agent in the building; the controller including software instructions operably causing multiphoton intrapulse interference to be created in the laser beam pulse and
(f) memory containing a library of acceptable background environmental specimens and undesirable environmental specimens, the controller including software instructions which compares the detected characteristics to those stored in the memory.

15. The system of claim 14 wherein the controller automatically monitors multiple discrete areas within the building.

16. The system of claim 15 wherein the controller automatically determines if the agent is moving between the discrete areas.

17. The system of claim 15 wherein the controller automatically changes the operation of the ventilation system to isolate contaminated ones of the discrete areas.

18. The system of claim 14 wherein the countermeasure further comprises automatically venting the agent to the atmosphere external to the building.

19. The system of claim 14 wherein the countermeasure further comprises automatically closing a door in the building.

20. The system of claim 14 wherein the countermeasure further comprises automatically flowing water into the building.

21. The system of claim 14 wherein the countermeasure further comprises automatically injecting at least one of: a neutralizing agent and antidote, of the agent into the building.

22. The system of claim 14 wherein the laser and detection device further comprises a pulse shaper operably varying a characteristic of the laser beam pulse emitted by the laser.

23. The system of claim 14 wherein the laser and detection device further comprises a mass spectrometer operably detecting a mass spectrum of the agent.

24. The system of claim 14 wherein the laser beam pulse has duration of less than about 50 femtoseconds and is emitted upon the agent monitored in the device.

25. A system comprising:
a) a laser operable to emit a laser beam pulse;
b) a pulse shaper operable to shape the laser beam pulse;
c) a detector, located adjacent a building ventilation system, operable to receive the shaped pulse and detect characteristics of an environmental agent in the building ventilation system;
d) a controller connected to the detector and determining a characteristic of the agent, the controller also being connected to the laser for assisting in controlling emission of the laser beam pulse therefrom, the controller including software instructions operably causing multiphoton intrapulse interference to be created in the laser beam pulse; and
e) memory containing a library of acceptable background environmental specimens and undesirable environmental specimens, the controller including software which compares the real-time detected characteristics to those stored in the memory.

26. The system of claim 25 wherein the detector is coupled to multiple zones of the building ventilation system, and the controller automatically and selectively determines if any of a variety of the harmful agents are present in each building area separated by the zones.

27. The system of claim 25 further comprising evolutionary learning calculations used to identify the agent.

28. The system of claim 25 further comprising multiphoton intrapulse interference phase scan used for pulse characterization and compensation.

29. The system of claim 25 wherein the agent is a chemical molecule.

30. The system of claim 25 wherein the agent is a biological pathogen.

31. The system of claim 25 wherein the agent is a human breathable disease.

32. The system of claim 25 wherein the controller automatically varies a sampling rate of the detector depending upon the determination results.

33. The system of claim 25 further comprising a countermeasure procedure being automatically initiated by the controller in order to reduce harmful effects of the agent, if presence of the agent is automatically determined.

34. The system of claim 25 wherein the detector is a mass spectrometer and the laser pulse is of a duration less than about 50 femtoseconds.

35. A system comprising:
(a) a laser operable to emit laser pulses at an environmental airborne specimen;
(b) a sensor sensing characteristics of the airborne specimen due to reception of at least one of the pulses by the airborne specimen;
(c) a controller having programmed software instructions which automatically determine if the airborne specimen is an acceptable chemical or an undesirable agent, and
(d) memory containing a library of characteristics of acceptable and undesirable environmental airborne specimens, the software instructions comparing the real-time sensed characteristics to those stored in the memory; and
(e) the software comprising instructions operable causing multiphoton intrapulse interference to be created in the laser beam pulse and controlling multiphoton intrapulse interference in at least one of the pulse.

36. The system of claim 35 further comprising a building ventilation system coupled to the sensor.

37. The system of claim 36 wherein the sensor is coupled to multiple zones of the building ventilation system, and the controller automatically and selectively determines if any of a variety of harmful agents are present in each building area separated by the zones.

38. The system of claim 35 wherein the software instructions further comprise evolutionary learning calculations which are used to identify the agent.

39. A system comprising:
(a) a laser operable to emit laser pulses at an environmental airborne specimen;
(b) a sensor sensing characteristics of the airborne specimen due to reception of at least one of the pulses by the airborne specimen;
(c) a controller having programmed software instructions which automatically determine if the airborne specimen is an acceptable chemical or an undesirable agent; and
(d) the software instructions cause multiphoton intrapulse interference to be created in the laser beam pulse, which are used for pulse characterization and compensation.

40. The system of claim 35 wherein the agent is a chemical molecule.

41. The system of claim 35 wherein the agent is a biological pathogen.

42. The system of claim 35 wherein the agent is a human breathable disease.

43. The system of claim 35 wherein the controller automatically varies a sampling rate of the sensor depending upon the determination results.

44. The system of claim 35 further comprising countermeasure software instructions being automatically initiated by the controller in order to reduce harmful effects of the harmful agent, if presence of the agent is automatically determined.

45. The system of claim 35 wherein the sensor is a mass spectrometer and at least one of the laser pulses is of a duration less than about 50 femtoseconds.

46. The system of claim 1 further comprising memory containing a library of characteristics of acceptable and undesirable environmental airborne specimens, the software instructions comparing the real-time sensed characteristics to those stored in the memory.

47. The system of claim 39 wherein the controller positively identifies the previously unknown agent, if the agent is determined to be harmful.

48. The system of claim 14 wherein the controller positively identifies the previously unknown agent, if the agent is determined to be harmful.

49. The system of claim 25 wherein the controller positively identifies the previously unknown agent, if the agent is determined to be harmful.

50. The system of claim 35 wherein the controller positively identifies the previously unknown agent, if the agent is determined to be harmful.

51. The system of claim 1 wherein the controller positively identifies the previously unknown agent, if the agent is determined to be harmful.

* * * * *

UNITED STATES PATENT AND TRADEMARK OFFICE
CERTIFICATE OF CORRECTION

PATENT NO. : 7,583,710 B2 Page 1 of 1
APPLICATION NO. : 10/884798
DATED : September 1, 2009
INVENTOR(S) : Dantus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Fourteenth Day of September, 2010

David J. Kappos
*Director of the United States Patent and Trademark Office*